(12) United States Patent
Kishi et al.

(10) Patent No.: US 10,410,392 B2
(45) Date of Patent: Sep. 10, 2019

(54) DATA STRUCTURE FOR COMPUTER GRAPHICS, INFORMATION PROCESSING DEVICE, INFORMATION PROCESSING METHOD AND INFORMATION PROCESSING SYSTEM

(71) Applicant: DENTSU INC., Tokyo (JP)

(72) Inventors: Yuki Kishi, Tokyo (JP); Yasuo Higa, Tokyo (JP); Akio Iijima, Tokyo (JP); Tatsuki Tatara, Tokyo (JP)

(73) Assignee: DENTSU INC., Tokyo (JP)

( * ) Notice: Subject to any disclaimer, the term of this patent is extended or adjusted under 35 U.S.C. 154(b) by 60 days.

(21) Appl. No.: 15/545,512

(22) PCT Filed: Jan. 29, 2016

(86) PCT No.: PCT/JP2016/052633
§ 371 (c)(1),
(2) Date: Jul. 21, 2017

(87) PCT Pub. No.: WO2016/121921
PCT Pub. Date: Aug. 4, 2016

(65) Prior Publication Data
US 2018/0012389 A1 Jan. 11, 2018

(30) Foreign Application Priority Data

Jan. 30, 2015 (JP) ................... 2015-016214
Apr. 3, 2015 (JP) ................... 2015-077162

(51) Int. Cl.
| | |
|---|---|
| *G06T 13/40* | (2011.01) |
| *G06T 13/20* | (2011.01) |
| *G10H 1/00* | (2006.01) |
| *G10H 1/36* | (2006.01) |
| *G10H 1/40* | (2006.01) |

(52) U.S. Cl.
CPC ............ *G06T 13/205* (2013.01); *G06T 13/40* (2013.01); *G10H 1/00* (2013.01); *G10H 1/0008* (2013.01);
(Continued)

(58) Field of Classification Search
CPC ................................ G06T 13/40; G06T 13/20
(Continued)

(56) References Cited

U.S. PATENT DOCUMENTS

| | | | |
|---|---|---|---|
| 5,909,218 A | 6/1999 | Naka et al. | |
| 5,915,972 A | 6/1999 | Tada et al. | |

(Continued)

FOREIGN PATENT DOCUMENTS

| | | |
|---|---|---|
| JP | 09-204163 | 8/1997 |
| JP | 10-307930 | 11/1998 |

(Continued)

OTHER PUBLICATIONS

International Search Report (ISR) in International Pat. Appl. No. PCT/JP2016/052633, dated Apr. 12, 2016.

*Primary Examiner* — Jin Ge
(74) *Attorney, Agent, or Firm* — Greenblum & Bernstein, P.L.C.

(57) ABSTRACT

The present invention is designed to allow easy synchronization of the movement of a computer graphics (CG) model with sound data. The data structure according to an embodiment of the present invention presents a data structure that relates to a computer graphics (CG) model, including first time-series information for designating the coordinates of the components of the CG model on a per beat basis, and the first time-series information is used on a computer to process the CG model.

14 Claims, 35 Drawing Sheets

(52) U.S. Cl.
CPC ............ *G10H 1/0058* (2013.01); *G10H 1/368* (2013.01); *G10H 1/40* (2013.01); *G10H 2210/091* (2013.01); *G10H 2220/201* (2013.01); *G10H 2220/455* (2013.01); *G10H 2240/056* (2013.01)

(58) Field of Classification Search
USPC ........................................................ 345/474
See application file for complete search history.

(56) References Cited

U.S. PATENT DOCUMENTS

| | | | |
|---|---|---|---|
| 9,358,456 B1* | 6/2016 | Challinor | A63F 13/04 |
| 2003/0103076 A1* | 6/2003 | Neuman | G11B 27/005 |
| | | | 715/723 |
| 2003/0161425 A1* | 8/2003 | Kikuchi | G10H 1/0041 |
| | | | 375/354 |
| 2004/0163527 A1 | 8/2004 | Kawai et al. | |
| 2004/0241632 A1* | 12/2004 | Tsukamoto | G09B 19/00 |
| | | | 434/307 A |
| 2006/0156906 A1* | 7/2006 | Haeker | G10H 1/0008 |
| | | | 84/609 |
| 2007/0159487 A1* | 7/2007 | Felt | G06T 13/80 |
| | | | 345/474 |

FOREIGN PATENT DOCUMENTS

| | | | |
|---|---|---|---|
| JP | 10307930 | * | 11/1998 |
| JP | 3337938 | | 8/2002 |
| JP | 3380158 | | 12/2002 |
| JP | 2004-127019 | | 4/2004 |
| JP | 2008-176679 | | 7/2008 |

* cited by examiner

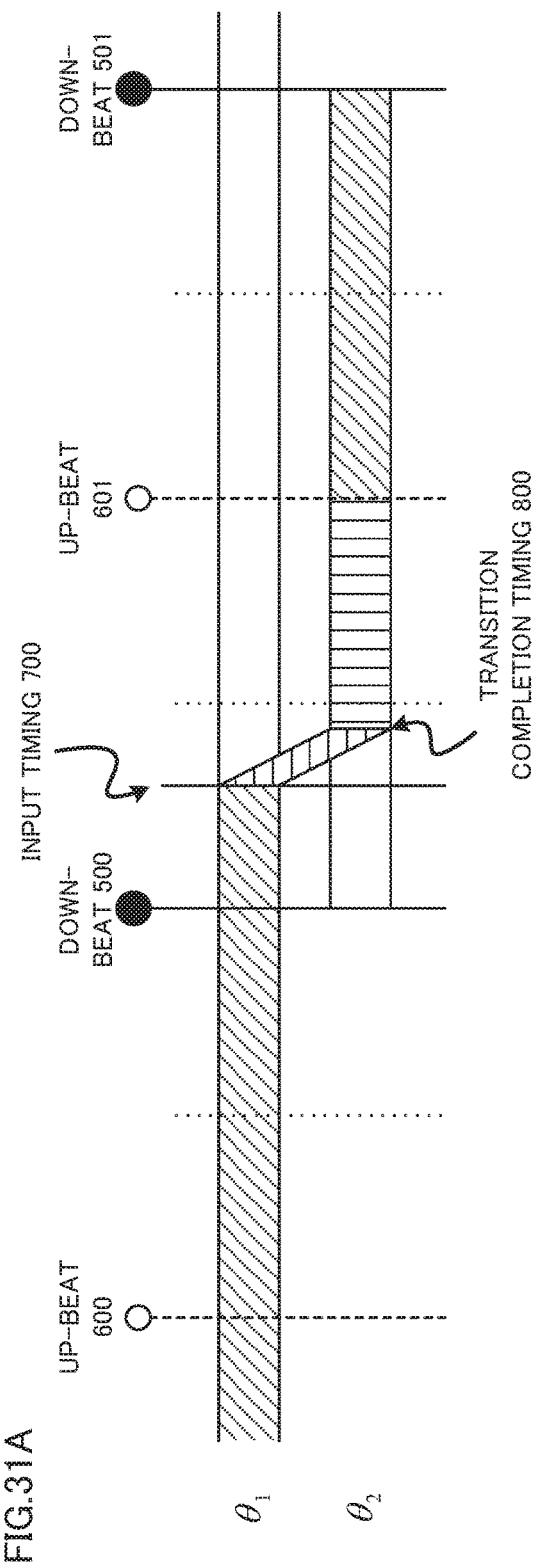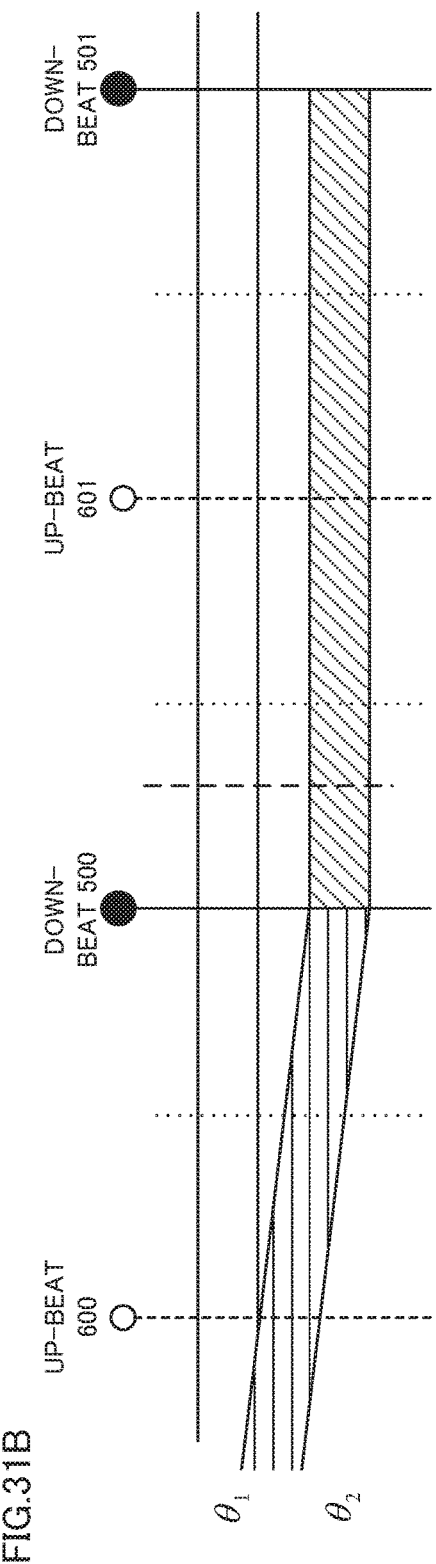

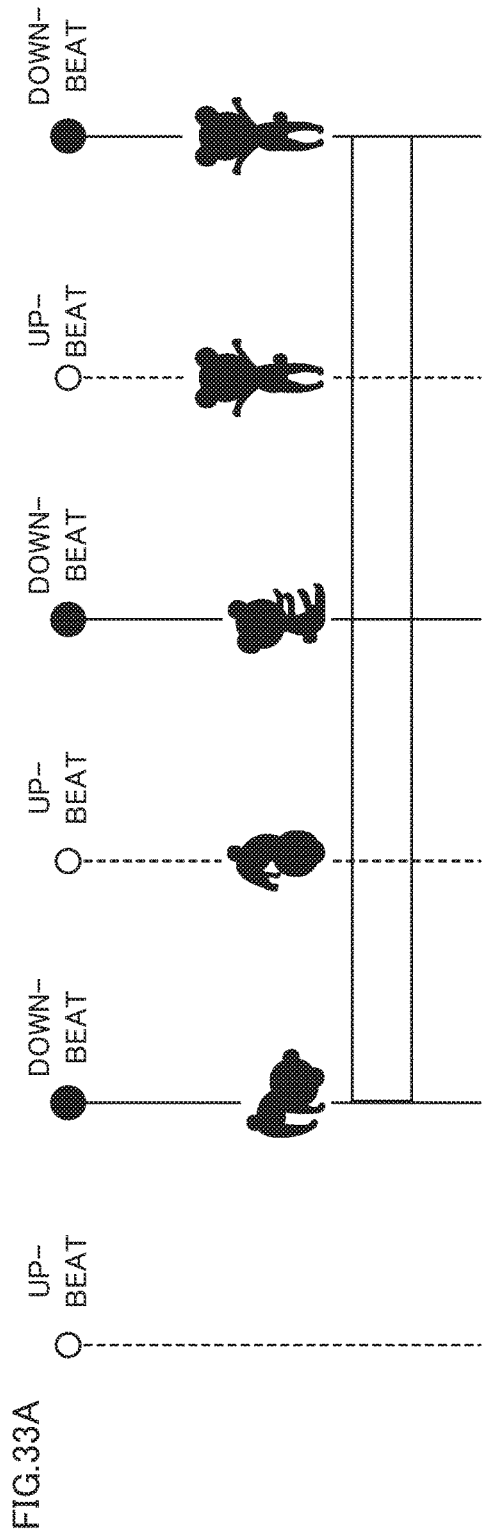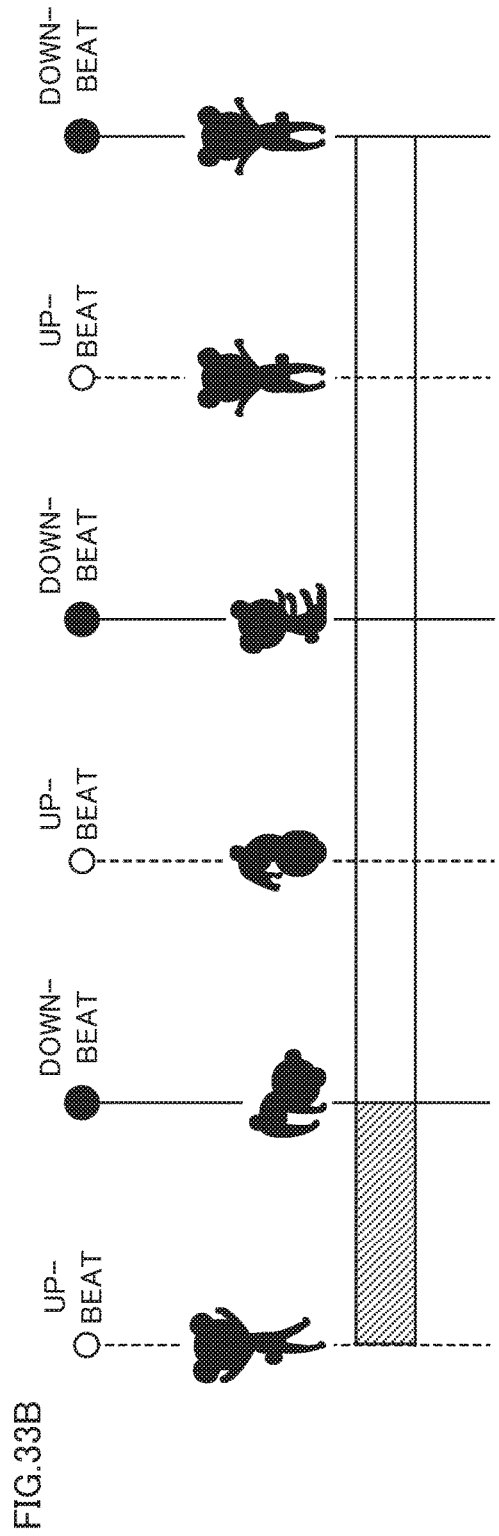

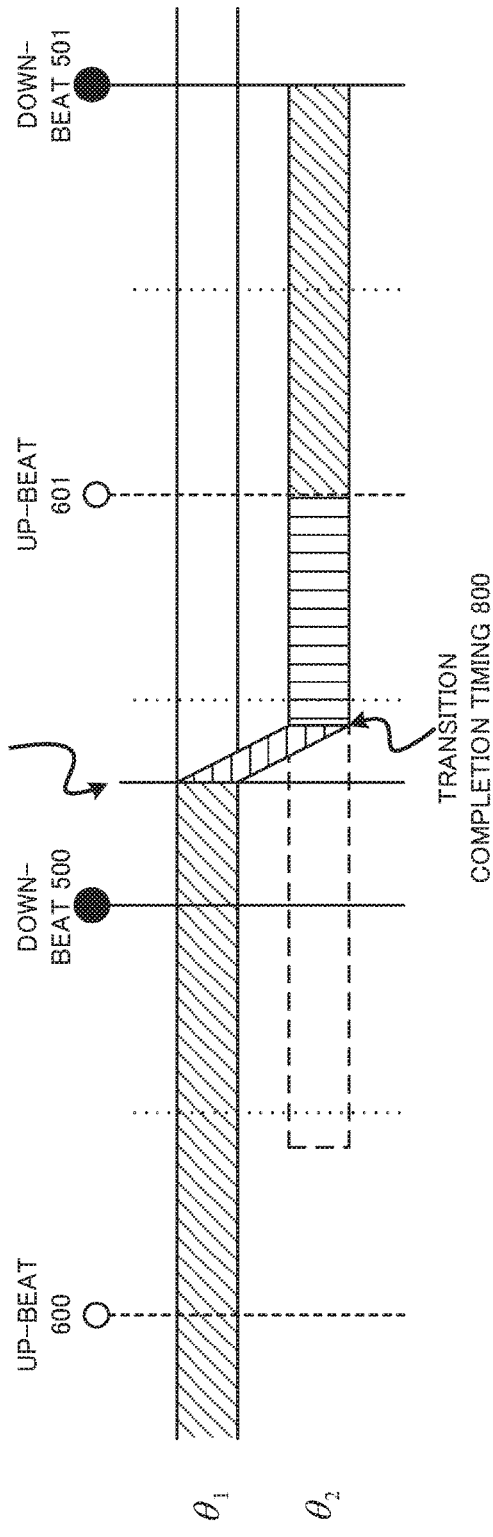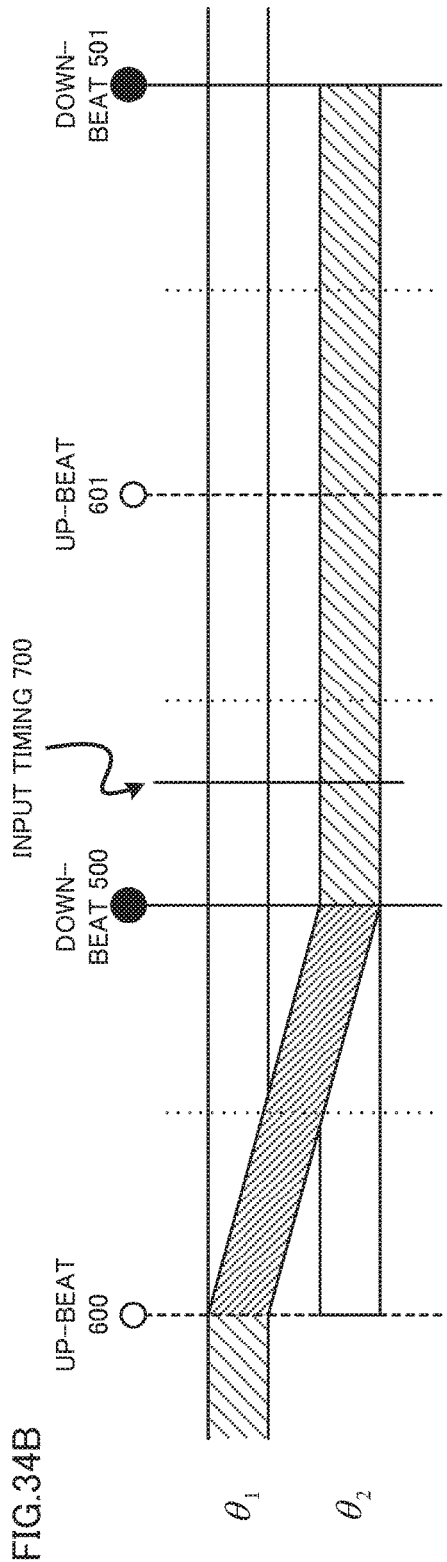

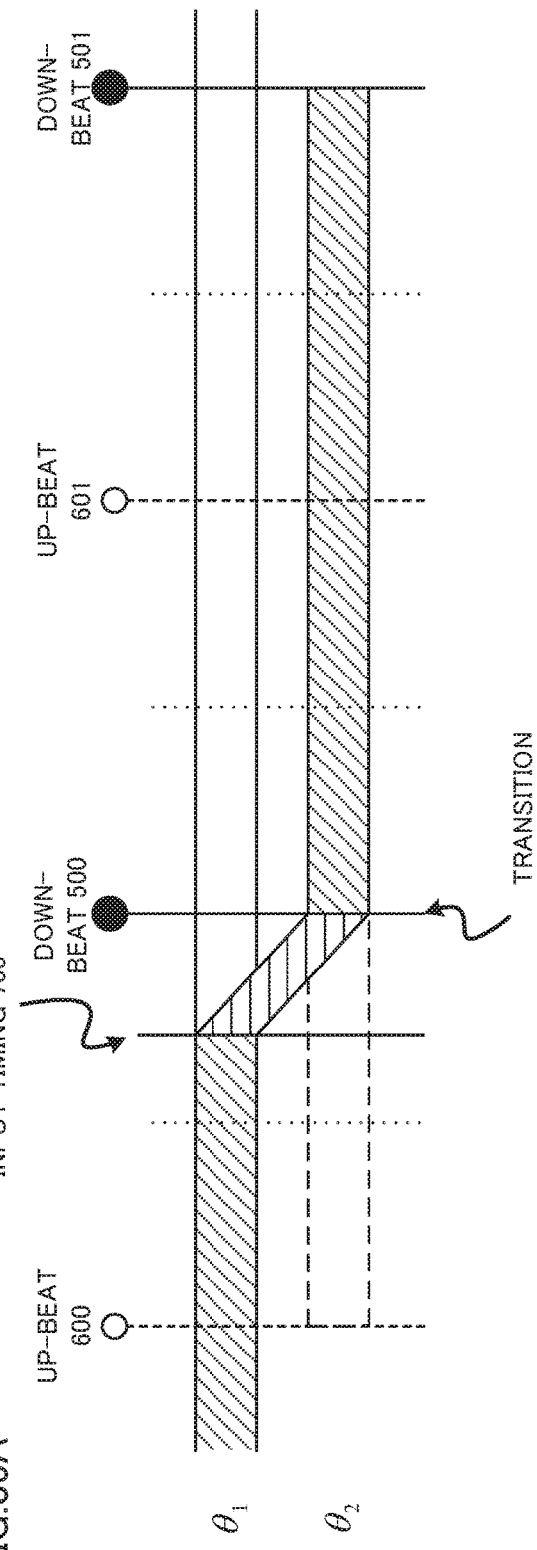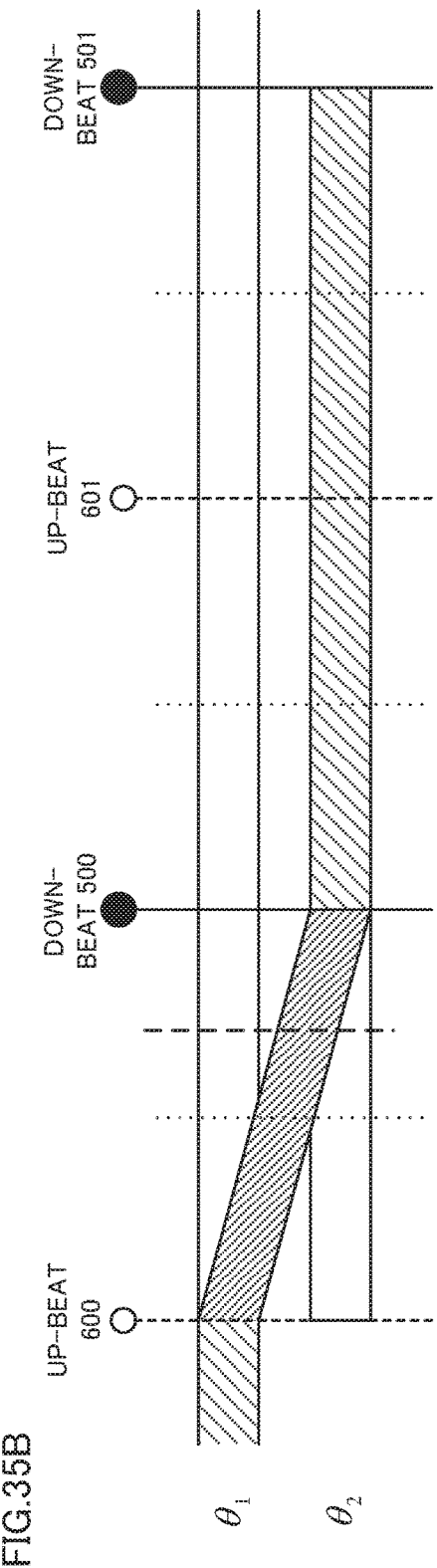

DATA STRUCTURE FOR COMPUTER GRAPHICS, INFORMATION PROCESSING DEVICE, INFORMATION PROCESSING METHOD AND INFORMATION PROCESSING SYSTEM

TECHNICAL FIELD

The present invention relates to a data structure for three-dimensional computer graphics, an information processing device, an information processing method and an information processing system.

BACKGROUND ART

In recent years, following the improvement of hardware performance, the use of three-dimensional computer graphics (also referred to as "3D CG" (Three Dimensional Computer Graphics), or referred to simply as "CG" (Computer Graphics) or the like) has been gaining popularity. Also, various data structures for representing characters in 3D CG (CG models) have been proposed. For example, data structures that are suitable for characters having complex skeleton structures such as human beings have been proposed (see, for example, patent literature 1 and 2). By using such CG models and data structures, CG animation movies can be made.

CITATION LIST

Patent Literature

Patent Literature 1: Japanese Patent Publication No. 3337938
Patent Literature 2: Japanese Patent Publication No. 3380158

SUMMARY OF INVENTION

Technical Problem

The movement (motion) of CG models can be created by digitizing the movement of humans and animals in the real world by using a system referred to as "motion capture" and taking it into a computer. Also, the motion of CG models is created using an application on a computer.

However, synchronizing the motion of CG models with sound data (for example, music data, audio data, etc.) is still difficult. For example, imagining making a motion in which a CG model dances to music, if the motion capture system is to be used, an excellent dancer has to be adopted as a capture target (for example, human), and therefore such a motion cannot be made so easily. Also, even with an excellent dancer, there may be a slight gap between the music and the dance.

On the other hand, even when an application is to be used, the operator (user) of the application must be familiar with the choreography of the dance. Furthermore, even if the user is familiar with the choreography of the dance, with conventional applications, delicate adjustments need to be made in order to synchronize the movements with sound data, and so it is difficult to synchronize the movements with sound data perfectly.

The present invention has been made in view of the above, and it is therefore an object of the present invention to provide a data structure, an information processing device, an information processing method and an information processing system that are capable of synchronizing the movement of a CG model with sound data at ease.

Solution to Problem

A data structure according to an example of the present invention is a data structure related to a computer graphics (CG) model, in which the data structure contains first time-series information for specifying coordinates of components of the CG model, in chronological order, on a per beat basis, and the first time-series information is used on a computer to process the CG model.

Advantageous Effects of Invention

According to the present invention, it is possible to synchronize the movement of a CG model with sound data at ease.

BRIEF DESCRIPTION OF DRAWINGS

FIGS. 31A and 31B provide diagrams to show examples of cases in which the user's input is later than desired timing;

FIGS. 33A and 33B provide diagrams to show examples of motion data that is assumed in the present invention;

FIGS. 34A and 34B provide diagrams to show other examples of cases in which the user's input is later than desired timing; and FIGS. 35A and 35B provide diagrams to show other examples of cases in which the user's input is earlier than desired timing.

DESCRIPTION OF EMBODIMENTS

Figure 1:
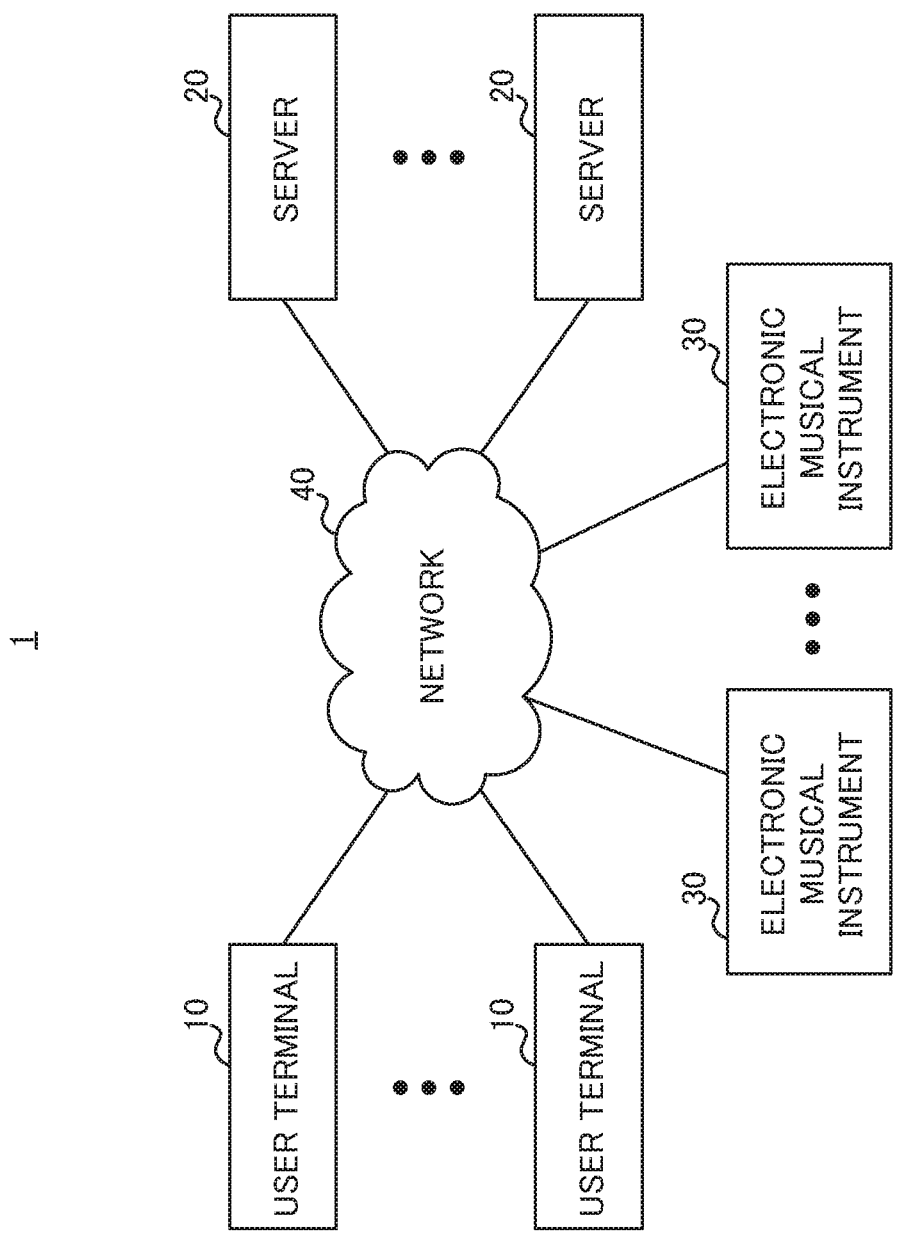
FIG. 1 is a diagram to show an example of a schematic structure of an information processing system according to an embodiment of the present invention.

Problems with conventional ways of making CG movies will be explained in greater detail. Conventionally, on a computer, CG movies have been made in frame units (that is, each movie is made up of still images). General CG movies are made with a fixed the number of frames per unit time (for example, FPS (Frames Per Second)).

Therefore, when the user wishes to synchronize the motion of a CG model with predetermined content (for example, sound data such as music and sound/voice), the user himself/herself has to adjust the movement in each frame, in a delicate way, taking into account the duration of the playback time of the content. In particular, when dance CG is to be synchronized with content with a special focus on real-time performance such as live music performance, it is difficult to synchronize with slight changes in tempo during the performance, resulting in the problem of causing gaps.

In order to solve the above problem, the present inventors have studied a data structure for movement data (motion data) of a CG model that enables easy synchronization with sound data. As a result of this, the present inventors have come up with a new data structure that designates the movement of a CG model in chronological order on a tempo basis, thereupon arriving at the present invention. In particular, with the data structure according to an example of the present invention, motion data of a CG model can be configured per beat (in beat units), the actual duration of which in time varies with tempo, not in frame units or in real-time units. This makes it possible to easily adjust the time a CC model takes to move, in synchronization with sound data.

Furthermore, by combining data based on the data structure according to the present invention, it is possible to designate the movement of a CG model on a per beat basis, so that, compared with the conventional method of inputting the poses of a CG model one by one on a per frame basis, it becomes easy to make a CG movie in synchronization with the tempo of music and so on. Moreover, it is possible to easily synchronize the movement of a CG model not only with sound data, but also with sound/voice and other contents.

Note that the above data structure according to the present invention may be referred to as "choreography data format," "choreo data format," and so on. Also, data that is compatible with choreo data format such as data represented in choreo data format and data conforming to choreo data format (including, for example, frame-unit time-series data that can be converted into choreo data format) may be referred to as "choreo data," "dance choreo data" and so on.

Meanwhile, if various movements are simply combined, this may result in an unnatural CG movie. For example, when making a movie in which a CG model dances, it is very difficult to make a movie that looks like a dance unless the user understands the choreography of the dance.

Therefore, the present inventors have further studied how to make a CG character do choreography that looks like a dance, even if the user is unfamiliar with choreography, and focused on the importance of the "flow" per fixed period of time, not the pose in each frame. In addition, the present inventors have found out that this "flow" has the following elements (1) to (3) in many dances:

(1) The choreography is organized in sets of "eight" (8 beats);
(2) There is a certain "form"; and
(3) By connecting the "forms" and introducing changes, the dance is completed.

Each element will be explained in detail. Element (1) indicates that many choreographies are created in sets of 8 beats (one eight), or in sets of 32 beats (four eight), which is 8 beats×4. Element (2) indicates that there are basic forms, commonly referred to as "moves" (also referred to as "basic moves"), in every genre of dance. Element (3) means that dance is basically a series of movements, and that a dance is completed by making variations (also referred to as "variation moves"), such as swinging of arms, to moves, and making accents (also referred to as "accent motions"), such as turns, when the move changes.

Based on these points of view, the present inventors have found out a way to make a CG model dance properly in synchronization with sound data by using choreo data, taking "flows" into account. To be more specific, an application according to an example of the present invention designs moves in sets of eight by using choreo data, so that, even if the user is not used to making CG movies or dance choreography, the user can still edit and make CG dance movies at ease.

Now, embodiments of the present invention will be described below in detail with reference to the accompanying drawings.

<Information Processing System>

First, an information processing system, to which the present invention is applied, will be described. FIG. 1 is a diagram to show an example of a schematic structure of an information processing system according to an embodiment of the present invention. The information processing system 1 shown in FIG. 1 includes a user terminal 10, a server 20, an electronic musical instrument 30 and a network 40.

The user terminal 10, the server 20 and the electronic musical instrument 30 can be mutually connected via the network 40, and, using choreo data, perform processes (transmission/reception, conversion, movie making, display, etc.) related to a CG model.

The user terminal 10 may be a portable terminal (mobile communication terminal) such as a portable phone, a smartphone or a tablet-type terminal, or the user terminal 10 may be a stationary communication terminal such as a personal computer, a multi-function television or a set-top box (for example, Apple TV (registered trademark), Chromecast (registered trademark), etc.).

The server 20 is a device having a function of transmitting and/or receiving choreo data with the user terminal 10 and/or the electronic musical instrument 30. Note that this choreo data may be transmitted and received in response to a request from the user terminal 10 and/or the electronic musical instrument 30, or may be transmitted or received periodically at predetermined timings. Furthermore, the server 20 may transmit/receive the data (for example, movies and/or the like) generated using choreo data to/from the user terminal 10 and/or the electronic musical instrument 30.

The electronic musical instrument 30 is a device having a function of producing sounds to match performance information such as MIDI (Musical Instrument Digital Interface) data. For example, the electronic musical instrument 30 is an electronic piano, a synthesizer, etc., but is by no means limited to these.

The network 40 connects the devices so that information can be communicated. For example, the network 40 includes various networks such as the Internet, a mobile network, a LAN (Local Area Network), a WAN (Wide Area Network) and/or the like. Note that the network 40 may be configured wirelessly or may be configured by wire.

Note that this system configuration is an example, and is by no means limited to this. For example, although FIG. 1 shows a configuration, in which a plurality of user terminals 10, servers 20, and electronic musical instruments 30 are included, the number of each device is by no means limited to what is illustrated. Furthermore, the information processing system 1 may be configured not to include part of the user terminal 10, the server 20 and the electronic musical instrument 30. Also, even when the user terminal 10 and/or others are not connected to the network 40, a predetermined storage medium may be connected, and choreo data may be input/output via the storage medium.

Figure 2:
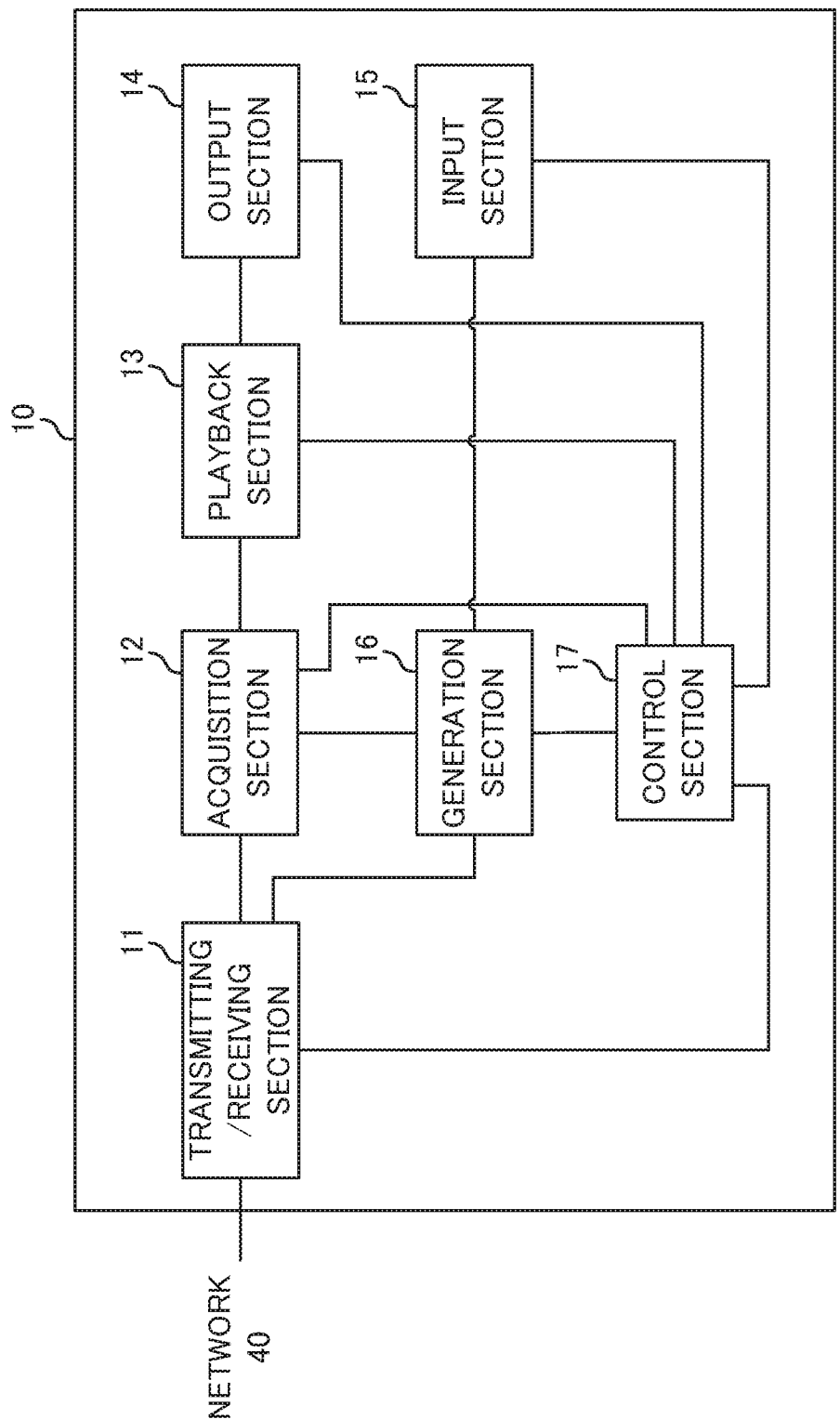
FIG. 2 is a diagram to show an example of a functional structure of a user terminal according to an embodiment of the present invention.

FIG. 2 is a diagram to show an example of a functional structure of a user terminal according to an embodiment of the present invention. As shown in FIG. 2, the user terminal 10 has a transmitting/receiving section 11, an acquisition section 12, a playback section 13, an output section 14, an input section 15, a generation section 16 and a control section 17. The user terminal 10 realizes an information processing method, which includes a step of performing information processing related to a CG model by using the data structure according to the present invention. Furthermore, the user terminal 10 can constitute a display device, a transmission device, a receiving device, a movie generating device, a data conversion device, a data generation device and so on, as the information processing device according to the present invention.

Note that FIG. 2 primarily shows functional blocks of characteristic parts in this embodiment, and the user terminal 10 may also have other functional blocks that are required in other processes. Also, the server 20 and the electronic musical instrument 30 may have all or part of the functional blocks shown in FIG. 2, or, like the user terminal 10, constitute an information processing device according to the present invention (display device, transmission device, receiving device, movie generating device, data conversion device, data generation device, etc.).

The transmitting/receiving section 11 transmits and receives choreo data and necessary information to and from other user terminals 10, the server 20 and the electronic musical instrument 30, via the network 40. The transmitting/receiving section 11 outputs the received choreo data to the acquisition section 12. In addition, the transmitting/receiving section 11 may output predetermined data (for example, a CG model's motion data) that is received, to the generation section 16. In addition, the transmitting/receiving section 11 outputs various pieces of information that are received, to the control section 17. The transmitting/receiving section 11 can be constituted by a transmitter/receiver, a transmitting/receiving circuit or a transmitting/receiving device that can be described based on common understanding of the technical field to which the present invention pertains. Note that the transmitting/receiving section 11 may be comprised of a transmission section 111 and a receiving section 112.

The acquisition section 12 acquires choreo data from the transmitting/receiving section 11 and/or the generation section 16. The acquisition section 12 outputs the acquired choreo data to the transmitting/receiving section 11 and/or the playback section 13.

The playback section 13 plays the data input from the acquisition section 12, and outputs this to the output section 14. For example, the playback section 13 interprets the choreo data and outputs a signal related to playback of a CG movie to the output section 14. In addition, the playback section 13 may play predetermined content (for example, sound data such as music and sound/voice), and output this to the output section 14. For example, if the content is sound data, the content is converted into a playback signal in a format that can be recognized by the output section 14, according to the audio file format of the content. The playback section 13 can be constituted by a player, an image/video/audio processing circuit, an image/video/audio processing device, an amplifier and so on that can be described based on common understanding of the technical field to which the present invention pertains.

The output section 14 outputs the playback signal of the content input from the playback section 13. The output section 14 may be comprised of a plurality of functional parts. For example, the output section 14 may be comprised of a display section for displaying visual data (for example, CG movie) and an audio output section for outputting sound data. The display section can be constituted by a display device such as a display, a monitor, etc., that can be described based on common understanding of the technical field to which the present invention pertains. The audio output section can also be constituted by an output device, such as a speaker, that can be described based on common understanding of the technical field to which the present invention pertains.

The input section 15 accepts an input to the user terminal 10 based on operation by the user, and outputs the input result to the control section 17. The input section 15 can be constituted by an input device, such as a keyboard, a mouse and so on, that can be described based on common understanding of the technical field to which the present invention pertains. Furthermore, the input section 15 may be configured to be integrated with the display section (for example, a touch panel).

Furthermore, the input section 15 may be connected with predetermined equipment or a storage medium, and accept an input of data. This input result is output to the control section 17 and the generation section 16. In this case, the input section 15 can be configured to include an input/output terminal, an input/output circuit and so on that can be described based on common understanding of the technical field to which the present invention pertains.

The generation section 16 generates choreo data by using the data input from the transmission/receiving section 11, the input section 15, and so on. The generated choreo data is output to the transmitting/receiving section 11 and the acquisition section 12. The generation section 16 can be constituted by an arithmetic unit, an arithmetic circuit, an arithmetic unit and so on that can be described based on common understanding of the technical field to which the present invention pertains.

The control section 17 controls the whole of the user terminal 10. For example, the control section 17 may control the timing at which the acquisition section 12 acquires or outputs choreo data. Furthermore, the control section 17 may perform control so that choreo data that is generated in the generation section 16 is stored in the user terminal 10. The control section 17 can be constituted by a controller, a control circuit or a control device that can be described based on common understanding of the technical field to which the present invention pertains.

Below, an example of the information processing device according to the present invention will be described in greater detail. Here, the configuration will be explained using the functional blocks shown in FIG. 2.

A display device according to an embodiment of the present invention includes an acquisition section 12, a playback section 13, an output section 14 and a control section 17. With this display device, for example, the playback section 13 can play a CG movie by using choreo data and display this via the output section 14, in synchronization with the music that is played by the playback section 13 and output from the output section 14. Note that the display section of the display device according to an embodiment of the present invention can be constituted by the playback section 13 and the output section 14.

A transmission device according to an embodiment of the present invention has a transmission section 111, an acquisition section 12 and a control section 17. A receiving device according to an embodiment of the present invention has a receiving section 112, an acquisition section 12 and a control section 17. With these transmission device and receiving device, signals that contain choreo data can be transmitted and received, so that it is possible to exchange choreo data easily.

A movie generating device according to an embodiment of the present invention has an acquisition section 12, a playback section 13 and a control section 17. With this movie generating device, it is possible to generate a CG movie that is synchronized with sound data by using choreo data, so that this CG movie can be played even on devices that do not use choreo data. Note that the generation section of the movie generating device according to the embodiment of the present invention can be constituted by the playback section 13.

A data conversion device according to an embodiment of the present invention has an acquisition section 12, a generation section 16 and a control section 17. With this data conversion device, it is possible to convert existing motion data (for example, data that is acquired by the motion capture system) and the like into choreo data, so that it is possible to make choreo data easily. Note that the detection section, the sampling section and the selection section of the data conversion device according to an embodiment of the present invention can be constituted by the generation section 16.

A data generation device according to an embodiment of the present invention has an acquisition section 12, a playback section 13, an output section 14, an input section 15, a generation section 16 and a control section 17. With this data generation device, for example, the control section 17 executes an application, the input section 15 accepts the user's input, and the control section 17 controls each functional block (the playback section 13, the output section 14, etc.) in accordance with the input, so that it is possible to generate new choreo data and CG movies from combinations of choreo data. Note that the selection section of the data generation device according to an embodiment of the present invention can be constituted by the input section 15 and/or the control section 17.

Note that the block diagrams that have been used to describe the above embodiment show blocks in functional parts. These functional blocks (components) may be implemented in arbitrary combinations of hardware and software. Also, the means for implementing each functional block is not particularly limited. That is, each functional block may be implemented with one physically integrated device, or may be implemented by connecting two physically separate devices via radio or wire and by using these multiple devices.

For example, part or all of the functions of the user terminal 10 and the server 20 may be implemented by using hardware such as an ASIC (Application-Specific Integrated Circuit), a PLD (Programmable Logic Device), an FPGA (Field Programmable Gate Array) and so on. Also, the user terminal 10 and the server 20 may be implemented with a computer device that includes a processor (CPU: Central Processing Unit), a communication interface for connecting with networks, a memory and a computer-readable storage medium that holds programs. That is, the user terminal, the server and so on according to an embodiment of the present invention may function as a computer that performs processes related to a CG model, by using the data structure (choreo data) according to the present invention.

Here, the processor, the memory and/or others are connected with buses for communicating information. Also, the computer-readable recording medium is a storage medium such as, for example, a flexible disk, an opto-magnetic disk, a ROM (Read Only Memory), an EPROM (Erasable Programmable ROM), a CD-ROM (Compact Disc-ROM), a RAM (Random Access Memory), a hard disk and so on. Also, the programs may be transmitted from the network 40 through, for example, electric communication channels.

The functional structures of the user terminal 10 and the server 20 may be implemented with the above-described hardware, may be implemented with software modules that are executed on the processor, or may be implemented with combinations of both. The processor controls the whole of the user terminals by running an operating system. Also, the processor reads programs, software modules and data from the storage medium into the memory, and executes various types of processes.

Here, the programs may only be programs that cause a computer to execute information processing related to a CG model using the data structure according to the present invention. For example, the control section 17 of the user terminals 10 may be stored in the memory and implemented by a control program that operates on the processor, and other functional blocks may be implemented likewise.

With the present invention, each device such as described above uses choreo data. Below, choreo data format will be described first, and then making of choreo data and making of CG movies using choreo data will be explained.

<Choreo Data Format>

The choreo data format according to the present invention is a data format including time-series information for specifying the coordinates of a CG model's components in chronological order, in units of beats. Note that the "units of beats" refer to units that can be specified based on "beats," and include not only the unit of 1 beat, but also fractional beat units such as ⅛-beat units and multiple-beat units such as 2-beat units.

As mentioned above, the present inventors have worked on movement data of a CG model that can be easily synchronized with sound data. As a result of contemplating the reproducibility of movements, the amount of data and cooperation with other systems, the present inventors have found out that the format for saving information of the performance of electronic musical instruments is suitable for representing a data structure in beat units, and thereupon arrived at the choreo data format according to the present invention.

Before the specific format will be described in detail, first, the method of representing CG models will be described. In the present specification, example cases will be described, in which a skeleton model having a skeleton structure (articulated structure) is used as a CG model, but the CG model to which the present invention can be applied is by no means limited to this.

Figure 3B:
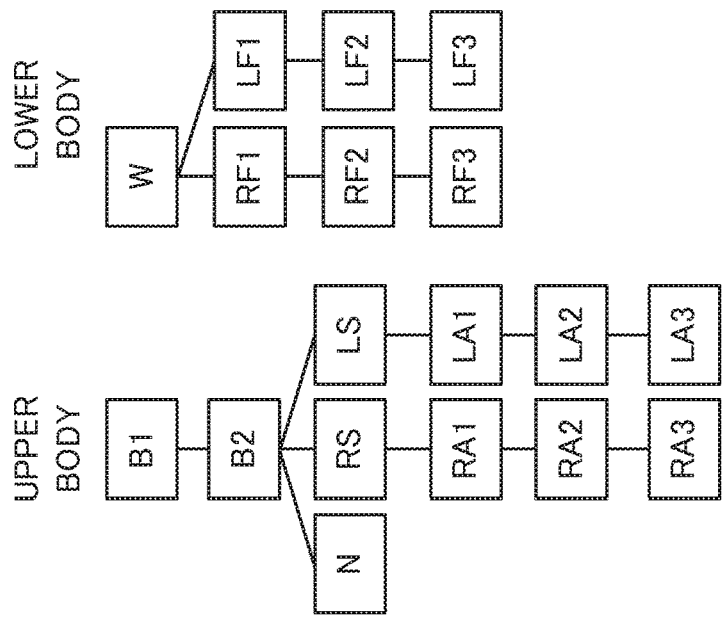
FIGS. 3A and 3B provide diagrams, each showing an example of a skeleton model having a skeleton structure (articulated structure)
Figure 3A:
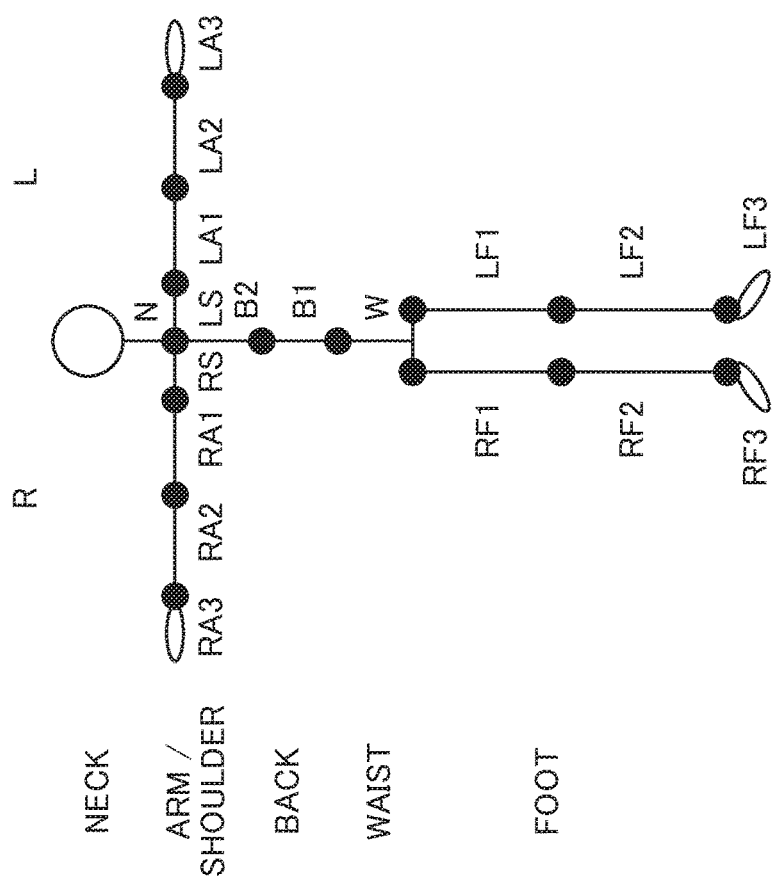

FIG. 3 is a diagram to show an example of a skeleton model having a skeleton structure (articulated structure). FIG. 3A shows each component and a reference posture of the skeleton model, and FIG. 3B shows the relationships between the components of the skeleton model. Note that the example shown in FIG. 3 is simply a basic configuration, and other additional structures (for example, skin, fingers, hair, costume, hat, stick, etc.) may be provided as well.

The model shown in FIG. 3A is comprised of a plurality of skeletons, where each skeleton is comprised of two joint points and bones connecting between them. "N," "RS," and others in FIG. 3A are the names of bones, and, in this example, 18 bones are shown.

Generally, a skeleton model is configured so that a certain joint point serves as a reference point (root), and the bones connected via each joint form a hierarchical structure. For example, the hierarchical structure of FIG. 3A can be represented as FIG. 3B. In the case of FIG. 3, the joint point between B1 and W is the root. Also, when comparing between joint points and/or bones, one that is closer to the root is called a "parent," and one that is farther from the root is called a "child."

When a CG model is placed in three-dimensional space, the model is modeled on the coordinate system (local coordinate system) for the model based on the location of the root. Then, the modeled CG model is mapped onto the coordinate system representing the whole three-dimensional space (the world coordinate system, the global coordinate system, etc.).

The coordinates of the components (joint points, bones, etc.) may be expressed as absolute coordinates or relative coordinates in three-dimensional space, or may be expressed as relative angles of predetermined bones with reference to a predetermine joint point. For example, when the coordinates are represented using the relative angles of bones, the reference posture of the CG model may be made a posture to resemble the letter T, as shown in FIG. 3A, or the angle of each bone in the posture may be made 0°.

Note that the hierarchical structure and the position of the root are not limited to the examples of FIG. 3. For example, the location of the root may be between both feet (between RF 3 and LF 3). In addition, the coordinates and/or the angle of each component may be calculated using forward kinematics, in which calculations are made in order from the root to the end. The coordinates and/or the angle of each component may be calculated using inverse kinematics, in which the position of a parent is inversely calculated from the position of a child, may be calculated using a combination of these, or may be calculated using other methods. Furthermore, in the skeleton structure, not only the above hierarchical structure, but also the initial state of the hierarchical structure, the length of each bone, the movable range of each joint and so on may be set.

<SMF Format and Choreo Data Format>

As described above, it is preferable that the choreo data format according to an example of the present invention conform to the format for saving information of the performance of electronic musical instruments. In particular, MIDI data save format, which is widely popular, is preferable. Next, an outline of SMF (Standard MIDI File) format, which is one of MIDI data save formats, will be explained, and choreo data format conforming to SMF format will be explained.

SMF format is comprised of a header chunk, which contains predetermined control information, and a track chunk, which contains performance data. The performance data is comprised of combinations of delta times and MIDI events. Here, a delta time represents the time until the next MIDI event occurs. Also, an MIDI event represents performance content, such as, for example, "note-on" (producing sound), "note-off" (stopping sound) and so on.

Figure 4:
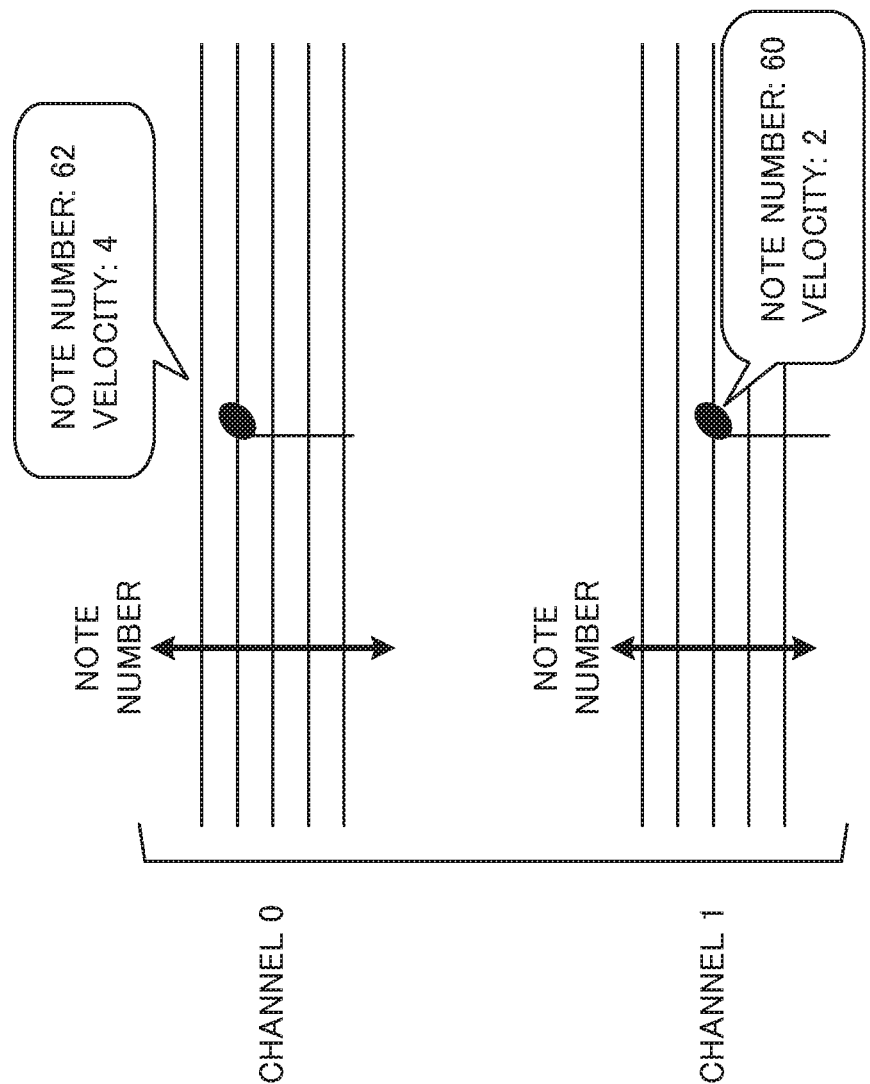
FIG. 4 is a diagram to explain the concept of note-on signals.

A note-on signal is a signal to indicate that a specific sound is going to be produced after the corresponding delta time is over. A note-on signal can be represented as, for example, "9n kk vv" in hexadecimal, which is 3 bytes, and which means that "the sound of note number kk is produced with velocity vv in channel n." FIG. 4 is a diagram to explain the concept of note-on signals. As shown in FIG. 4, the channel is the part in the score (the part in which a predetermined instrument is played), the note number is the pitch of the sound, and the velocity is the speed (strength) the instrument (keyboard) is hit.

A note-off signal is a signal to indicate that a specific sound is going to be silenced after the corresponding delta time is over. A note-off signal can be represented as, for example, "8n kk vv" in hexadecimal, which is 3 bytes, and which means that "the sound of note number kk is silenced with velocity vv in channel n."

The note number and the velocity both can assume values between 0 and 127 in decimal. Note that the note-on signal "9n kk 00" with a velocity of 0 carries the same meaning as that of a note-off signal that "silences the sound of note number kk in channel n."

The note-on signals corresponding to quarter notes, shown in channel 0 and channel 1 in FIG. 4, can be represented as "90 3E 04" and "91 3C 02," respectively.

In one example of the present invention, each channel is handled as information about the coordinates of one component of a CG model. That is, the choreo data format may be comprised of a plurality of pieces of time-series information of beat units about the coordinates of a CG model's components. Here, the information about the coordinates of components (for example, bones, joint points, etc.) may be, for example, information about the absolute coordinates or relative coordinates of components, or may be represented as relative angles of components (for example, bones).

The note number and/or the velocity of note-on signals can be used as information about the coordinates of a CG model's components. In this case, at a given timing, the angle and/or the coordinates of a particular axis of a given component can be acquired from the note-on signal that is placed at the beat corresponding to that timing. Also, the delta time of a note-on signal and/or a note-off signal may also be used as information about the duration of beats where the coordinates of a CG model's components change.

For example, the delta time corresponding to a note-off signal may indicate the duration of beats the angle (or coordinates) that is calculated from the note-on signal immediately before the note-off signal takes to transition to an angle (or coordinates) that is calculated from the note-on signal immediately after the note-off signal. The angle and/or coordinates of a predetermined component linked with each note may transition based on predetermined rules. For example, the speed and acceleration during transitions may be determined and used based on a given interpolation method (described later). Note that the delta time is preferably given in positive numbers.

The note-on/off signal is the most frequently used signal in SMF format, and allow high-speed processing in MIDI-compatible electronic instruments and/or the like.

In a note-on signal, the coordinates or angle may be roughly specified from the note number in comparatively a large unit, and the coordinates or angle may be specified more accurately from the velocity in comparatively a small unit. For example, if a note-on signal in a given channel indicates an angle in a specific axial direction (for example, the x-axis relative angle), this angle θ may be calculated based on equation 1 below:

$$\theta = (N - N_0) \times \theta_N + (V - V_0) \times \theta_V \quad \text{(Equation 1)}$$

where N is the note number, $N_0$ is the reference note number, $\theta_N$ is the amount of increase in angle per increment of the note number, V is the velocity, $V_0$ is the reference velocity and $\theta_V$ is the amount of increase in angle per increment of velocity.

For example, $N_0$ may be 60 (corresponding to the sound "C" (do) in the center of the keyboard), $V_0$ may be 1, $\theta_N$ may be 5° and $\theta_V$ may be 0.05°. Note that $N_0$, $V_0$, $\theta_N$, $\theta_V$ and/or others are not limited to the above values.

Also, when a note-on signal in a given channel shows coordinates in a specific axial direction, the coordinate position P may be calculated based on equation 2 below:

$$P = (N - N_0) \times P_N + (V - V_0) \times P_V \quad \text{(Equation 2)}$$

where N is the note number, $N_0$ is the reference note number, $P_N$ is the amount of increase in coordinates per increment of the note number, V is the velocity, $V_0$ is the reference velocity and $P_V$ is the amount of increase in coordinates per increment of velocity.

For example, $N_0$ may be 60 (corresponding to the sound "C" (do) in the center of the keyboard), $V_0$ may be 1, $P_N$ may be 64 cm and $P_V$ may be 0.5 cm. Also, it is equally possible to make $P_N$ 127 cm and $\theta_V$ 1 cm. However, $N_0$, $V_0$, $P_N$, $P_V$ and/or others are not limited to the above values.

Also, by contrast to the above, the coordinates or angle may be roughly determined from the velocity in comparatively a large unit, and the coordinates or angle may be specified more accurately from the note number in comparatively a small unit. Furthermore, information about the coordinates of a CG model's components may be specified using signals other than note-on/off signals, such as system-exclusive events.

The information about the coordinates of components can be classified into, for example, position information and pose information. The position information is information that indicates the relative position of a CG model from the initial position (for example, the position at the beginning of a CG movie), and may be represented by, for example, the x-axis coordinate, the y-axis coordinate and the z-axis coordinate of the reference point of the CG model, and the rotation angle of the reference point (root). Furthermore, the pose information is information that indicates angles or positions based on the reference posture of the CG model, and, for example, assuming that the posture of the letter T shown in FIG. 3A is 0°, a number of specific bones may be represented by the x-axis relative angle, the y-axis relative angle and the z-axis relative angle between parent bones and child bones.

To which channel the information of the coordinates of each component (for example, bone) is assigned can be appropriately selected according to the operation mode of the system and so on. When information about the coordinates of one component is assigned per channel, the number of channels required to represent a CG model is 58 channels, assuming that the number of designated bones is 18. To be more specific, 54 channels (18 (the number of bones)×3 (the number of axes)) are required for the pose information, and 4 channels (3 (position coordinates)+1 (position reference angle)) are required for the position information. Since an MIDI port can contain 16 channels, if there are 4 MIDI ports, it is possible to represent the coordinates and postures of a CG model consisting of 18 bones. In addition, to represent the facial expression and fingertips of the CG model, additional channels are required, and the number of MIDI ports to be required also increases.

Meanwhile, a plurality of pieces of information about the coordinates of components may be assigned per channel. For example, it is possible to adopt a configuration in which the x-axis relative angle, the y-axis relative angle and the z-axis relative angle of a predetermined bone are represented with one channel. In this case, for example, it is possible to divide the note number into three, make comparatively a small note number (for example, 0 to 42) the x-axis relative angle, make comparatively a middle note number (for example, 43 to 85) the y-axis relative angle and make comparatively a large note number (for example, 86 to 127) the z-axis relative angle. Note that the method of assignment is by no means limited to this.

Also, the SMF format to which choreo data format conforms is not particularly limited. For example, it is possible to use format 0, in which information of all channels is contained in one track, use format 1, which is comprised of multiple tracks, or use format 2. In addition, new formats other than existing formats 0 to 2 may be used. Furthermore, choreo data format is by no means limited to SMF format as long as it carries information for designating the coordinates of a CG model's components in chronological order, on a per beat basis.

Figure 5:
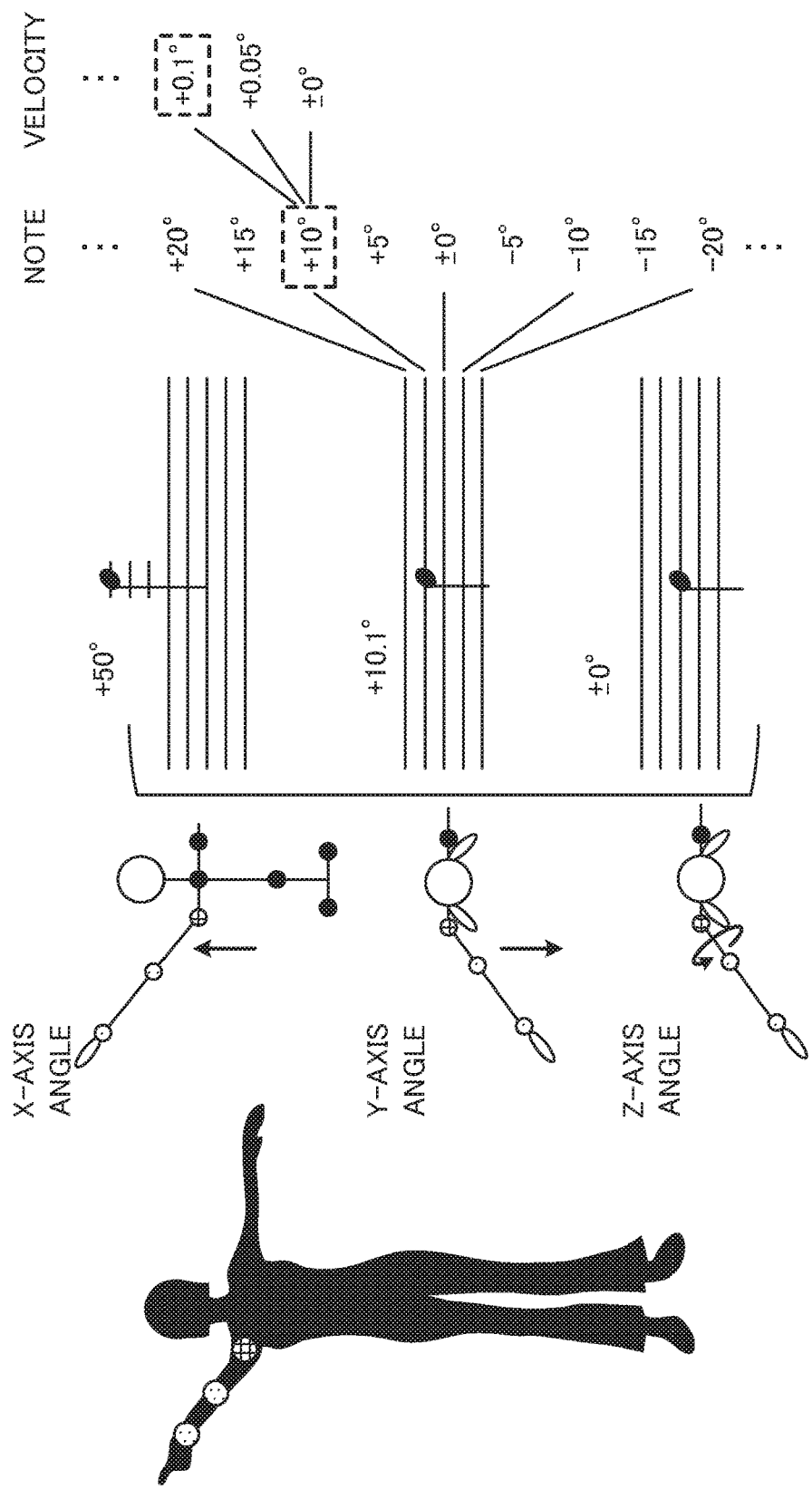
FIG. 5 is a diagram to show examples of relationships between channel-specific note-on signals and predetermined components in the data structure of the present invention.

FIG. 5 is a diagram to show examples of relationships between channel-specific note-on signals and predetermined components in the data structure of the present invention. As described above, in a skeleton model according to an embodiment, the angle of each joint (or bone) is represented by three elements—namely, the x-axis angle, the y-axis angle and the z-axis angle. In FIG. 5, pieces of information that represent the x-axis angle, the y-axis angle and the z-axis angle of the bone of "RA 1" part shown in FIG. 3A are assigned to mutually different channels. Note that the directions indicated by the x-axis angle, the y-axis angle and the z-axis angle in FIG. 5A are examples, and are not limited to these. Also, assume that the note number corresponding to the center line in the staff shown in FIG. 5 is 60 in decimal, and that, in equation 1, $N_0$ is 60, $V_0$ is 1, $\theta_N$ is 5° and $\theta_V$ is 0.05°.

In FIG. 5, the note-on signal of the channel corresponding to the x-axis angle has a note number of 70 in decimal and a velocity of 1. Therefore, according to equation 1, the x-axis angle is +50°. Also, the note-on signal of the channel corresponding to the y-axis angle, the note number is 62 and the velocity is 3. Therefore, according to equation 1, the y-axis angle is +10.1°. Also, the note-on signal of the channel corresponding to the z-axis angle has a note number of 60 and a velocity of 1. Therefore, according to equation 1, the z-axis angle is 0°.

Figure 6:
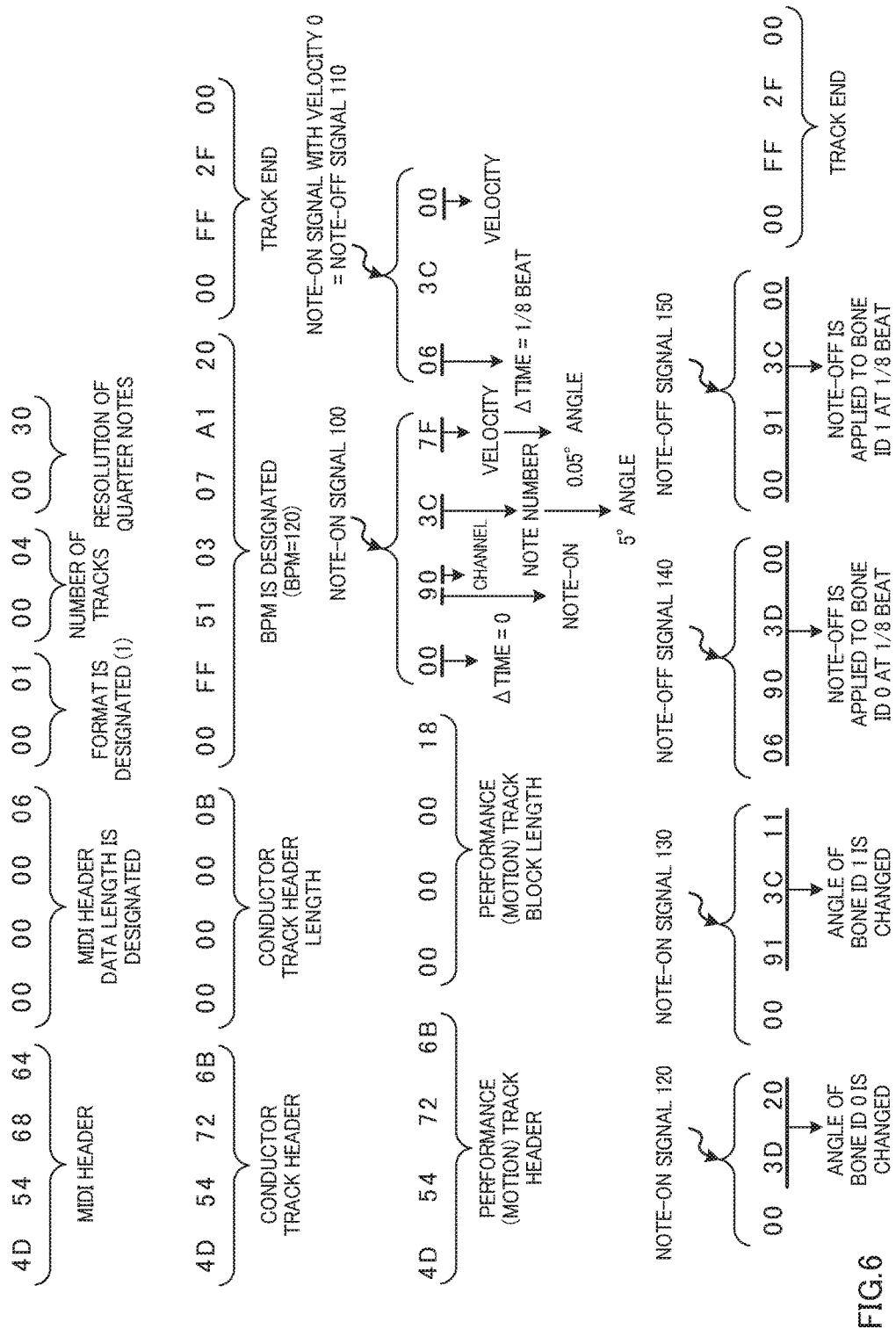
FIG. 6 is a diagram to show a specific example of data conforming to choreo data format according to the present invention.

FIG. 6 is a diagram to show a specific example of data conforming to choreo data format according to the present invention. FIG. 6 shows data sequences in bytes and the corresponding information. Note that, although FIG. 6 shows data sequences across a plurality of rows, the data is in fact continuous data. The choreo data format of FIG. 6 conforms to SMF format 1, but this is by no means limiting.

The data sequence of the first row in FIG. 6 corresponds to the MIDI header. Here, the resolution of quarter notes is set to 48. The data sequence of the second row in FIG. 6 corresponds to the conductor track. Generally, the tempo is specified by the conductor track using the unit of BPM (Beats Per Minute). In FIG. 6, BPM is set to 120. The data sequences of the third and fourth rows in FIG. 6 correspond to normal tracks (performance tracks).

The note-on signal 100 commands that the sound of note number 3C and velocity 7F start being produced in channel 0 (which, for example, corresponds to the x-axis angle of bone ID 0). The note-on signal 100 is terminated by the corresponding note-off signal 110. Furthermore, the delta time of the note-off signal 110 is 6 (which corresponds to a ⅛ beat). This indicates that the time it takes for the angle indicated by the note-on signal 100 to transition to the angle indicated by the next note-on signal (note-on signal 120) is a ⅛ beat.

Also, if signals of the same channel continue, the second and subsequent status bytes can be skipped using the running status (note-on signals 110 and 120). The note-on signal 130 contains information about another channel (channel 1). Also, the note-off signals 140 and 150 correspond to the note-on signals 120 and 130, respectively.

As described above, the choreo data format according to the present invention is compatible with, for example, SMF format, and includes time-series information (repetitions of note-on/off signals) for specifying the coordinates of a CG model's components in chronological order, on a per beat basis, for each channel in MIDI. By allowing the data structure to have SMF format, it becomes easy to link the movement of the CG model with other equipment or systems such as electronic musical instruments.

<Generation of Motion Data Conforming to Choreo Data Format>

Figure 7:
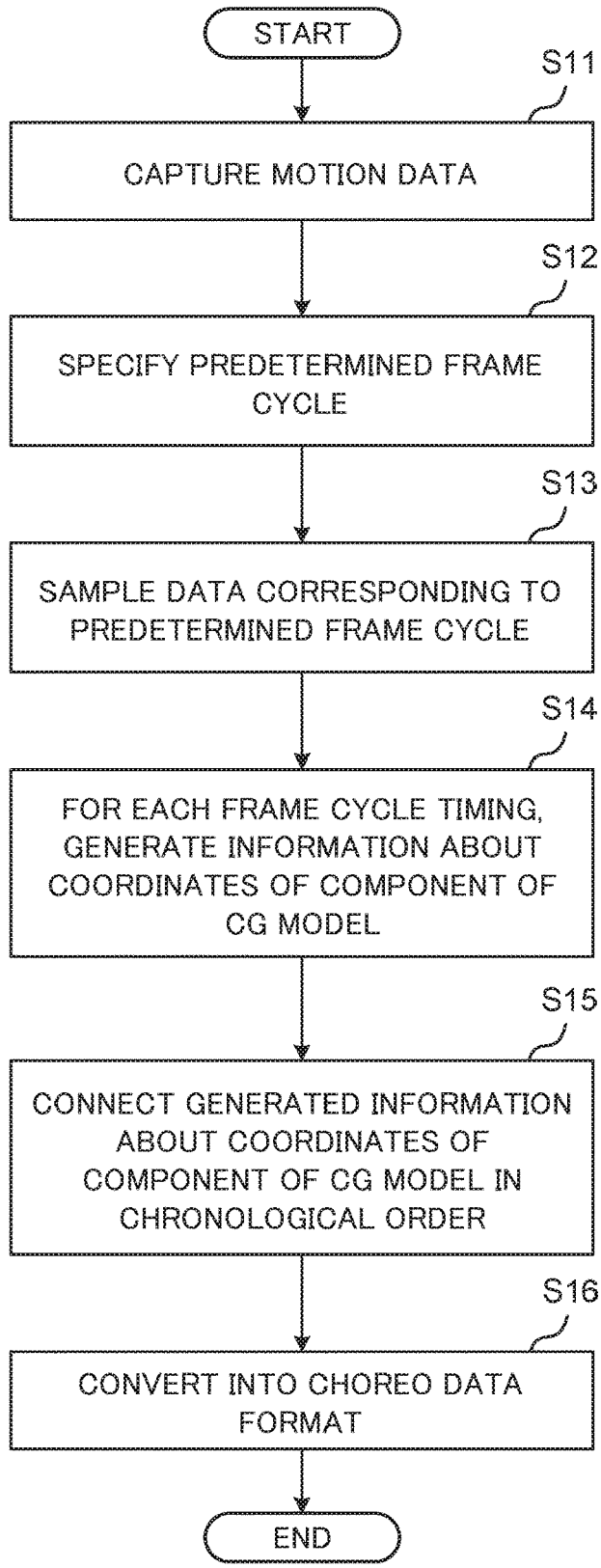
FIG. 7 is a diagram to show an example flow of making motion data according to choreo data format.

FIG. 7 is a diagram to show an example flow of making motion data according to choreo data format. Note that, in the example shown in FIG. 7, choreo data is generated based on motion data (motion data in frame units) that contains time-series information for designating the coordinates of a CG model's components in chronological order, on a per frame basis, but this is by no means limiting. For example, choreo data may be generated based on motion data (motion data in beat units) containing time-series information for designating the coordinates of a CG model's components in chronological order, on a per beat basis.

As an embodiment of the flow of FIG. 7, the process to be performed in each functional block shown in FIG. 2 will be described in specific details. Here, although each functional block in the user terminal 10 will be described as examples, if, as mentioned earlier, the server 20 or the like also has each functional block of FIG. 2, the same process may be performed.

Now, referring to the flow of FIG. 7, first, motion data is captured (step S11). This motion data may be, for example, data that is acquired by the motion capture system, or CG data (for example, fbx format, vmd format, etc.) that is output from 3D CG-compliant software. To be more specific, in step S11, the generation section 16 captures motion data that is received in the transmitting/receiving section 11 or motion data that is entered from the input section 15.

Next, a predetermined frame cycle for use for sampling the above motion data will be specified (step S12). The predetermined frame cycle can be specified based on a predetermined tempo (for example, BPM). For example, the predetermined frame cycle may be a cycle corresponding to the duration of a given beat at a predetermined tempo (for example, the duration of one beat, the duration of a ⅛ beat, etc.). Furthermore, this predetermined frame cycle can be calculated by multiplying the duration of the beat by the number of frames per unit time (for example, FPS (Frames Per Second)).

In step S12, the predetermined tempo may be, for example, a tempo that is detected from the motion data, a tempo that is detected from another piece of data (for example, music data) played in synchronization with the motion data, or a tempo that is set from outside or that is set in advance.

To be more specific, in step S12, the generation section 16 calculates the FPS of the motion data captured in step S11. In addition, the generation section 16 calculates a predetermined frame cycle based on this FPS and the reference BPM of the choreo data format (for example, BPM 120).

Figure 8:
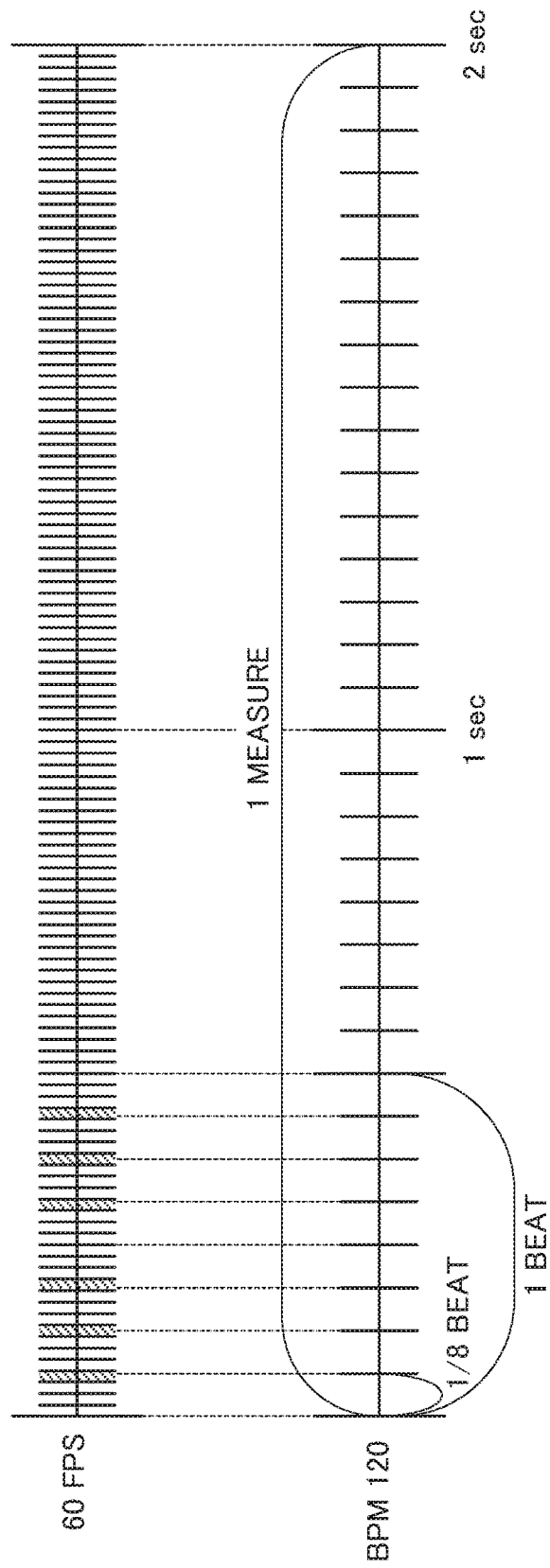
FIG. 8 is a diagram to explain the concepts of steps S12 and S13 in FIG. 7.

FIG. 8 is a diagram to explain the concepts of steps S12 and S13 in FIG. 7. FIG. 8 shows an example of a case of sampling motion data of 60 FPS at ⅛-beat intervals of BPM 120, where the lower side (the data to be sampled in step S13) is sampled from the upper part (the motion data captured in step S11).

In this case, the generation section 16 calculates the number of seconds corresponding to a ⅛ beat at BPM 120 and acquires: 60 (seconds)/120 (BPM)×⅛=1/16 (second). Then, the generation section 16 converts this duration of a beat to a duration of frames, and acquires: 1/16 (seconds)×60 (FPS)=3.75 (frames). That is, the cycle of sampling motion data can be calculated as an interval of 3.75 frames.

After a predetermined frame cycle is specified, the data corresponding to each timing in the predetermined frame cycle is sampled from the time-series information contained in motion data (step S13). The timings where data is sampled can be calculated based on a specific time (for example, the first frame) in the time-series information contained in the motion data.

When the data of a frame corresponding to a timing where data is sampled is contained in motion data, this data can be sampled on an as-is basis. On the other hand, if the data of a frame corresponding to a timing to sample data is not contained in motion data, the data may be sampled based on the data of a frame near that timing.

For example, as shown in FIG. 8, when motion data contains only the data of integer frames, there may be no data that corresponds to the timings of a non-integer frame cycle, such as a cycle of 3.75 frames. Here, a case will be considered in which the timings to sample data correspond to multiples of a non-integer frame cycle F. In this case, the value interpolated based on following equation 3 can be used as data $D_n$ that corresponds to a non-existent virtual frame n (=multiple of F).

$$D_n = D_{\lfloor n \rfloor} \cdot (\lceil n \rceil - n) + D_{\lceil n \rceil} \cdot (n - \lfloor n \rfloor) \quad \text{(Equation 3)}$$

where $\lfloor x \rfloor$ is the floor function of x, $\lceil x \rceil$ is the ceil function of x, and $D_x$ is the data in frame x. For example, when n=3.75, $\lfloor n \rfloor$=3 and $\lceil n \rceil$=4 hold.

To be more specific, in step S13, the generation section 16 samples the motion data of step S11 in each frame that corresponds to a multiple of F, based on the frame cycle F calculated in step S12. In the case of FIG. 8, although interpolation is not necessary in frames that correspond to 8/4 beats or 8/8 beats, in other beats (parts hatched with diagonal lines), interpolation needs to be made as in equation 3. For example, in the virtual frame n=3.75, the following equation can be used:

$$D_{3.75} = D_3 \times 0.25 + D_4 \times 0.75$$

According to this equation, the data of frames before and after the timing of a beat corresponding to a virtual frame are linear-interpolated and can be used as the value of the virtual frame. Note that, similar interpolation may be applied to timings in a non-integer frame cycle (for example, 7.5 (=3.75×2) frames). Note that the interpolation method is by no means limited to linear interpolation. Furthermore, the frames to use for interpolation are not limited to one preceding frame and one following frame, and it is equally possible to use multiple preceding/following frames, multiple preceding frames, and so on.

When motion data in beat units is captured in step S11, a step of sampling data corresponding to a predetermined beat cycle may be executed instead of steps S12 and S13.

Next, with respect to the sampled data, corresponding to respective timings, information about the coordinates of a CG model's components is generated (step S14). A specific pose is formed based on data that corresponds to a certain timing.

To be more specific, in step S14, the generation section 16 generates pose information with respect to the sampled data, corresponding to respective timings, in the following steps. First, a predetermined number of designated bones are selected from this data (step S141). For example, as shown in FIG. 3, 18 bones may be selected, or combinations of other bones may be selected.

For each designated bone, three relative angles (x, y and z-axis angles) are sampled in order to specify relative positions (step S142). Then, for each relative angle, rounding is performed using a pre-defined minimum unit (for example, 0.05°) as the level of approximation (step S143). Each relative angle after the rounding of step S143 is pose information.

Meanwhile, for the sampled data corresponding to each timing, position information is generated following the steps below. First, whether the position of the CG model indicated with this data has moved from the initial position is detected (step S144). Then, when it is detected that the position has moved (step S144: YES), information to indicate the relative position of the CG model with respect to the initial position is specified (step S145). For example, the x-axis relative coordinate, the y-axis relative coordinate and the z-axis relative coordinate from the initial position of the reference point (root) of the CG model and the rotation angle of the reference point, are sampled. Note that step S145 may be performed without performing step S144.

Then, for each coordinate and angle, rounding is performed using a pre-defined minimum unit (for example, 0.5 cm in case of coordinates and 0.05° in case of angle) as the level of approximation (step S146). Each coordinate and angle after the rounding of step S146 serves as position information.

Each data generated in step S14 is grouped in chronological order, and choreo data is generated (step S15). Also, the choreo data is converted to choreo data format (step S16). Note that the choreo data may be stored as frame-unit time-series information, in step S15, and step S16 may be omitted. Also, conversion to choreo data format may be performed by performing step S16 on the frame-unit time-series information that is stored.

To be more specific, in step S15, the generation section 16 gathers data in chronological order and generates choreo data. In addition, in step S16, the generation section 16 converts the information about the coordinates of a CG model's components into choreo data format, in association with the note-on/off signals of each channel, so as to be in compliance with SMF format 1 as shown in FIG. 6.

The data generated in step S15 and/or the data conforming to choreo data format converted in step S16 may be saved. For example, the control section 17 may control the generation section 16 to store the choreo data that is generated. This makes it possible to save the movement of the CG model in a format that can be easily synchronized with sound data.

Note that the processes of step S14 and/or S15 need not be performed on the data corresponding to all timings sampled in step S13. For example, the generation section 16 may select a given frame period with respect to the motion data captured in step S11, and generate choreo data only with respect the data in this frame period. To be more specific, it is preferable that the given frame period has a duration to match eight beats at a predetermined tempo, used in step S12. Choreo data that is eight beats long corresponds to choreo data that takes "flow" in consideration, as mentioned earlier, and is suitable for editing CG movies in one-eight units (described later).

As the choreo data, data that carries pose information, which corresponds to three specific angles of a predetermined number of designated bones, and position information, which consists of four axes, for every frame cycle corresponding to a predetermined duration of beats, is preferable.

Figure 9:
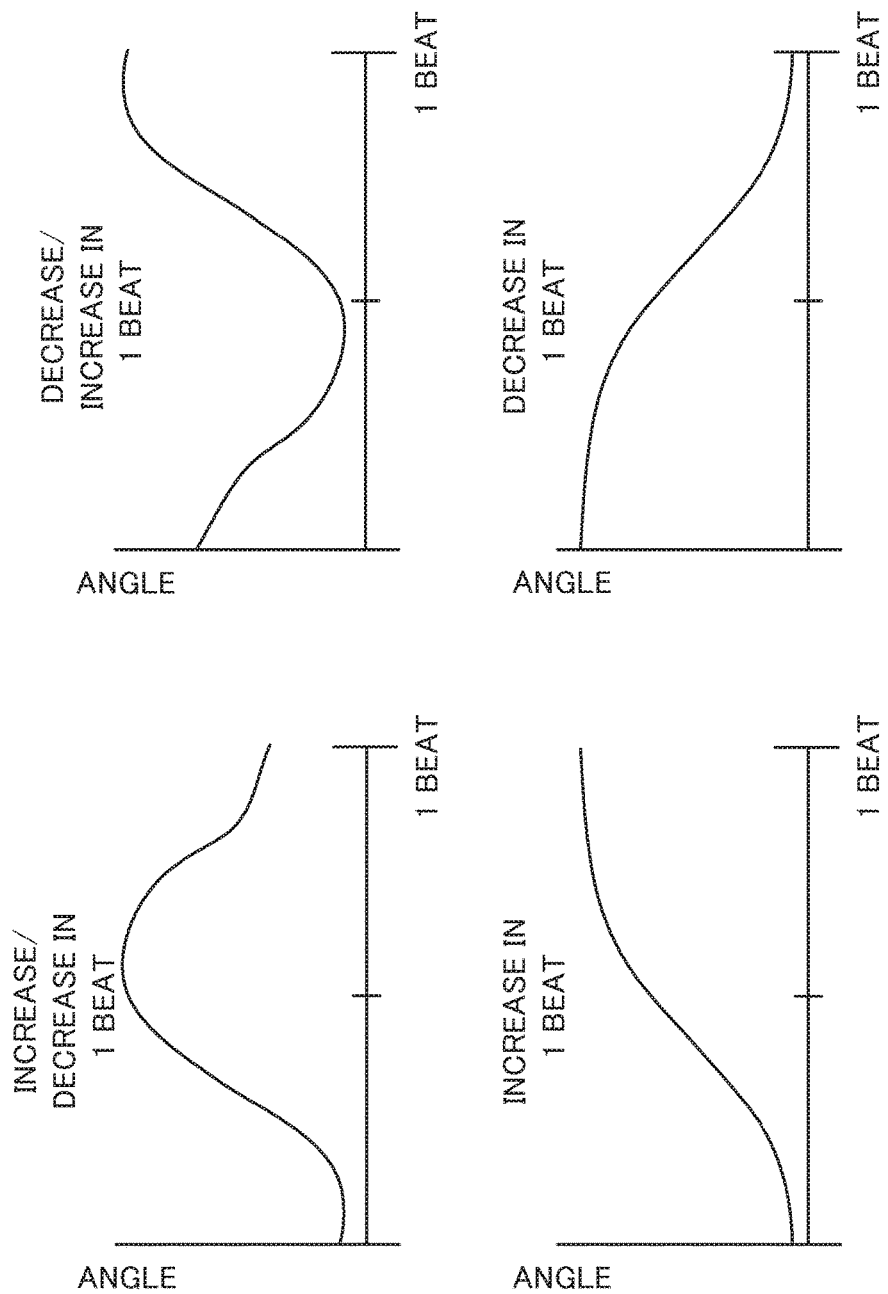
FIG. 9 is a diagram to show examples of typical patterns of angular changes in one beat.
Figure 10:
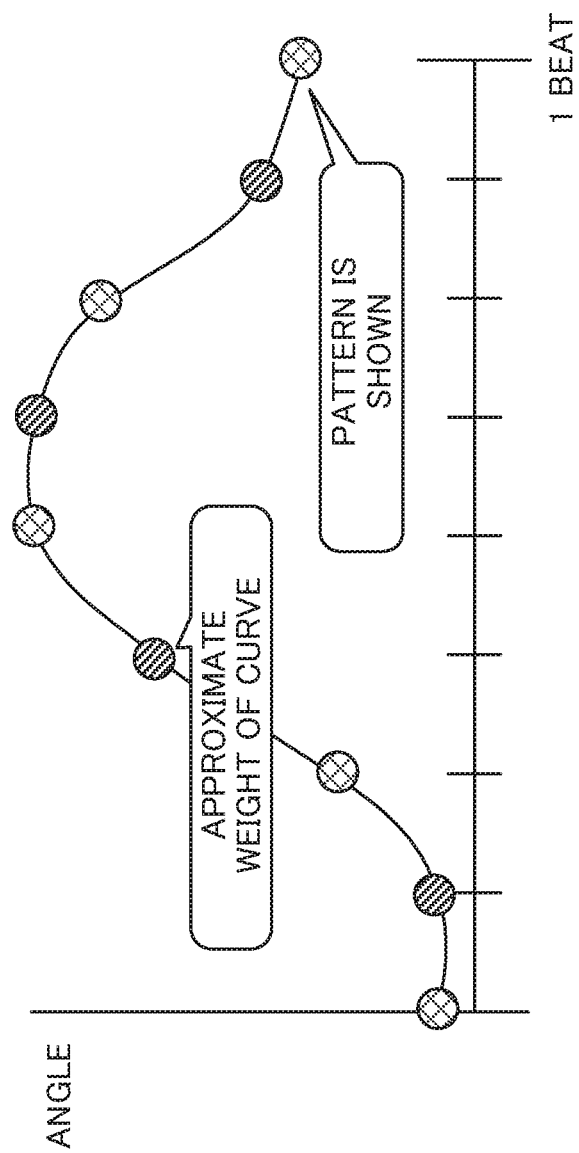
FIG. 10 is a diagram to show an example of sampling each ⅛ beat in one beat.

To be more specific, it is preferable to hold information per 1/8 beat, as choreo data. The reason for this will be explained using FIGS. 9 and 10. FIG. 9 provides diagrams that show examples of typical patterns of angular changes in one beat, and FIG. 10 is a diagram to show an example of sampling each ⅛ beat in one beat.

The present inventors have focused on the fact that most changes in the movement (for example, the angle) of components of living organisms (for example, humans, animals, etc.), when seen in beat units, can be represented by one of the patterns of increase/decrease, decrease/increase, monotonous increase and monotonous decrease, as shown in FIG. 9. Also, as a result of considering this point of interest, the present inventors have found out that, by sampling eight points in one beat, as shown in FIG. 10, the pattern of change in movement can be identified and the shape of the transition curve of movement can be roughly reproduced, and thereupon arrived at the idea of holding the information, as choreo data, in ⅛ beat units.

Note that the time-series information to be included as choreo data is by no means limited to the ⅛ beat unit, and may be increased or decreased as appropriate, considering the tradeoff between the amount of data and the reproducibility of original motion data.

<CG Model Display Flow Using Data Conforming to Choreo Data Format>

Figure 11:
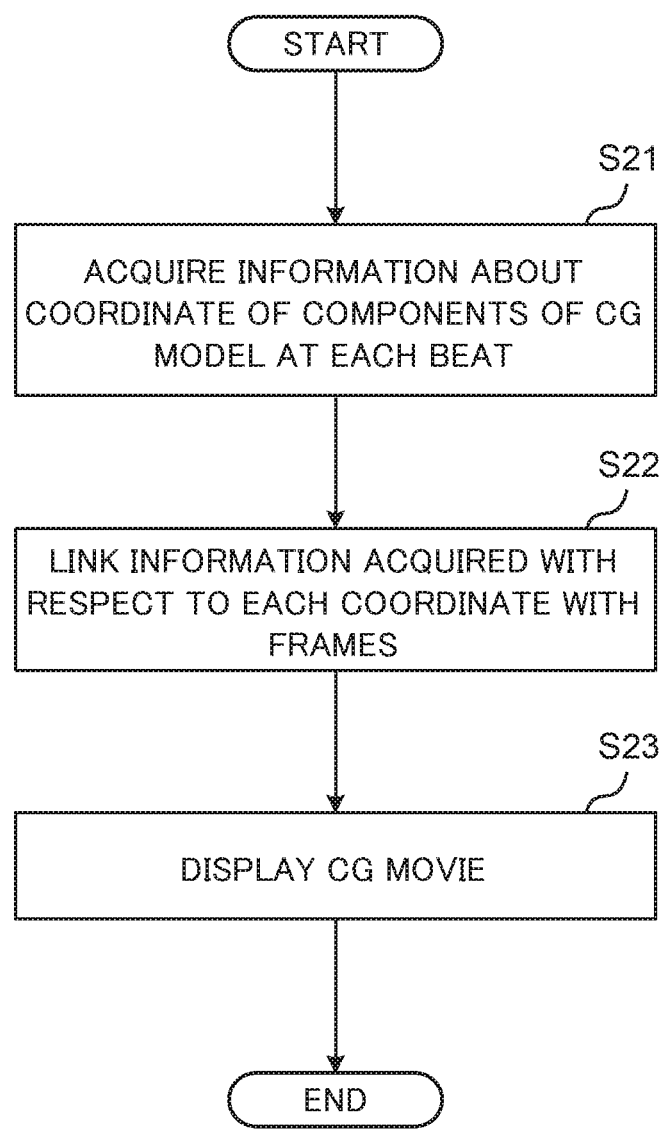
FIG. 11 is a diagram to show an example of a flow when a CG model is displayed using motion data conforming to choreo data format.

FIG. 11 is a diagram to show an example flow to perform when displaying a CG model by using motion data conforming to choreo data format. As an embodiment of the flow of FIG. 11, the process to be performed in each functional block shown in FIG. 2 will be described in specific details, with reference to FIG. 12 and FIG. 13.

Figure 12:
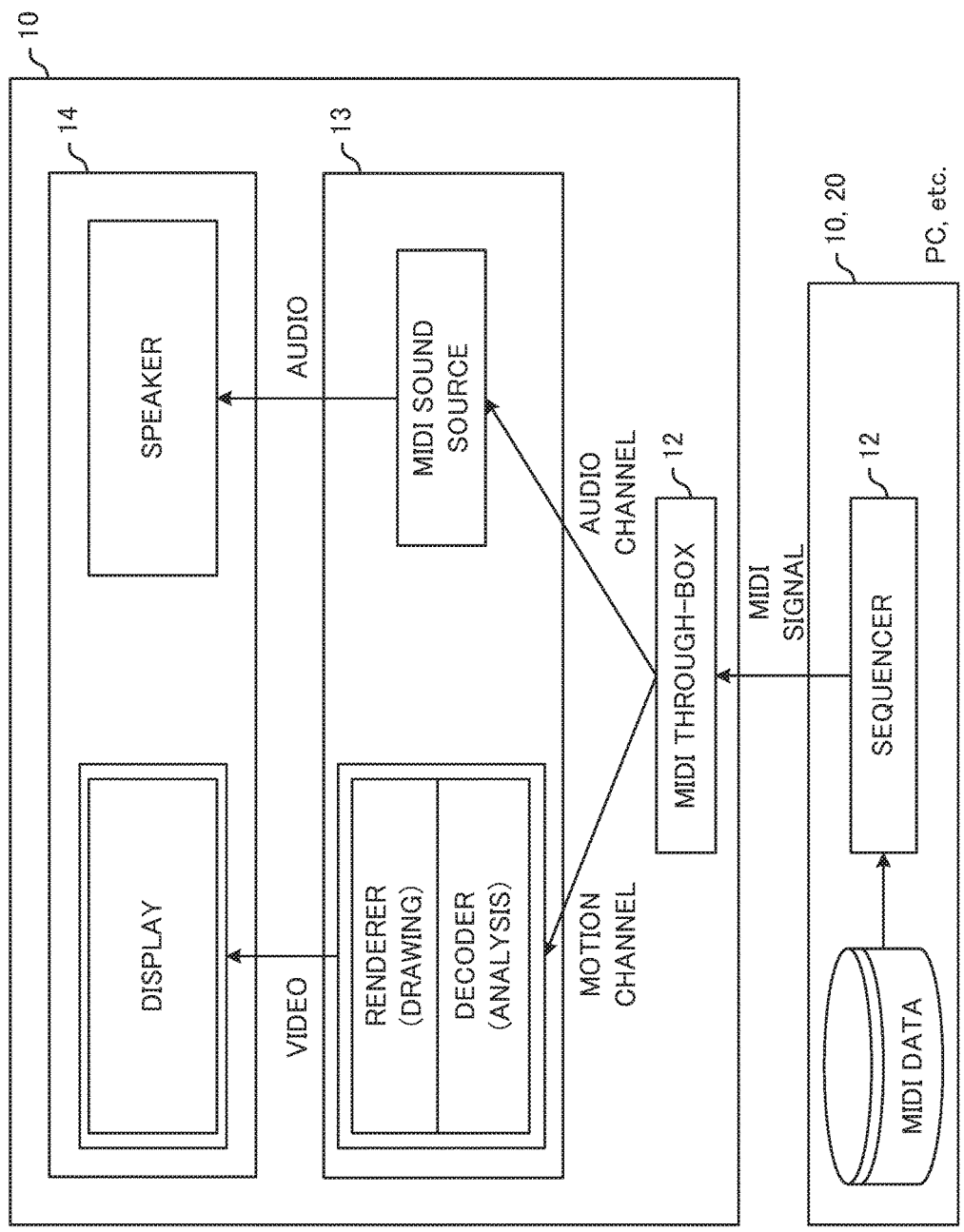
FIG. 12 is a diagram to show an example of a case in which saved choreo data is played.
Figure 13:
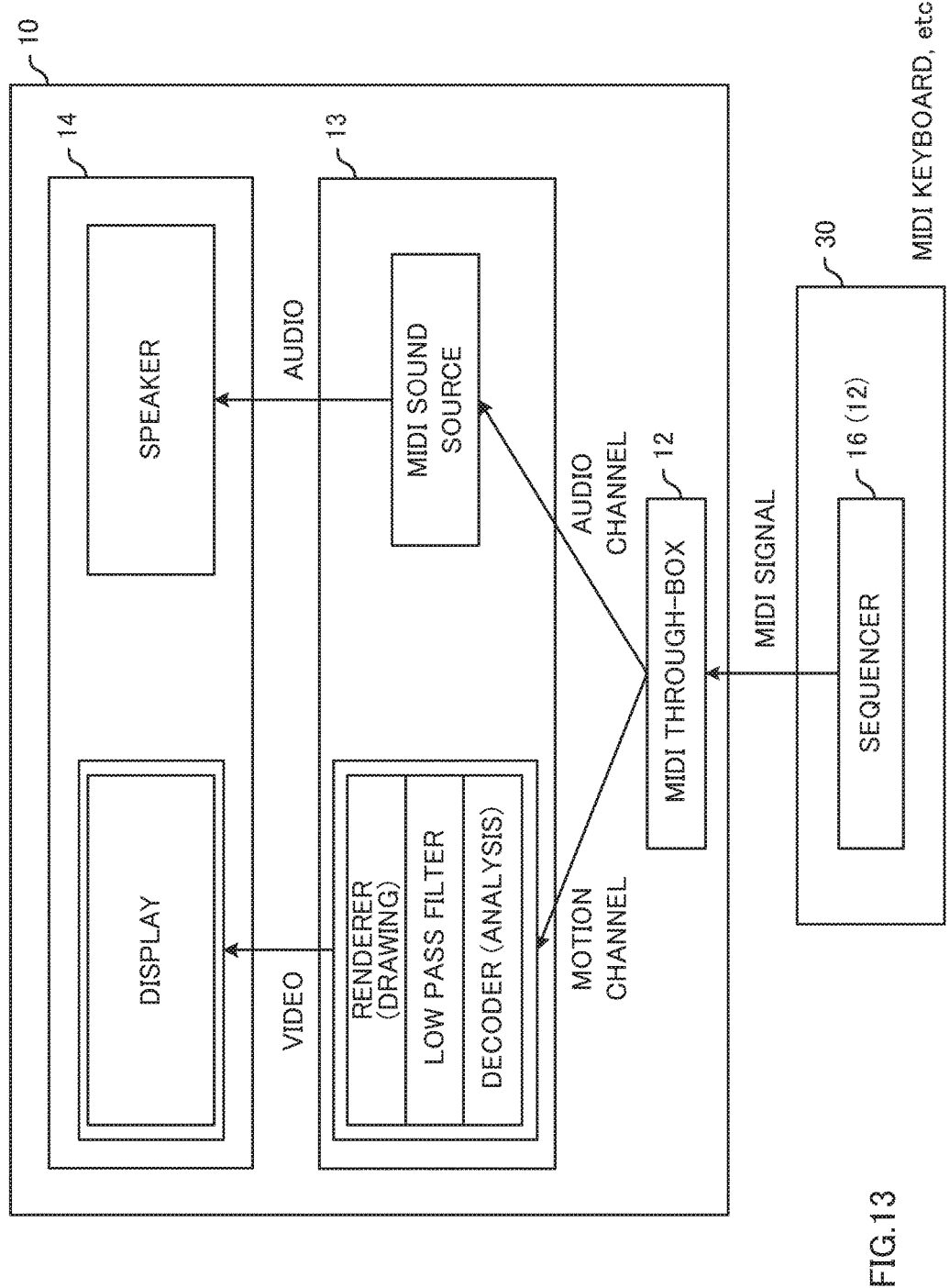
FIG. 13 is a diagram to show an example of a case in which choreo data is played on a real-time basis.

FIG. 12 is a diagram to show an example of a case of playing saved choreo data. FIG. 13 is a diagram to show an example of a case of playing choreo data on a real-time basis. FIG. 12 shows a case where the user terminal 10 performs playback by using choreo data that is stored in another user terminal 10 or in the server 20, and FIG. 13 shows a case where the user terminal 10 performs playback by using choreo data that is output from the electronic musical instrument 30, but these are by no means limiting.

In FIG. 12, the sequencer acquires MIDI data (choreo data), and therefore is equivalent to the acquisition section 12 of FIG. 2. Also, in FIG. 13, the sequencer generates and acquires an MIDI signal (choreo data), and therefore is equivalent to the generation section 16 (and the acquisition section 12) of FIG. 2. Also, in FIGS. 12 and 13, the MIDI through-box acquires an MIDI signal (choreo data), and therefore is equivalent to the acquisition section 12 of FIG. 2. Note that, although not illustrated in FIGS. 12 and 13 for the sake of simplicity, an MIDI signal is transmitted and received using the transmitting/receiving section 11 via the network 40.

Furthermore, although, in FIGS. 12 and 13, the MIDI signal received in the user terminal 10 contains the channel to represent the choreo data (which may be referred to as "motion channel" and so on) and the channel to represent the sound data (which may be referred to as "audio channel," "music channel," and so on), but these are by no means limiting.

First, information about the coordinates of a CG model's components at each predetermined beat (relative angle, etc.) is acquired (step S21). To be more specific, in step S21, the MIDI signal is acquired in the MIDI through-box, separated into the motion channel and the audio channel, and output to the playback section 13. Also, in the playback section 13, the choreo data (SMF format) is analyzed by the decoder, and the time-series information about the coordinates of each component is acquired based on the note-on/off signal of each channel.

Next, the information acquired with respect to each coordinate is linked with frames (step S22). This linking can be made based on a predetermined tempo (for example, BPM) and the number of frames (for example, FPS) to be processed per unit time when displaying the CG model.

If the choreo data contains information about tempo, the predetermined tempo here may be acquired from this information. Also, the predetermined tempo may be, for example, a tempo that is detected from another piece of data (for example, music data) that is played in synchronization with the display of the CG model, or a tempo that is set from outside or that is set in advance.

To be more specific, in step S22, the playback section 13 acquires a first BPM from the choreo data of step S21. In addition, the playback section 13 acquires a second BPM from the data (for example, music data) to play in synchronization with the CG movie. Then, the playback section 13 adjusts the time-series information acquired in step S21, in the time direction, based on a first BPM and a second BPM. For example, when the first BPM and the second BPM vary, the playback section 13 extends/shortens the time-series information acquired in step S21 based on the value acquired by dividing the first BPM by the second BPM.

Also, the playback section 13 determines the coordinates (position, angle, etc.) of each component in frames corresponding to the FPS in which the CG movie is displayed, based on the time-series information acquired in step S21 or the above-mentioned extended/shortened time-series information. To be more specific, by contrast with the flow of FIG. 7, the upper side (the data of frames linked in step S22) is calculated from the lower side in FIG. 8 (the choreo data of step S21).

If there is a frame to match the timing of a predetermined beat in the above time-series information, the data can be assigned to the frame on an as-is basis, and this frame can be made a key frame. On the other hand, when no frame matches the timing of a predetermined beat in the above time-series information, the data to assign to a nearby frame may be calculated based on the data of this beat and a nearby beat, and the nearby frame may be made a key frame.

For example, a case will be considered, in which the timings of beats of each data (angle) constitute a non-integer frame cycle F. In this case, if the timings of beats in the data to be assigned are multiples of F and are non-integer n frames, the data to assign to nearby frames of the n frames is calculated by equation 4 and equation 5.

$$D_{\lfloor n \rfloor} = D_n + (D_n - D_p) \cdot \frac{\lfloor n \rfloor - n}{F} \quad \text{(Equation 4)}$$

$$D_{\lceil n \rceil} = D_n + (D_n - D_p) \cdot \frac{\lceil n \rceil - n}{F} \quad \text{(Equation 5)}$$

where $\lfloor n \rfloor$ is the floor function of x, $\lceil n \rceil$ is the ceil function of x, $D_n$ is the data to be assigned, and $D_p$ is the data to correspond to the data of the previous beat.

According to this equation, it is possible to apply linear interpolation to the data of a virtual frame at the timing of a beat, and make the result the value of a nearby frame of the virtual frame. Note that the same interpolation may be applied to timings of other non-integer frame cycles (for example, 7.5 (=3.75×2) frames). Note that the method of interpolation is by no means limited to linear interpolation, and nearby frames are not limited to immediately-neighboring frames such as described above. Also, the beat to be used for interpolation is by no means limited to the previous beat.

As has been described with reference to steps S143 and S146 of FIG. 7, the angle or coordinate-related information contained in the choreo data is quantized, and therefore, if the original data makes slight moves around a threshold, this might introduce instabilities in the movie that is displayed. Therefore, the playback section 13 may reduce the instabilities by applying the interpolation process to the data linked with frames before rendering. For this interpolation process, for example, as shown in FIG. 13, an exponential moving average using a low pass filter or the like can be used. In the case of real-time playback such as shown in FIG. 13, future data cannot be used, and so processing using a low pass filter is suitable.

Using the data linked with frames in step S22, a CG movie is displayed (step S23). To be more specific, in step S23, the playback section 13 generates a signal related to playback of the CG movie, using data that is designated, with respect to the key frame, by means of the renderer. For frames other than the key frame, the playback section 13 uses a predetermined interpolation method (for example, sine curve interpolation) to generate a signal related to playback of the CG movie. Then, in the output section 14, the signal related to playback of the CG movie, which is output from the playback section 13, is output and displayed on the display.

Note that, as shown in FIGS. 12 and 13, a configuration can be adopted here, in which, when the audio channel is input, the playback section 13 performs playback by means of an MIDI sound source, in synchronization with playback of the CG movie represented by the motion channel, and the output section 14 outputs sound via a speaker.

Also, the CO movie rendered in step S23 may be stored in a storage section (not shown) in movie file format, or may be transmitted to another user terminal 10 or the like via the transmitting/receiving section 11 in movie file format or in streaming format.

Note that the example of FIG. 13 may be configured so that other data (for example, music data) to be played in synchronization with the display of the CG model is acquired (distributed in streaming) on a rea-time basis as with the choreo data. With this configuration, even when packet loss, delay and so on occur due to deterioration of the communicating environment and playback of the streaming sound source stops, it is still possible to follow the progress of streaming and play the movement of the CG model appropriately in accordance with the beats of the music.

<Variation of Choreo Data Format>

There is another problem with motion data. Below, this problem will be explained first, and then a variation of choreo data format to solve this problem will be explained.

It is preferable that motion data can reproduce predetermined motions with a minimal amount of data. However, simply reducing the amount of data leads to the problem of losing the smoothness of movement.

Also, when the tempo of the movement of a CG model is simply changed, the problem is that the sharpness of movement is lost. For example, if a CG model is played by simply lowering the BPM, the result will be just slow-motion, and, if the movie is one that requires sharpness in movement, such as dance CG, the impression the viewer has changes significantly.

Therefore, the present inventors have focused on the fact that the smoothness of a CG model's movement has to do with the speed of transitions between poses. In addition, the present inventors have focused on the fact that sharpness and timing are important to express proper accents in movement, and that the sharpness of movement is well represented by the highest value of the speed of movement. Based on these points of view, the present inventors have found out that the reproducibility of movement can be improved by taking acceleration into consideration. This makes it possible to reproduce motion data with high precision while reducing the increase of the amount of data. For example, even when a CG movie is displayed by changing the BPM of original motion, it is still possible to prevent the sharpness of movement from deteriorating by maintaining, as much as possible, the duration of parts where the movement is fast.

In an embodiment of the present invention, an additional, different piece of information is included as information about the coordinates of components, in choreo data format. To be more specific, information related to the speed system (velocity system) (for example, the speed, the angular velocity, the acceleration, the angular acceleration, etc.) is included, with respect to the coordinates or angle of components. By using this piece of information, it is possible to make the motion of a CG model smoother, and maintain the sharpness of movement even when the tempo varies.

The speed system-related information is, for example, information about the acceleration or angular acceleration (also referred to as "acceleration parameter," "acceleration information," and so on) and information about the speed or angular velocity (hereinafter also referred to as "speed parameter" and so on). Note that, in the following description, the acceleration parameter (that is, information about the angular acceleration) with respect to angle data will be described as an example of the speed system-related information, but coordinate data may be used likewise, and, in that case, the angle may be replaced with coordinates. Furthermore, instead of using the acceleration parameter, a configuration to calculate the acceleration parameter from the speed parameter with respect to the coordinates or angle of components may be adopted here.

In an embodiment of the present invention, it is possible to assume that the acceleration (or angular acceleration) of the movement of components is constant (that is, in motion of uniform acceleration) during a predetermined period (for example, a ⅛-beat period) represented by choreo data. To be more specific, this predetermined period may be the period from the starting beat of a given note-on signal to the point where note-off is complete with the corresponding note-off signal (or the period until the starting beat of the next note-on signal).

Figure 14B:
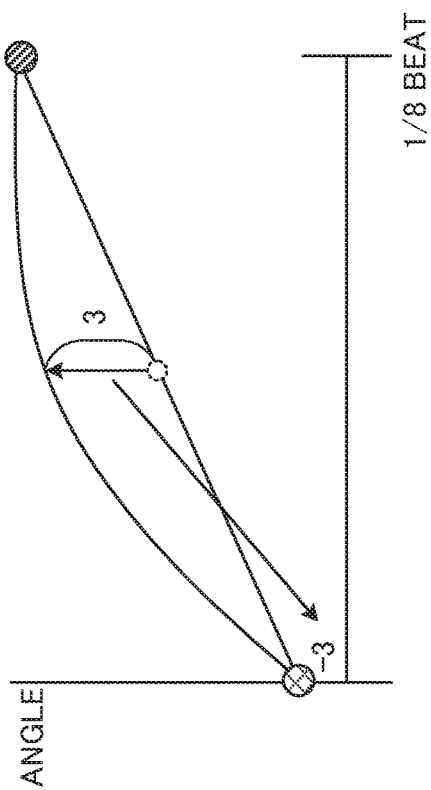
FIGS. 14A and 14B provide diagrams to show examples of calculation of an acceleration parameter.
Figure 14A:
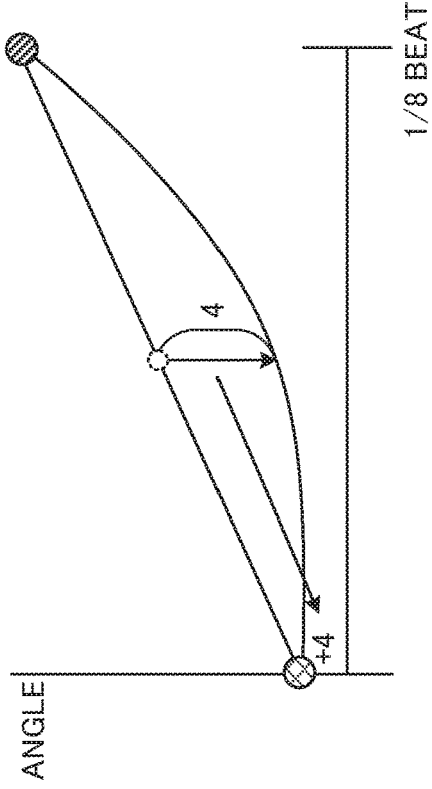

FIG. 14 provide diagrams to show examples of the calculation of the acceleration parameter. FIG. 14A shows a case where the acceleration parameter is positive, and FIG. 14B shows a case where the acceleration parameter is negative. As shown in FIG. 14, the acceleration parameter can be determined from the difference between the midpoint of the angles at the beginning and the end of a period of a predetermined unit (where the middle point connects between these two angles with a straight line) and the actual curve of angle (if detailed data is available). When the acceleration parameter is positive, the amount of angular change increases over the passage of time, and, on the other hand, when the acceleration parameter is negative, the amount of angular change decreases over the passage of time. In this manner, information related to the speed system can be calculated based on the average value of temporally-neighboring data (the coordinates, angles, etc. of components) included in choreo data.

Figure 15:
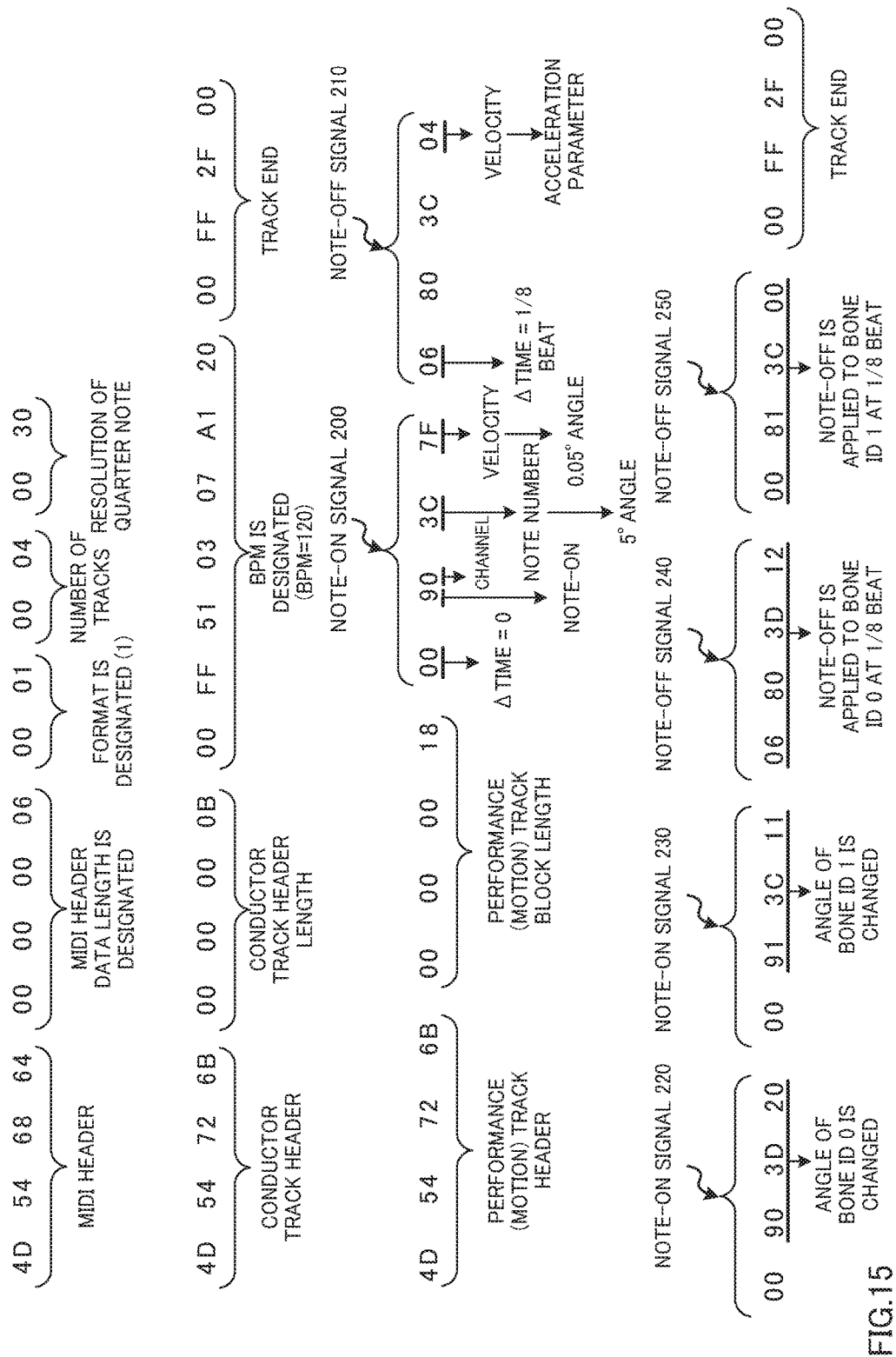
FIG. 15 is a diagram to show an example of a method of storing an acceleration parameter in choreo data format.

FIG. 15 is a diagram to show an example of a method of storing acceleration parameters in choreo data format. FIG. 15 shows byte sequences such as shown in FIG. 6. For example, the acceleration parameter may be represented by the velocity of note-off signals like note-off signals 210, 240 and 250. In this way, the acceleration parameter in the period from the start of the corresponding note-on signal to the delta time designated by the note-off signal can be specified. In addition, the velocity of note-off signals, which has not been used effectively heretofore, can be used, so that it is possible to include an acceleration parameter while reducing the increase in the amount of data.

Note that whether the acceleration parameter is positive or negative may be determined based on a predetermined velocity value of $V_0$. For example, the acceleration parameter=$(V-V_0)$ may be calculated. Here, V is the velocity, and $V_0$ can be set to 60, for example. Also, whether the acceleration parameter is positive or negative may be determined according to the value of a predetermined bit in the binary representation of the velocity. Furthermore, the acceleration parameter does not always have to be represented based on the velocity of note-off signals, and may be represented by using other events (MIDI events, SysEx events, etc.).

When choreo data is made, the acceleration parameter is calculated, for example, in step S14 of FIG. 7. Furthermore, when a CG movie is displayed/made using choreo data, the acceleration parameter is used in frame interpolation in, for example, step S23 of FIG. 11.

Now, advantages of using an acceleration parameter will be described below. FIG. 16 provide diagrams to explain the reproducibility of angular change when an acceleration parameter is used. FIG. 16A shows the curve (solid line) of angular changes of original motion (60 FPS) and a curve (broken line) that is acquired by spline-interpolating sampled angles corresponding to ⅛ beats. Note that the dotted circles on the solid line of FIG. 16A correspond to data of 60-FPS intervals. In this example, the data of ⅛-beat intervals is equivalent to 15 FPS.

In many CG movie display methods, key frames are interpolated using spline interpolation, sine curve interpolation with pre-set parameters set, etc. Therefore, as shown in FIG. 16A, if the data is reduced to ⅛ beat intervals, it is clear that spline interpolation cannot maintain the shape of angular change of original motion, which may result in a degradation of reproducibility.

Figure 16B:
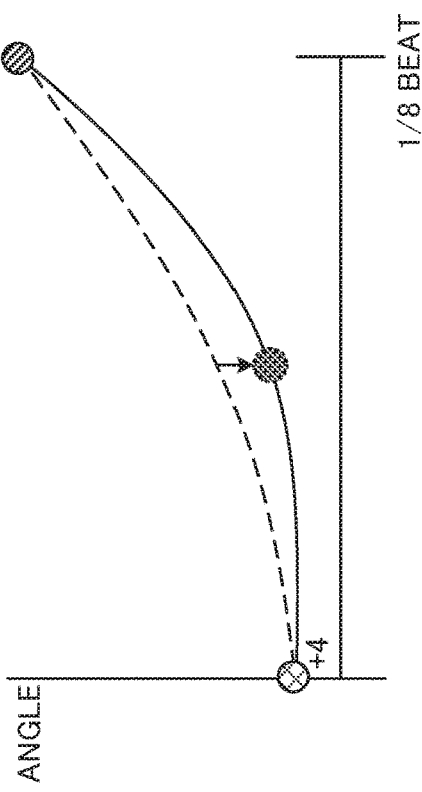
FIGS. 16A and 16B provide diagrams to explain the reproducibility of angular changes when using an acceleration parameter.
Figure 16A:
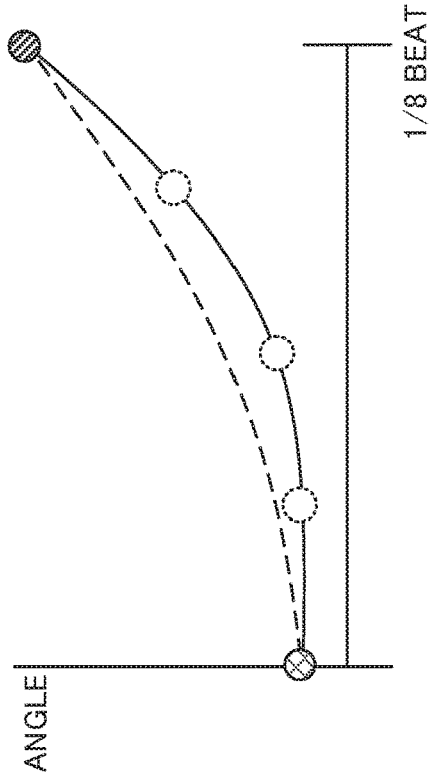

Meanwhile, FIG. 16B shows a curve (broken line) that is acquired by spline-interpolating sampled angles corresponding to ⅛ beats, and a curve (solid line) that is acquired by interpolating sampled angles corresponding to ⅛ beats by taking the acceleration into account. By taking the acceleration into account, the difference between the prediction and the actual at the midpoint can be identified, so that it is possible to interpolate the gradient of the curve with high accuracy.

Below, a maximum speed-maintaining adjustment for maintaining the sharpness of movement when the tempo varies will be described. According to an embodiment of the present invention, the part where each component shows its maximum speed within a certain period is identified by focusing on points where the positivity/negativity of the speed system-related information switches, and time-series data is extended/shortened so as not to change the maximum speed. Note that the maximum speed of a CG model's components refers to the maximum speed (or the maximum angular velocity) at which the coordinates (for example, the angle, the position, etc.) of the CG model's components transition.

Figure 17:
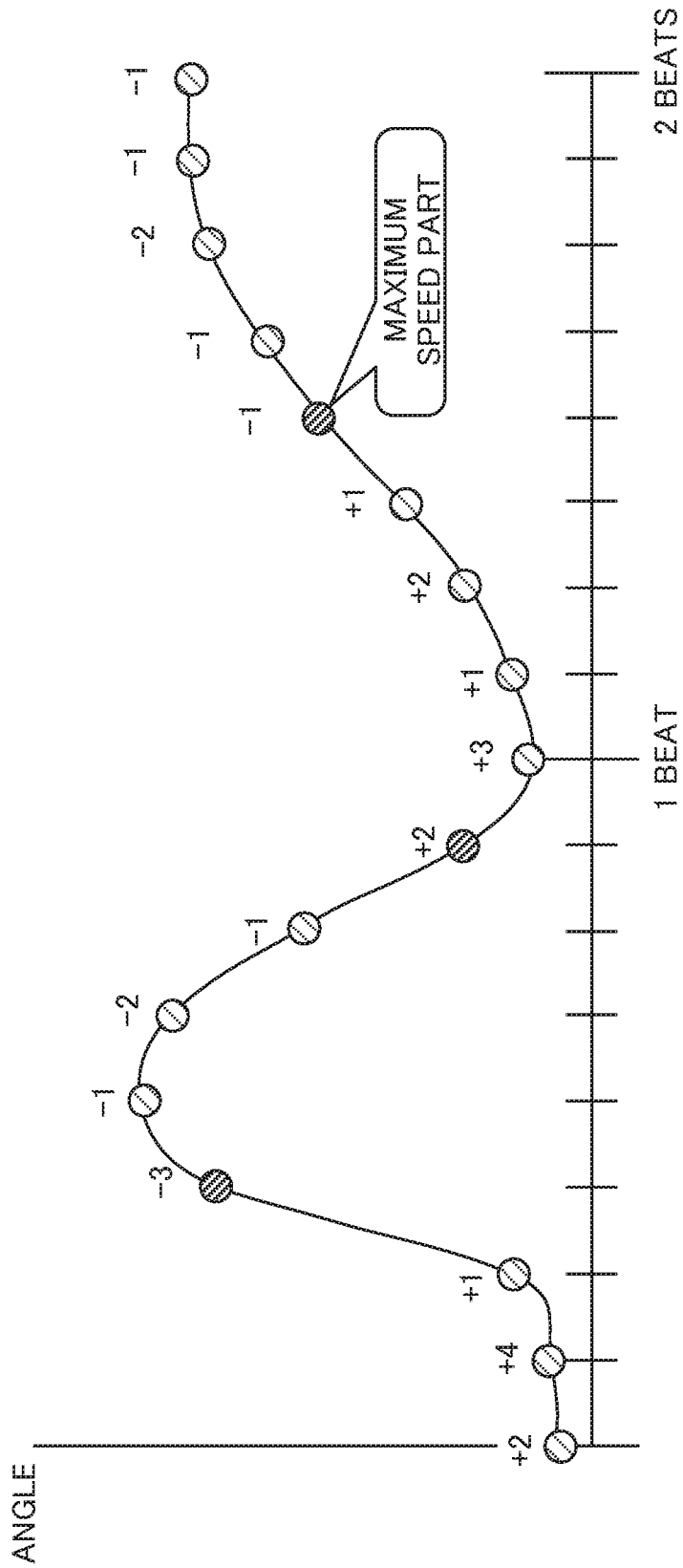
FIG. 17 is a diagram to show examples of angular changes over the passage of time and changes of an acceleration parameter corresponding to each point in time.

FIG. 17 is a diagram to show an example of angular changes over the passage of time and change of the acceleration parameter corresponding to each time. As has been shown in FIG. 14, when the acceleration parameter is positive, the angle changes more in the second half (with an increased speed), and, on the other hand, when the acceleration parameter is negative, the angle changes less in the second half (with a reduced speed). That is, when the acceleration parameter switches from positive to negative in a beat, the maximum period is shown in a certain period in which the angle increases. Also, when the acceleration parameter switches from negative to positive in a beat, the maximum speed is shown in a certain period in which the angle decreases.

By using the acceleration parameter in this way, it is possible to easily identify the maximum speed in a certain time period, based on the point where the positivity/negativity of this parameter switches.

Note that the acceleration itself at the midpoint may be used, instead of the acceleration parameter. In this case, the maximum speed may be identified by comparing the acceleration between neighboring beats. Also, instead of the speed parameter, the speed itself may be used. Furthermore, the speed system-related information does not have to be one that corresponds to the midpoint in a predetermined period. For example, it is possible to calculate the acceleration at the start, the end and so on in a period of a predetermined unit, and use this as an acceleration parameter.

Figure 18A:
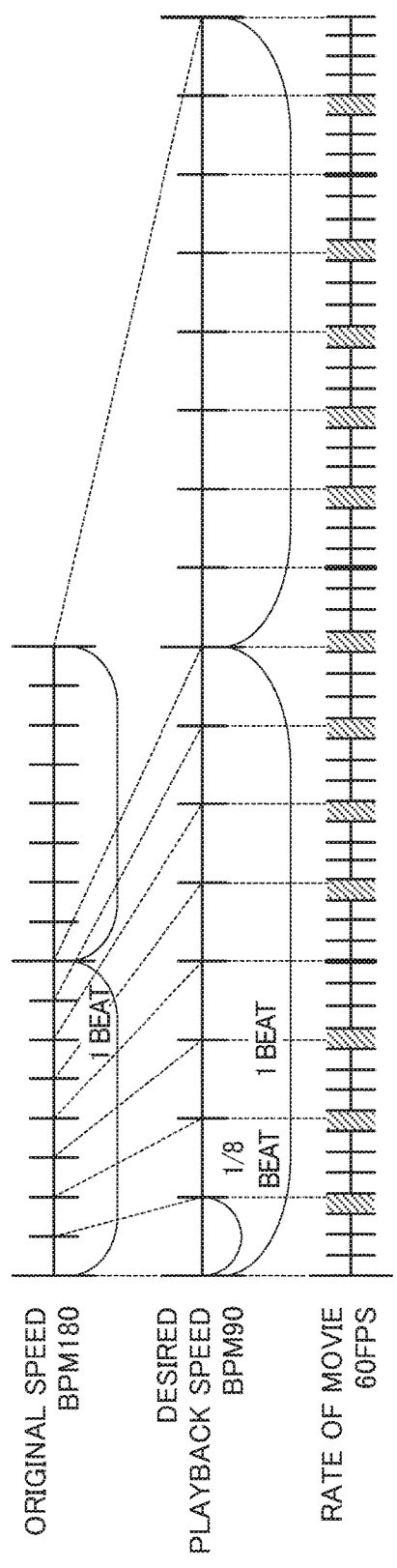
FIGS. 18A and 18B provide diagrams to show examples of linking of beats with frames, taking the maximum speed into account.

FIG. 18 provide diagrams to show examples of linking of beats with frames, where the maximum speed is taken into account. FIG. 18A shows an example, in which beats are expanded according to the change of BPM and linked with frames. Since the original speed of data is BPM 180 and the desired playback speed is BPM 90, the tempo is made half. Therefore, the duration of each beat is simply doubled, and the data is mapped to the corresponding frames or nearby frames. Since, in this way, the speed of all movements is made half, the sharpness of movement is lost.

Figure 18B:
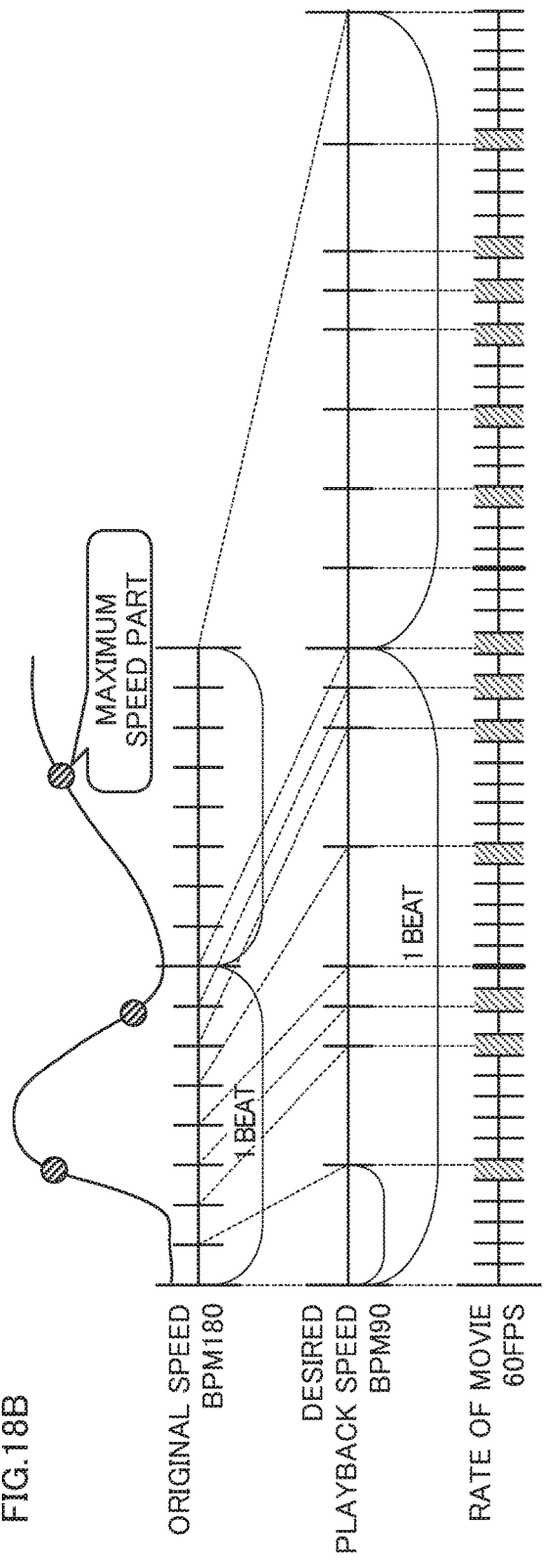

FIG. 18B shows an example, in which, when the BPM changes, the duration of beats is adjusted by taking into account the maximum speed, and the beats are linked with frames. In FIG. 18B, adjustments are made so that the real-time (frame) interval of beats where the positivity/negativity of the acceleration parameter is reversed and beats before and after these beats does not change even if the BPM changes. Meanwhile, the other beats are expanded more than in FIG. 18A (their interval is widened). As a result of this, the overall amount of angular changes stays the same.

Figure 19A:
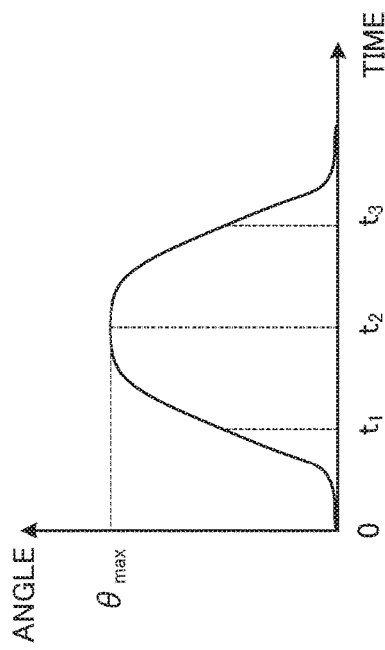
FIGS. 19A and 19B provide diagrams to show the time-series data of angle and speed in basic BPM.
Figure 19B:
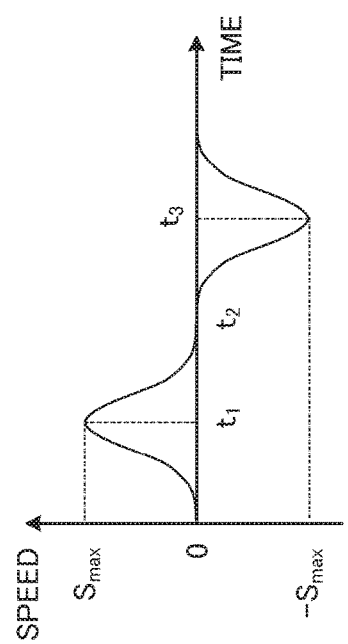
Figure 20A:
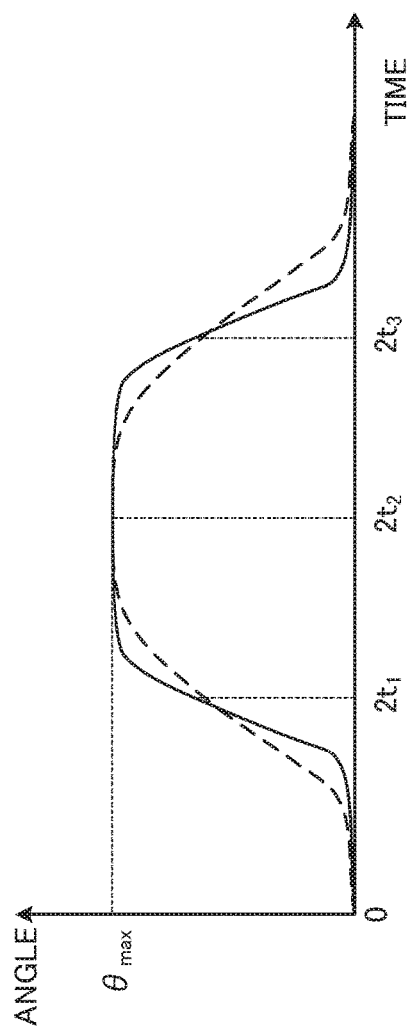
FIGS. 20A and 20B provide diagrams to show the time-series data of angle and speed when the BPM of time-series data in FIG. 19 is made half.
Figure 20B:
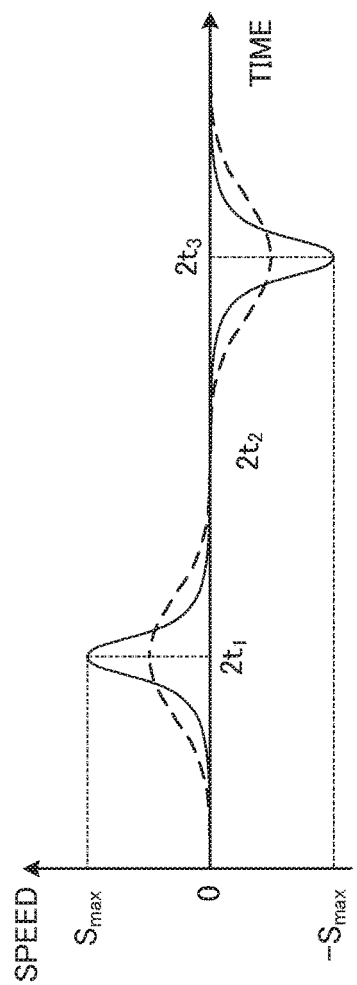
Figure 21A:
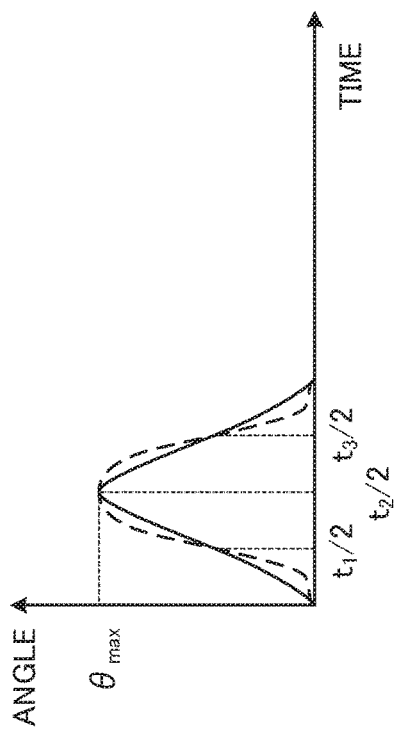
FIGS. 21A and 21B provide diagrams to show the time-series data of angle and speed when the BPM of time-series data in FIG. 19 is doubled.

FIGS. 19 to 21 are diagrams showing other examples of maximum speed-maintaining adjustments. FIG. 19 provide diagrams to show time-series data of angle and speed at basic BPM. Furthermore, FIGS. 20 and 21 show, in a comparative manner, the result of simply extending and shortening beats (broken line), and the result of making maximum speed-maintaining adjustments (solid line), in cases where the BPM of the time-series data of FIG. 19 is made half and doubled. In each drawing, FIG. xA and FIG. xB show, respectively, changes in angle following the passage of time and changes in speed in response to these changes in angle.

As shown in FIG. 19A, in this time-series data, the angle is 0 at time 0, increases and becomes maximum angle $\theta_{max}$ at time $t_2$, and then decreases and becomes 0 again. Correspondingly, the speed in FIG. 19B assumes the maximum speed $S_{max}$ at time $t_1$, becomes speed 0 at time $t_2$, and becomes maximum speed $-S_{max}$ in the negative direction at time $t_3$.

As shown with the broken lines of FIG. 20, it is clear that, when the BPM is made half and the duration of each beat is simply doubled, the maximum speed becomes half. On the other hand, as shown with the solid lines of FIG. 20, the maximum speed can be maintained by applying maximum speed-maintaining adjustments.

As shown with the broken lines of FIG. 21, when the BPM doubles and the duration of each beat is simply made half, the maximum speed doubles. This makes the movement too fast and unnatural. On the other hand, as shown with the solid lines of FIG. 21, the maximum speed can be maintained by applying maximum speed-maintaining adjustments.

Figure 21B:
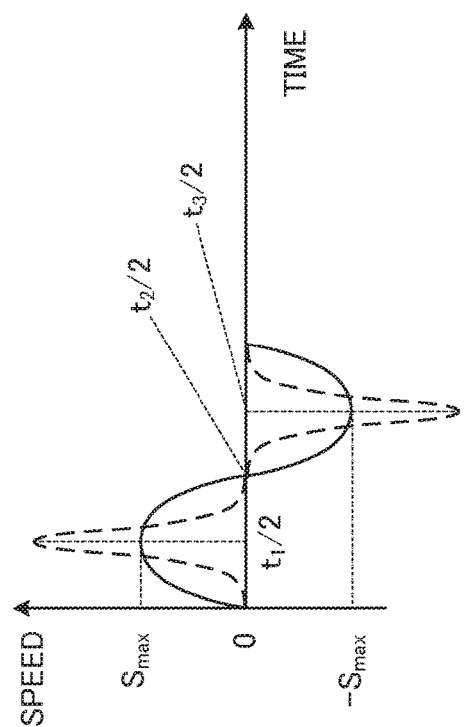

Note that, when a maximum speed-maintaining adjustment is made as shown in FIGS. 20B and 21B, the integrated value of the speed after the adjustment (the area surrounded by the solid line and the time axis) needs to be equal to the integrated value of the speed before the adjustment (the area surrounded by the broken line and the time axis). However, depending on the tempo and interval of beats, there are cases where it is difficult to make these areas equal. In such cases, the areas are made equal by softening the limitations that are applied when maintaining the maximum speed. For example, when, as shown in FIG. 20, the BPM decreases, the areas may be made equal by lowering the maximum speed below $S_{max}$, and, when, as shown in FIG. 21, the BPM increases, the areas may be made equal by raising the maximum speed beyond $S_{max}$.

Maximum speed-maintaining adjustments using speed system-related information such as described above may be used when making choreo data in step S16 of FIG. 7. For example, when the tempo is converted into a tempo other than the predetermined tempo of step S12, it is possible to maintain the sharpness of movement by applying these adjustments. Also, these adjustments may be used when displaying/making CG movies by using choreo data in step S22 of FIG. 11. For example, if the tempo of the choreo data in step S21 is different from the tempo of the data to be played synchronously with the CG movie, it is possible to keep the sharpness of movement by applying these adjustments.

Note that, as shown in FIGS. 9, 10, 16 and others, the present inventors have focused on the amount of change in the movement of components (for example, the angle) of living organisms (for example, humans, animals, etc.) and the patterns of change. From this point of view, as another example of the present invention, motion data may be compressed depending on the characteristics of the CG model and/or the motion (e.g., type, size, shape, angle, etc.). For example, given that the maximum amount of movement that can be realized in a predetermined beat unit is limited depending on the CG model, the amount of information may be reduced by limiting the range of values which the information (for example, relative angles) about the coordinates of components may assume.

<Making of CG Movie Using Choreo Data>

Below, an example in which the user operates an application, and generates a new CG movie by combining a plurality of pieces of choreo data will be described.

Figure 22:
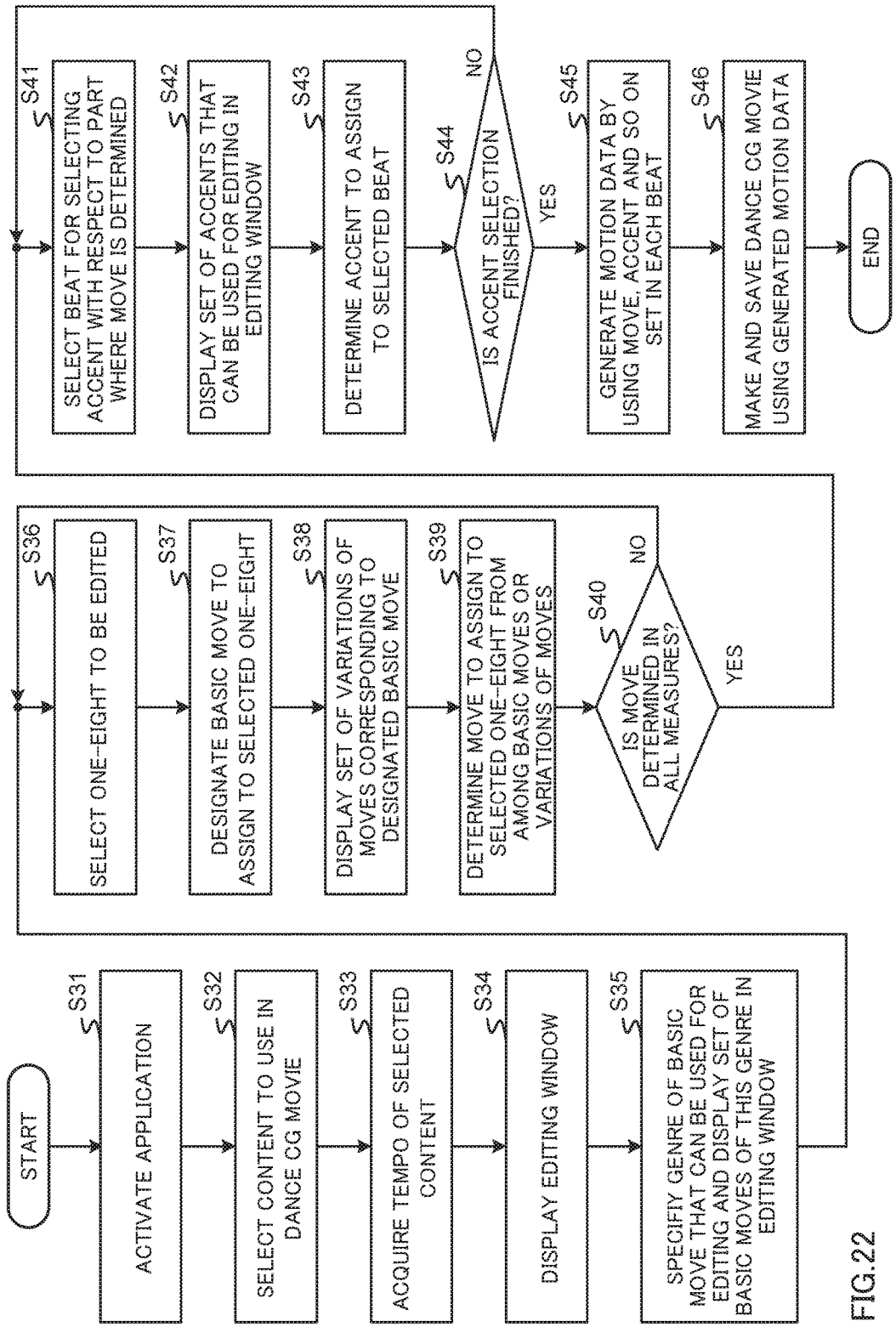
FIG. 22 is a diagram to show an example flow for making a dance CG movie using moves saved in choreo data format.

FIG. 22 is a diagram to show an example flow for making a dance CG movie by using moves saved as choreo data. Note that, with FIG. 22, an example case will be described, in which the user terminal 10 (hereinafter simply referred to as "user terminal") shown in FIG. 2 makes a dance CG movie, based on operations by the user, via a predetermined application. For example, a configuration may be adopted here in which the control section 17 executes an application, the input section 15 accepts an input from the user, the control section 17 controls each functional block (the playback section 13, the output section 14, etc.) in accordance with the input, and the output section 14 appropriately displays the editing window and/or the like. Note that non-dance CG movies may be made using the application.

First, the user terminal activates a predetermined application (step S31). The user terminal selects the content to use in a dance CG movie (for example, the music to be played in synchronization with the dance, moving images, etc.) (step S32). For example, a content selection window, in which a predetermined artist's name and the names of songs by that artist that can be provided from a predetermined server are shown side by side, may be displayed, so that a song may be selected by the user's operation via the user interface of the application and downloaded and/or distributed in streaming. Also, selection may be made from the music that is stored in the user terminal.

Next, the user terminal acquires the tempo of the selected content (for example, represented by the BPM) (step S33). For example, the tempo may be acquired from predetermined metadata, may be automatically detected by analyzing the music, may be manually entered by the user, may be set from outside, or may be a pre-defined tempo.

Figure 23:
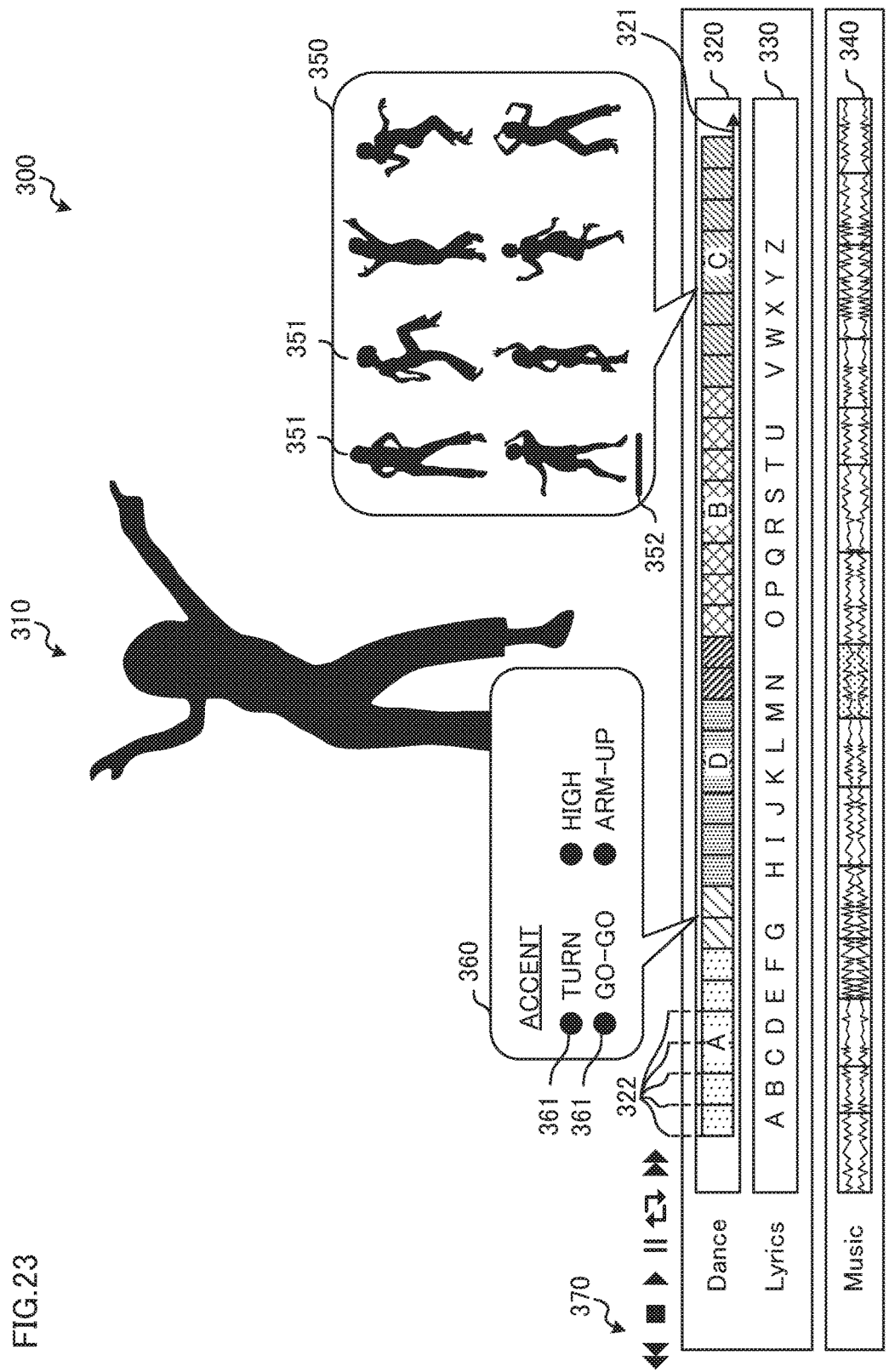
FIG. 23 is a diagram to show an example of an editing window.

The user terminal displays an editing window 300 that is visible to the user, in order to link the playback position of the music with moves (step S34). FIG. 23 is a diagram to show an example of the editing window. As shown in FIG. 23, the editing window 300 includes a first field 310, a second field 320, a third field 330 and a fourth field 340. Furthermore, a move candidate display field 350 and an accent candidate display field 360 are appropriately displayed in the form of a pop-up display, a slide display and so on.

Furthermore, a music control field 370, which is configured to allow the user to control the music (including playing, stopping and so on). Note that the configuration of the editing window 300 is by no means limited to the arrangement of FIG. 23. For example, in FIG. 23, the move candidate display field 350 and the accent candidate display field 360 are overlaid on the first field 310, but the move candidate display field 350 and the accent candidate display field 360 may be overlaid on other fields.

In the first field 310, the CG model is displayed. The first field 310 is used to appropriately display a preview of edited dance while editing is in progress. For example, when a predetermined move is selected by the user's operation, the user terminal may appropriately display, in the first field 310, a preview of the movement of the CG model that is played in synchronization with the music.

In the second field 320, a beat axis 321, which shows beat points, is defined. A plurality of beat points are set discretely on the beat axis 321, at predetermined intervals (equal intervals), and a linear reference line 322, which represents a beat point, is placed at each beat point's position, on the beat point axis 321. Note that FIG. 23 shows only part of the reference lines 322. Also, the beat axis 321 and the reference lines 322 do not have to be displayed.

Also, the user terminal displays the movement of CG at the timing of each beat, in chronological order, in the second field 320. To be more specific, when a predetermined number of beats are shown in a period within the second field 320, the content of the selected dance is displayed in a manner that is comprehensible to the user. For example, when a dance named "A" is selected, this may be indicated by displaying the letter "A." In FIG. 23, in the second field 320, dances "A," "D," "B" and "C" are selected, in order, for every eight beats from the left.

Also, the user terminal may assign and display corresponding patterns in the second field 320 depending on the content of the dance that is selected. For example, the patterns may be formed in different shapes, markings, colors or combinations of these, so that the patterns are mutually distinguishable. In addition, the content of CG movement may be displayed by combining characters and patterns.

In the third field 330, the user terminal displays the lyrics corresponding to the beat displayed in the second field 320. Note that, when the user terminal has no information of corresponding lyrics, the user terminal may not display the lyrics.

In the fourth field 340, the user terminal displays time-series information of music for selecting the period to be displayed in the second field 320. In the fourth field 340, it is preferable that a part to match the period to be displayed in the second field 320 is displayed such that its selection can be seen. For example, the part may be assigned a predetermined pattern and displayed. Note that, although, in FIG. 23, the waveform of the audio signal of the music is displayed as time-series information of the music, the present invention is by no means limited to this.

Note that, as shown in FIG. 23, the period to be displayed in the second field 320 is preferably a set of 32 beats (8 beats×4) (four eight). Also, in the second field 320, it is preferable if the content (moves) of the dance can be roughly specified in sets of 8 beats (one eight). This is to allow easy editing by taking into account the characteristics of "flows" in the choreography, as mentioned earlier.

Next, the user terminal specifies the genre of basic moves that can be used for editing, and displays a set of basic moves in this genre in the editing window 300 (step S35). To be more specific, the user terminal displays a move candidate display field 350 in the editing window 300.

The move candidate display field 350 displays, for example, a plurality of move candidates 351 as a set of basic moves as shown in FIG. 23. Each move candidate 351 may be displayed while being played like a preview video. Note that the display of move candidates 351 is by no means limited to still images or a movie, such as shown in FIG. 23. For example, text to indicate the content of a move may be displayed as a move candidate 351. Furthermore, the move candidate display field 350 is by no means limited to the layout of FIG. 23, and may be configured so that, for example, the field can be scrolled.

Furthermore, the genre may be specified from predetermined metadata, may be specified automatically by analyzing the music (from the content of the music (melody, tempo, etc.)), may be entered and specified manually by the user, or may be set from outside, or a pre-defined genre may be selected.

The user terminal selects one-eight, which is subject to editing (subject to selection of moves), as controlled by the user (step S36). Here, the user terminal may specify a predetermined four-eight from the fourth field 340 as controlled by the user, and display this four-eight in the second field 320. Note that step S35 may be performed after the object to be edited is selected in step S36.

The user terminal designates the basic move to assign to the selected one-eight as controlled by the user (step S37). A predetermined pattern (for example, an underline) may be assigned to the designated move candidate 351 so that it is distinguishable among the move candidates 351. For example, in FIG. 23, an underline 352 is assigned and displayed under the designated move candidate 351.

Furthermore, when the basic move is specified in step S37, the user terminal further displays a set of variations of moves corresponding to the basic move (step S38). Here, the move candidates of the variations of moves may be displayed so as to replace the move candidates 351 of the basic move in the move candidate display field 350, or may be displayed in a separate move candidate display field while the move candidate display field 350 is kept displayed.

The user terminal determines the movement to assign to the selected one-eight from among the above basic moves or variations of moves, as controlled by the user (step S39).

The user terminal appropriately judges whether moves have been determined in all measures (step S40). If moves have not been determined in all measures, steps S36 to S39 are repeated until the moves of all measures in the music are decided (step S40: NO). Note that it is also possible to change a move that has been selected once, to another move, by executing steps S36 to S39 again.

If moves have been determined in all measures (step S40: YES), the user terminal selects the beats to be edited (to be subject to selection of accents), with respect to parts where the move has been determined, as controlled by the user (step S41).

Also, the user terminal displays a set of accents that can be used for editing in the editing window 300 (step S42). To be more specific, the user terminal displays an accent candidate display field 360 in the editing window 300. Note that the genre of accents which can be used for editing may be specified like the genre of basic moves in step S35.

The accent candidate display field 360 displays, for example, a plurality of accent candidates 361 as a set of accent motions, as shown in FIG. 23. As shown in FIG. 23, each accent candidate 361 may be displayed as text that indicates the content of the accent, or may be shown as a still image or as a movie, like a move candidate 351. Furthermore, the accent candidate display field is by no means limited to the layout of FIG. 23, and may be configured such that, for example, the field can be scrolled.

The user terminal determines the accent to assign to a beat that is selected, as controlled by the user (step S43). A predetermined pattern (for example, an underline) may be assigned to the designated accent candidate 361 so that the selected accent is distinguishable among the accent candidates 361.

The user terminal judges appropriately whether or not the accent selection is finished (step S44). For example, the user terminal repeats steps S41 to S43 when the user continues the operation for selecting accents (step S44: NO). Note that it is also possible to change a move that has been selected once, to another move, by executing steps S36 to S39 again. For example, it is possible to determine that accent selection is finished (step S44: YES) when the user performs a predetermined operation (by, for example, pressing a save button or the like).

The user terminal generates dance CG motion data by using the choreo data format of the move, accent, etc., set in each beat (step S45). Then, the user terminal makes a dance CG movie using the motion data that is generated, and saves this (step S46). Note that the motion data generated in step S45 may be separately saved/used as choreo data.

Note that, FIG. 22 shows an example, in which the accent selection process of steps S41 to S44 is not performed until the moves of all bars are determined in step S40, but the present invention is by no means limited to this. For example, a configuration may be adopted here, in which accents are selected with respect to parts where the move is determined in steps S36 to S39, even if the move is not determined in all measures. Also, a configuration may be adopted here, in which an accent can be selected even if no move is determined.

According to an embodiment of the present invention described above, motions are set on a per beat basis, by operating an application using choreo data, so that even users who are not accustomed to making CG movies or dance choreography can easily edit and make CG dance movies. In addition, this application can also be suitably used as a material for learning processes that take "flows" into account.

Figure 24:
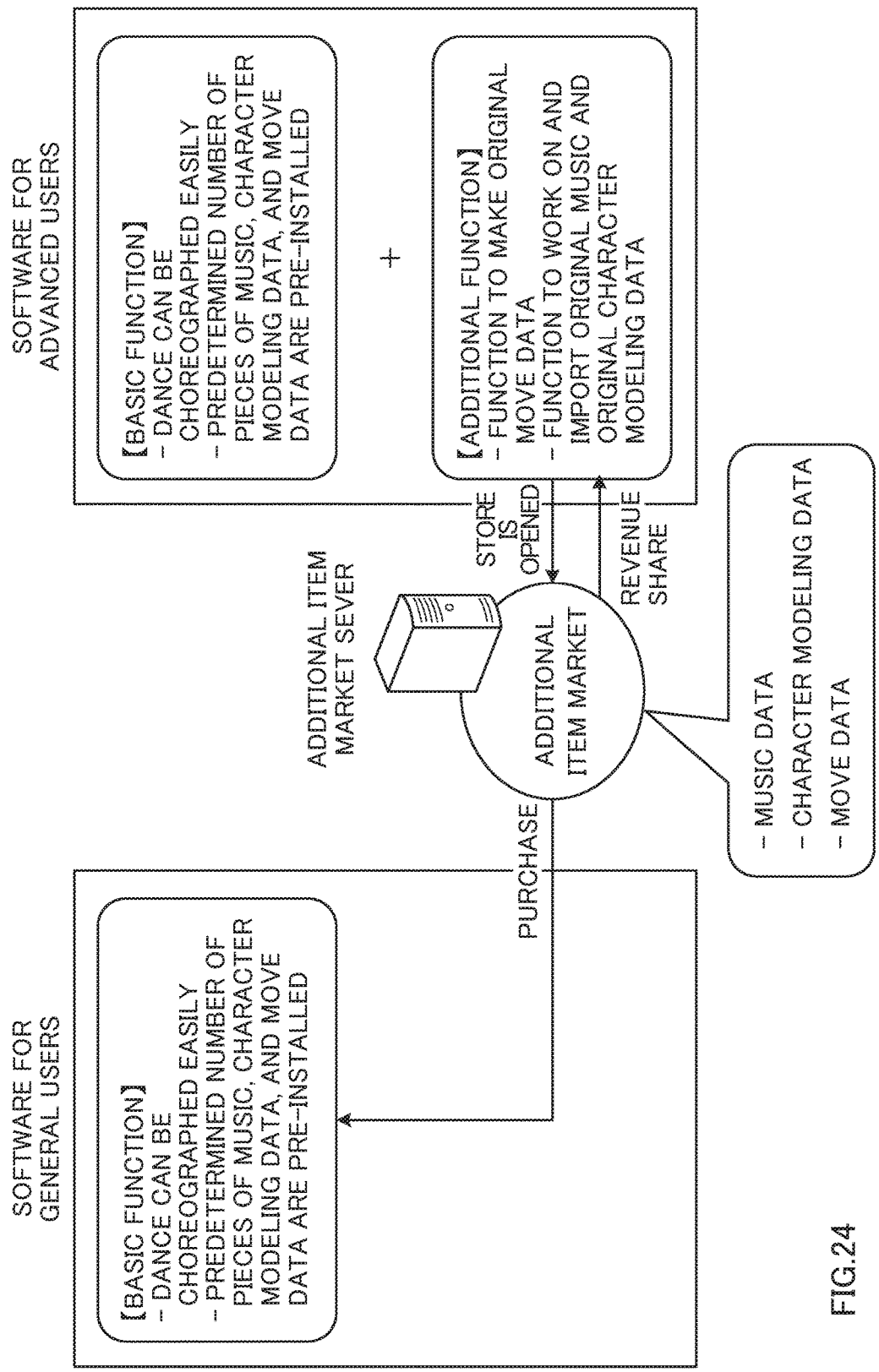
FIG. 24 is a diagram to explain the concept of a business model based on software (application) that can make dance choreography in tune with music.

FIG. 24 is a diagram to explain the concept of a software system (application) that can make dance choreography tuned to music. With the software shown in FIG. 24, for example, processes such as making a CG movie by following the flow of FIG. 22 can be performed using choreo data according to the present invention.

With this system, software for general users, with special functions for making/displaying dance CG choreography, can be provided for free of charge or at low cost. With the software for general users, a predetermined number of pieces of music, character modeling data, move data, etc. are pre-installed and provided for free of charge.

Meanwhile, software for advanced users, which has, in addition to the functions of the software for general users, the function for allowing the user to make original move data by himself/herself and the function for allowing the user to work on and import music and character modeling data which the user himself/herself has made, so that the music and character modeling data can be used on the software for general users. Here, the data may be made using different software.

Also, an additional item market server, to offer a market of additional items for the software for general users, is installed. Here, users who own the software for advanced can upload materials for dance CG movies (for example, original music, original character modeling data, original move data, etc.) in the additional item market. Uploaded data may be managed in a cloud server, not in a single additional item market server.

The software for general users can access the above additional item market, and the users of this software can choose a desirable item (dance CG movie material) and purchase it at a predetermined price. Note that it is preferable that items to be displayed in the additional item market should pass a predetermined examination.

Then, the users who own the software for advanced users and have uploaded purchased items are paid a revenue share.

In addition, the software for advanced users and the software for general users can upload dance CG movies that are made on a movie site, an upload server and so on. Here, when an advertising revenue is produced from an uploaded dance CG movie, the creator of the dance CG movie and the provider of the dance CG movie materials are paid a revenue share.

According to this business model, users are motivated to create music, motion data, etc., so that the choreo data according to the present invention may be used even more actively.

<Making of CG Movie Using Choreo Data 2>

Below, another example in which the user operates an application, and generates a new CG movie by combining a plurality of pieces of choreo data will be described.

The application interface of the present embodiment is more suitable for real-time editing of CG while playing predetermined data (for example, sound data) than the application interfaces shown in FIGS. 22 and 23. According to the configuration of the present embodiment, the user can edit CG while having fun like playing a rhythm game.

Furthermore, according to the present embodiment, editing can be performed easily for each predetermined configuration unit by switching between a plurality of editing modes as controlled by the user. An editing mode, according to the present embodiment, limits the dance candidates that can be selected in this mode to those with common features (for example, motions with respect to a specific part of the body). For example, the action mode and the step mode may be defined as editing modes.

Here, the dance candidates that can be selected in the action mode are comprised of dances (hereinafter referred to as "actions") with many/big upper body movements. For example, the actions may include movements such as "clap" (handclap), "turn," "pose," "swinging arms," "pumping fists," "gesture," etc.

Here, the dance candidates that can be selected in the step mode are comprised of dances with many/big lower body movements (hereinafter referred to as "steps"). For example, steps may primarily consist of movements of legs/feet such as "side," "hop," "walk," "kick," "stay" and so on.

Note that the actions and/or steps may be configured to define not only movements of the upper body/lower body, but also movements of the whole body (joint angles with respect to the whole body). Also, as actions and steps, it is possible to use the same motions as the above-described basic moves, variation moves, accents, etc.

Figure 25:
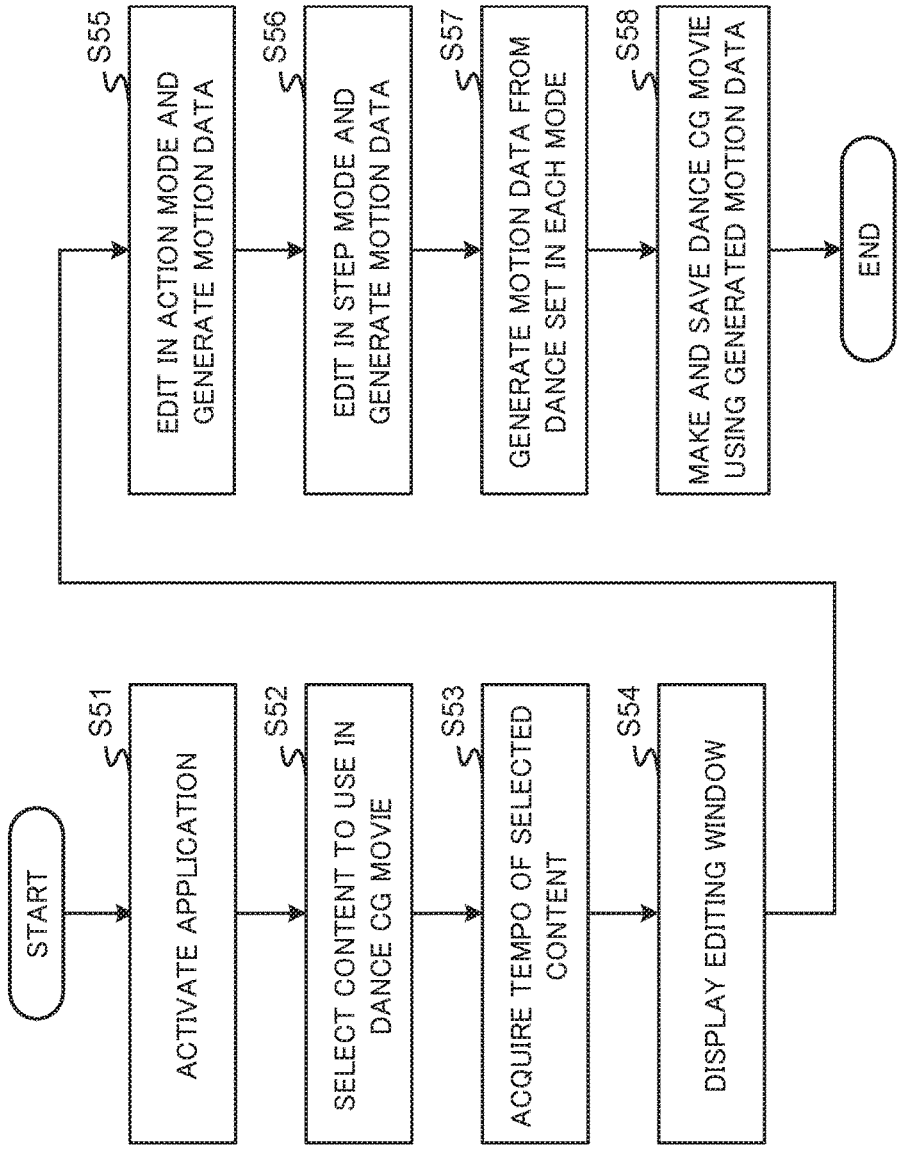
FIG. 25 is a diagram to show another example flow for making a dance CG movie by using moves saved as choreo data.

FIG. 25 is a diagram to show another example flow for making a dance CG movie by using moves saved as choreo data. Note that, similar to the example of FIG. 22, an example of a case, in which the user terminal 10 (hereinafter simply referred to as "user terminal") shown in FIG. 2 makes a dance CG movie tuned to music by using a predetermined application as controlled by the user, will be described with reference to FIG. 25. Furthermore, although FIG. 25 shows an example, in which editing is performed in the action mode and in the step mode, but the editing modes for use are by no means limited to these. For example, other modes to include movements related to a specific part of the body (such as the right-half body) may be defined and used.

Steps S51 to S53 may be the same as steps S31 to S33 of FIG. 22, so that the description thereof will be omitted.

Figure 26:
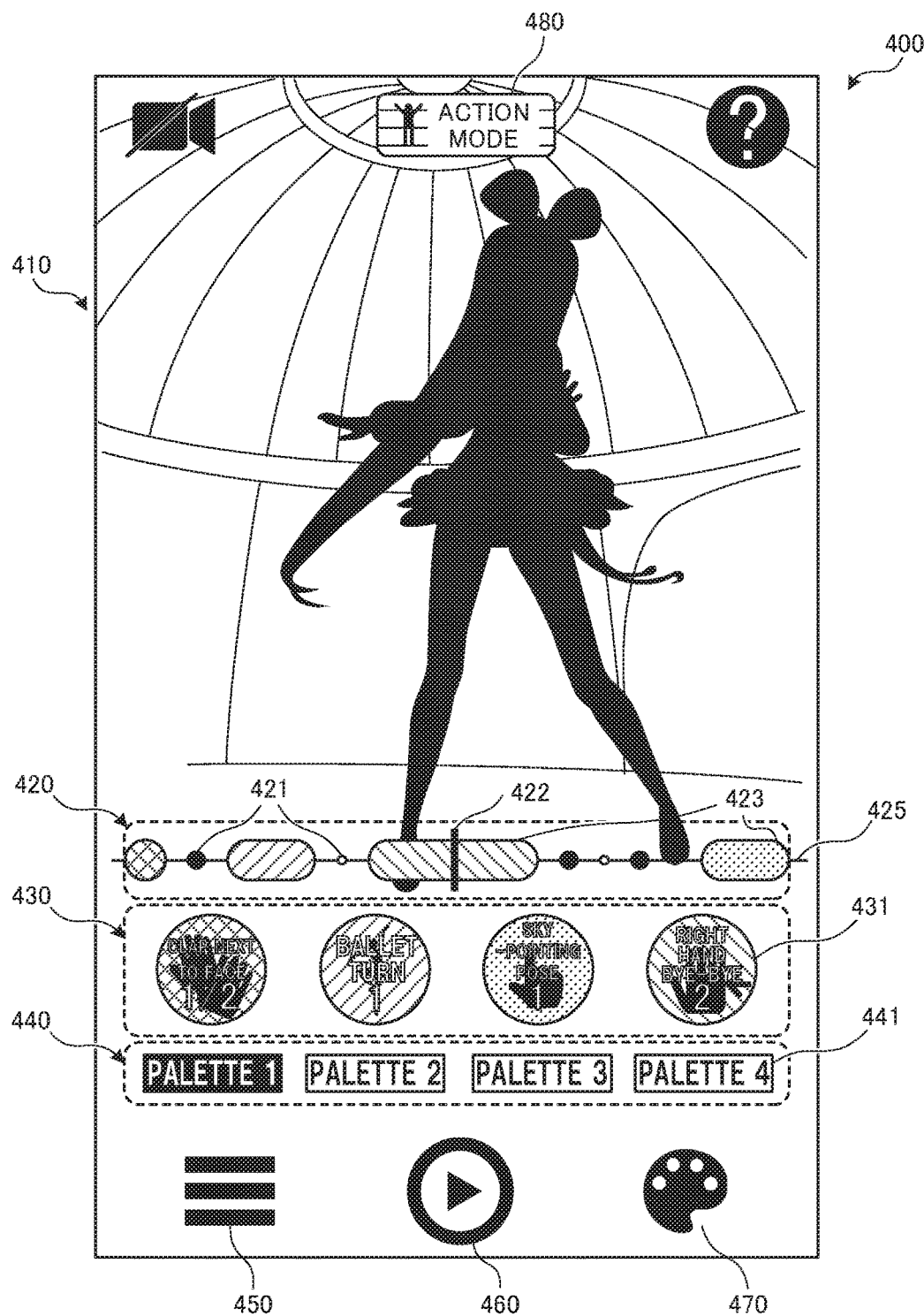
FIG. 26 is a diagram to show another example of an editing window.

The user terminal displays an editing window 400 that is visible to the user, in order to link the playback position of the music with moves (step S54). FIG. 26 is a diagram to show another example of the editing window. As shown in FIG. 26, the editing window 400 is comprised of a first field 410 for displaying a CG model, a second field 420 for displaying the timeline of the dance selected by the user, a third field 430 for displaying dance candidates that can be selected, a fourth field 440 for switching between the dance candidates, a menu display section 450, a playback commanding section 460, a palette edition commanding section 470 and an editing mode specifying section 480.

The first field 410 is used to appropriately display a preview of selected dance during editing.

The second field 420 is used to visualize the playback position of the music. In the second field 420, a marker line 425, on which timing markers 421 (for example, points) are placed, is defined. The present playback position is indicated by a present playback position indication line 422 arranged in the center part of the second field 420.

Here, the timing markers 421 are arranged on the marker line 425 so as to show predetermined beat intervals (for example, ½-beat intervals). Furthermore, the user terminal displays each timing marker 421 on the marker line 425 such that each timing marker 421 moves along the direction the marker line extends (for example, to the left) following playback of the music. In FIG. 26, points are arranged at ½-beat intervals on the marker line 425, where an up-beat is indicated by a point that is slightly larger than that of a down-beat. Note that the marker line 425 may not be displayed. Also, the distinction between a down-beat and an up-beat is by no means limited to this, and no such distinction needs to be drawn.

Also, on the marker line 425, the content of the dance selected at each playback position is displayed in a manner that is comprehensible to the user. To be more specific, a dance marker 423 for specifying the selected dance is placed on the marker line 425. For example, when a user selects a dance that is one beat long at a predetermined playback position, a dance marker 423 to show a duration of one beat from the playback position is placed. That is, the starting position of the dance marker 423 indicates the position at which the selected dance starts being played. In other words, the starting position of the dance is selected in association with a predetermined playback position of the music.

Also, dance markers 423 may be represented in varying patterns depending on the content of dance that is selected. For example, the patterns may be formed in different shapes, markings, colors or combinations of these, so that the patterns are mutually distinguishable. In addition, the content of dance may be displayed by combining characters and patterns.

Note that the present playback position indication line 422 may be arranged in a position other than the center part of the second field 420. Although the marker line 425 is a straight line in FIG. 26, this is by no means limiting. For example, the marker line 425 may be a curved line, a zigzag line, a spiral line and so on. Furthermore, instead of the marker line 425, a marker plane (for example, a square, a circle, etc.) may be used. In this case, for example, the user terminal may make the present playback position indication line 422 a side of the marker plane and display the timing marker 421 such that the timing marker 421 having the same shape as the marker plane widens in the direction (radial direction) to extend from the center of the marker plane, following the music that is played.

In the third field 430, dance candidates 431 that can be selected are displayed. Here, a set of a predetermined number of (for example, four) dance candidates 431 is also referred to as a "palette." Like dance markers 423, dance candidates 431 may be represented in different patterns depending on the content of dance.

Furthermore, each dance candidate 431 is preferably displayed so that the user can check the number of beats in the corresponding dance. The number of dance beats may be displayed in letters. For example, referring to FIG. 26, the character "½" is assigned to the dance candidate 431 of "handclap next to face," the user can recognize that the dance is ½-beat long.

When a predetermined dance candidate 431 is selected by the user's operation, a dance marker 423 is placed based on the present playback position shown with the present playback position indication line 422. The playback position where the dance marker 423 is actually placed may be the present playback position, or may be a position that is shifted from the present playback position.

To be more specific, the starting position of the dance marker 423 is preferably corrected (adjusted) based on the tempo of the music. For example, preferably, the starting position of the dance marker 423 is shifted so that the dance marker 423 is inserted in the down-beat (or the up-beat) that is closest to the present playback position. That is, if there is an input at an odd timing, the user terminal may convert this input to an input at the timing of a predetermined beat (for example, ½ beat) that is closest to that timing. Note that the method of correcting the position where the dance marker 423 starts is by no means limited to this.

Furthermore, when a predetermined dance candidate 431 is selected for a certain period of time while music is played (for example, when the editing window 400 configured as a touch panel is pressed and held), dance markers 423 may be placed consecutively in the down-beats and/or up-beats included in this certain period of time, or may be placed in the down-beats and/or up-beats near this period of time, and so on.

In the fourth field 440, a palette selection section 441 is displayed. Multiple palette selection sections 441 may be displayed, and, in FIG. 26, a palette selection section 441, showing a palette 1, a palette 2, etc., is displayed. When a predetermined palette selection section 441 is selected by the user's operation, the user terminal displays the selected palette in the third field 430. The palette selection section 441 is preferably configured so that which palette is displayed in the third field 430 can be seen. In FIG. 26, palette 1 is selected.

Note that, when one palette includes dance candidates 431 more than the number of dance candidates 431 that can be displayed in the third field 430 at the same time, the user may change the dance candidate 431 to display in the third field 430 by performing a predetermined operation on the third field 430 (for example, when a flick operation is made on the editing window 400 configured as a touch panel)). Also, in this case, the fourth field 440 and the palette selection section 441 can be omitted.

The menu display section 450 is used to display a menu in the editing window 400 based on the user's operation. From the display of the menu, the user chooses selecting a dance list (history) created in the past, creating a new dance, changing the CG model, changing the background (stage) of the editing window 400, saving a dance motion/video that is made, changing the number of dance candidates 431 in one palette, changing the number of palettes displayed in the fourth field 440, changing other settings and so on, and the user terminal performs the selected process.

The playback commanding section 460 is used to command playback/stop of music as controlled by the user. Following the playback of the music, as described above, each timing marker 421 and dance marker 423 in the second field 420 move in the direction the marker line 425 extends, and, at the timing the dance marker 423 reaches the present playback position indication line 422, the CG model displayed in the first field 410 dances the dance linked with the dance marker 423.

Note that it is also possible to adopt a configuration in which the user is able to change the position where the music is played ("seek" can be performed), by performing a predetermined operation (for example, when a flick operation is made, if the editing window 400 is configured by a touch panel) on the second field 420 while playback is in progress and/or while playback is stopped. In addition, a configuration may be adopted here in which "seek" can be made only while playback is stopped.

Furthermore, a configuration may be employed here in which the user applies a predetermined operation to the dance marker 423 in the second field 420 while playback is stopped, so that the dance marker 423 can be deleted (for example, when a tap operation is made, if the editing window 400 is configured by a touch panel).

Note that, when a predetermined dance candidate 431 is selected by the user's operation, the user terminal performs the process to make the CG model do the dance indicated by the dance candidate 431, but a configuration may be adopted here in which a predetermined sound is produced in response to the dance. For the predetermined sound, a sound related to the movement of the dance may be played, or a sound effect to indicate that the dance is selected may be played (for example, a hand-clapping sound in the event of "clap"). According to this configuration, even if a gap is produced in real-time playback of dance motions, for example, it is still possible to make it difficult for the user to notice the gap.

Figure 27:
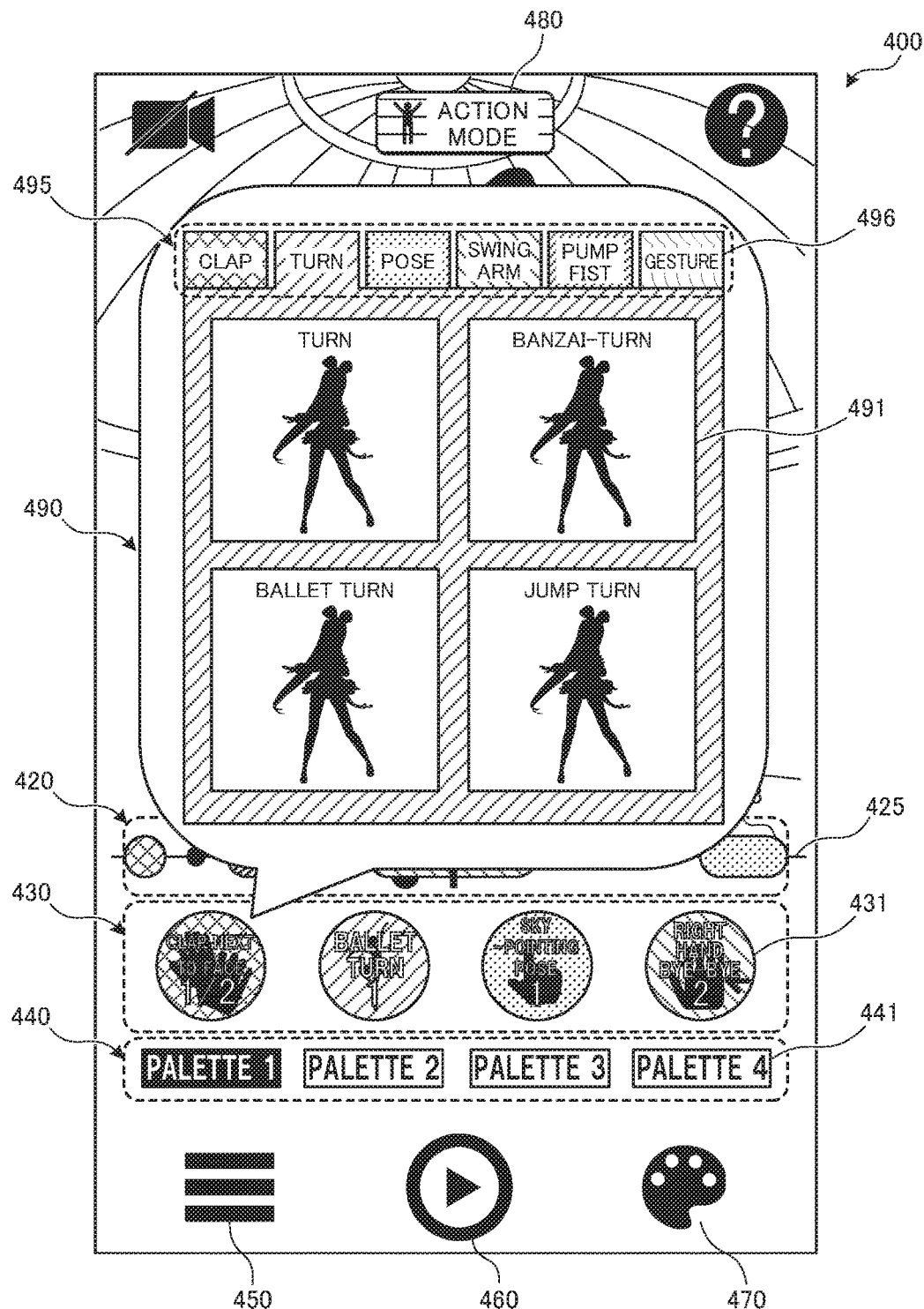
FIG. 27 is a diagram to show an example of a palette editing window.

The palette edition commanding section 470 is used to command that the content of the palette start being edited in response to the user's operation (a command to switch to the palette editing window). FIG. 27 is a diagram to show an example of a palette editing window. For example, in FIG. 26, when the palette edition commanding section 470 is operated by the user, the editing window 400 changes as shown in FIG. 27.

In FIG. 27, the editing window 400 includes a dance selection section 490 for selecting the dance that is linked with a predetermined dance candidate 431. The predetermined dance candidate 431 to be edited is selected when the user operates the third field 430. Furthermore, the content of the palette displayed in the third field 430 is determined when the user operates the palette display section 441.

The dance selection section 490 includes, for example, a dance display section 491 displaying a preview of each dance. When one dance display section 491 is selected by the user's operation, the dance candidate 431 is set to the dance of the selected dance display section 491.

Here, it is preferable to display a dance group tab section 495 for limiting the dances to be displayed in the dance display section 491 to similar dances. The user makes a choice among the dance group tabs 496 included in the dance group tab section 495 in order to identify a dance group comprised of dances having a predetermined feature. For example, as shown in FIG. 27, if "turn" is the dance group tab 496 the user chooses, dances with turns such as "turn" and "ballet turn" are displayed in the dance display section 491.

Note that the dance marker 423 and the dance candidate 431 that are assigned to dances included in the same dance group may have the same pattern or have varying patterns per dance.

When there are a plurality of dance editing modes, an editing mode specifying section 480 is used to command switching of the editing mode as controlled by the user. When the editing mode is switched, the display of the second field 420, the third field 430 and the fourth field 440 is switched to information of the corresponding editing mode. That is, with the present embodiment, multiple dance editing modes can be edited separately, so that, for example, it is possible to edit a CG model flexibly, on a per part basis, such as editing the upper body alone and then editing the lower body alone.

Figure 28:
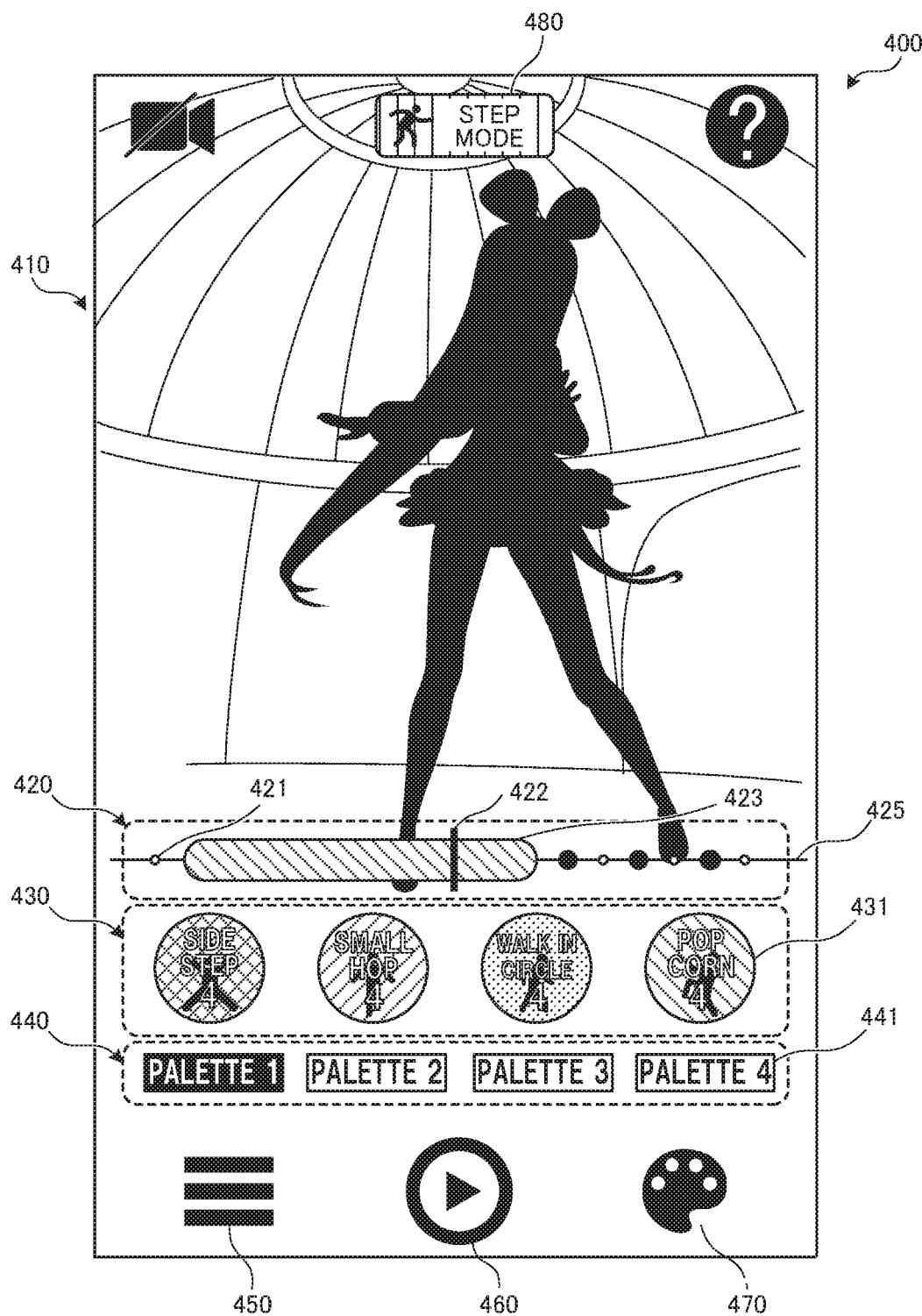
FIG. 28 is a diagram to show another example (step mode) of an editing window.

FIG. 28 is a diagram to show another example (step mode) of the editing window. For example, in FIG. 26, when the editing mode specifying section 480 is operated by the user, the editing window 400 changes as shown in FIG. 28.

Note that the editing mode commanding section 480 may be used to display the present editing mode. For example, FIGS. 26 and 27 show that the present editing mode is the action mode, and FIG. 28 shows that the present editing mode is the step mode.

Furthermore, the editing window 400 is by no means limited to the configuration shown in FIGS. 26 to 28. For example, although the present embodiment is configured so that the timing marker 421 and the dance marker 423 of the second field 420 are each configured to move along the direction in which the marker line extends, so as follow playback of music, it is equally possible to configure the present embodiment so that the present playback position indication line 422 moves. In addition, in the editing window 400, a help command section for commanding display of help and tutorial may be provided, or a recording commanding section for commanding recording of CG movies may be provided.

The user terminal edits in the action mode and edits in the step mode, in accordance with operations from the user via the editing window 400 (steps S55 and S56). Then, the user terminal generates motion data from the dance set in each mode (step S57). Here, the motion data may be generated in accordance with the editing in steps S55 and S56, or the motion data may be generated when triggered by a predetermined operation in step S57 after editing (for example, when "save" is selected in the menu). The motion data that is generated on a real-time basis in S55 and S56 may be used to display a preview in the first field 410 while editing is in progress. Furthermore, editing in each mode is by no means limited to the order shown in FIG. 25.

Then, the user terminal makes and saves a dance CG movie by using the motion data generated (step S58). Note that the motion data generated in step S57 may be separately saved/used as choreo data.

Further problems may arise regarding the generation of motion data upon transitions across a plurality of motions and upon simultaneous setting of a plurality of motions, in step S57 and so on. Solutions to these problems according to the present invention will be explained below.

<Blending of Motions>

A method of making motions of a CG model using choreo data has been described with reference to FIGS. 22, 23 and 25 to 28. However, if different motions are set in beats that are consecutive in chronological order (that is, when motions transition), implementing each piece of motion data on an as-is basis only makes the connections between the movements unnatural, which is a problem.

Figures 29A, 29B:
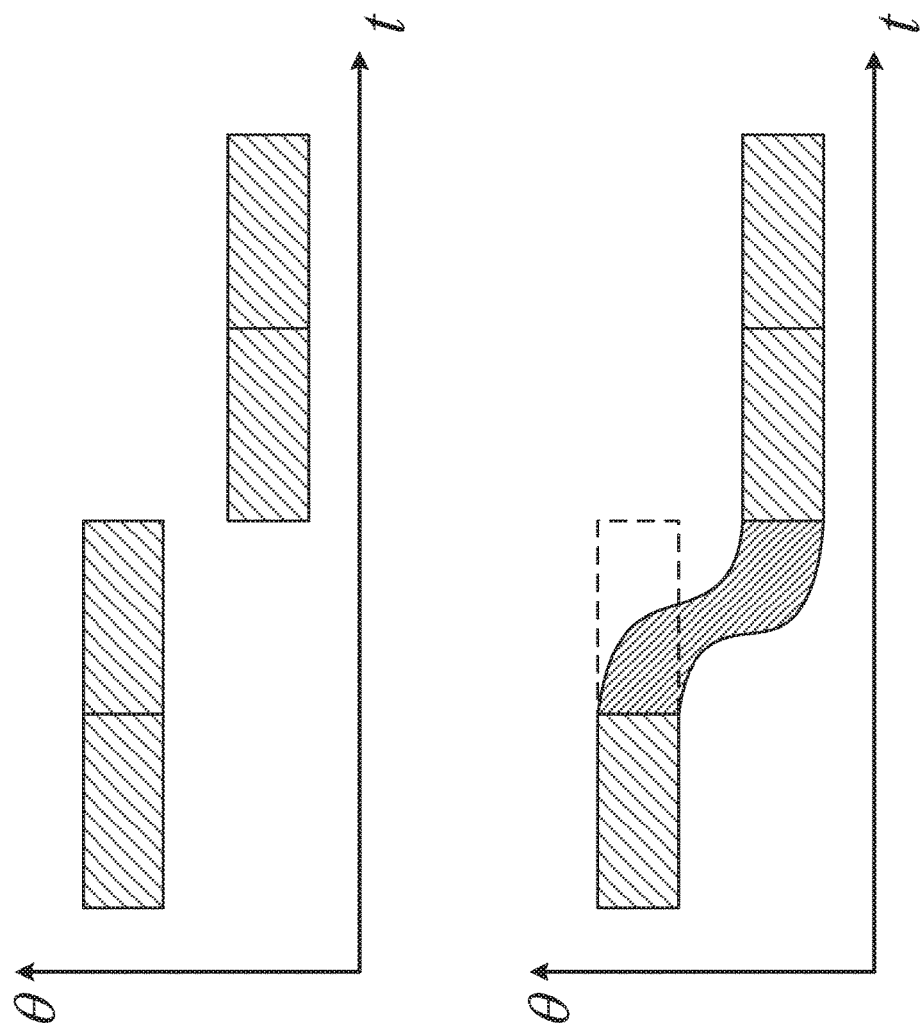
FIGS. 29A and 29B provide diagrams to show examples of cases in which two two-beat motions with different joint angles are connected.

This problem will be explained with reference to FIG. 29. FIG. 29 show examples of cases where two motions of two beats of varying joint angles are connected. In FIG. 29, the horizontal axis is the time (t) and the vertical axis is the angle (θ). FIG. 29A shows a case where each motion data is applied on an as-is basis. In this case, since the joint angle has to make a discontinuous transition at the boundary of motions, the movement may be portrayed as being unnatural.

As a conventional method of making transitions across motions, there is a blending process to combine a previous motion and a subsequent motion at a fixed ratio in the transition period. For example, when blending certain motion data 1 and motion data 2, the two motions can be connected by changing the weight of each motion data to 10:0→5:5→0:10, over time. However, when conventional motion data, which is not choreo data, is used, since it is only possible to roughly interpolate the data of the entire motion, there is a possibility that the movement of bones becomes unnatural.

Therefore, the present inventors have focused on the fact that choreo data carries motion data on a per beat basis. In addition, the present inventors have focused on the fact that the movement in a beat near the end of a motion leaves limited impression on the user. Furthermore, on the other hand, the movement in the first beat in a motion, if not started strictly with the beat, leaves an unnatural impression on the user. Based on these points of view, the present inventors have found out a way to make natural transitions across motion data.

To be more specific, as shown in FIG. 29B, upon a transition across motion data, the motion data of each pose included in beats in the second half of the previous motion (for example, the last one beat) and the motion data of the first pose in the next motion are blended, per joint, in chronological order, according to predetermined rules. For example, if there is motion data per ⅛ beat, blended motion data for eight points in the last one beat is generated and used. This makes it possible to smoothly connect the end of the previous motion to the first beat of the next motion, and produce a natural motion.

Note that, when motions are interpolated, this refers to making the whole of a given pose transition to another pose based on a predetermined interpolation method. When motions are interpolated, several poses to connect between two poses are generated. Meanwhile, blending of motions (bone-level blending) according the present embodiment refers to a method of blending a plurality of poses of a predetermined number of beats with a post-transition pose, on a per component basis (on a bone level), and making a transition to the post-transition pose by joining each blended component (or the whole pose). In other words, in the blending of motions according to this embodiment, multiple motions are blended on a per bone (joint) basis. Furthermore, the specific methods of interpolation and blending are not particularly limited, and an existing weighting method or the like may be used.

<When Multiple Dances are Set at the Same Timing>

As described above, when editing is possible in multiple modes, it is conceivable that multiple dances are set at the same timing. In this case, since a plurality of angles are set in certain bones, there is a possibility that the movement of each bone becomes awkward.

So, the present inventors have come up with the idea of deciding the movement of a CG model, in a period in which a plurality of pieces of motion data are set at the same time (referred to as "simultaneous setting period"), by prioritizing certain pieces of motion data.

Below, an example case will be described where, in a period in which a four-beat step is set, an action is also set in the second-half two beats thereof, but this is by no means limiting. Furthermore, assume, with this example, that the coordinates (joint angle) of components relating to the whole body of a CG model are stored in the motion data of the step.

First, a case will be described, in which the motion data of the action includes information about the upper body alone. FIG. 30 show examples in which the action and the step are blended when the motion data of the action includes information about the upper body alone. In FIG. 30, the motion data (joint angles) of the step and the action, corresponding to respective parts, are shown.

Figure 30A:
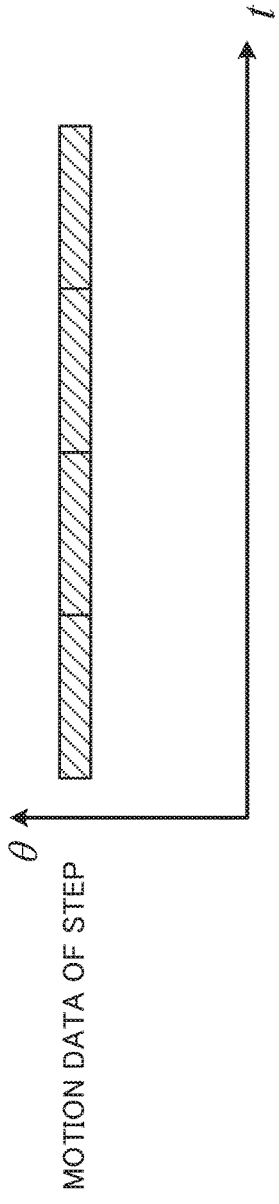
FIGS. 30A, 30B and 30C provide diagrams to show examples of blending action and step when the action's motion data includes information about the upper body alone.

FIG. 30A is a diagram to show the joint angle of a predetermined bone in the lower body. In this example, since the lower body is not influenced by the action in the simultaneous setting period, the motion data of the step is used.

Figure 30B:
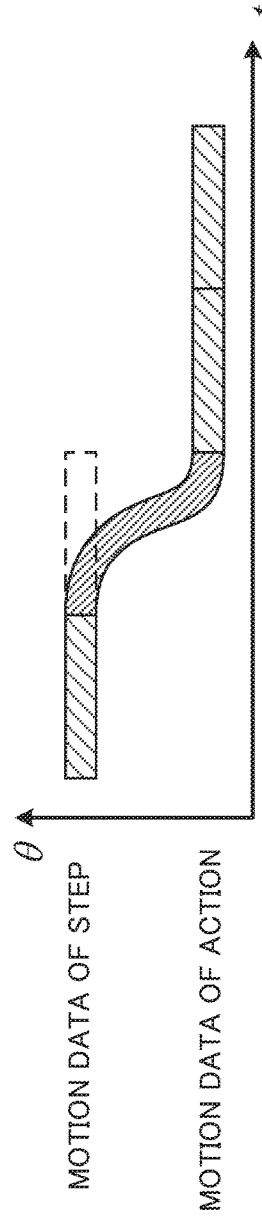

FIG. 30B shows the joint angle of a predetermined bone in the upper body. Meanwhile, in the simultaneous setting period, the upper body uses the motion data of the action. Here, regarding the upper body, a discontinuous period is produced between the first-half two beats and the second-half two beats, and therefore the bone-level blending according to the above-described embodiment of the present invention is applied, so that each bone (for example, LA2 in FIG. 3) in the upper body (such as an arm) is smoothly transitioned one beat before the simultaneous setting period.

Also, the angle of some bones may be corrected by weighting the motion data of the step and the motion data of the action. To be more specific, regarding the angles of bones (for example, B1, B2, N and/or others in FIG. 3) constituting the body axis (the spine, the neck, etc.), it is preferable to use angles acquired by weighting the motion data of the step and the motion data of the action.

Figure 30C:
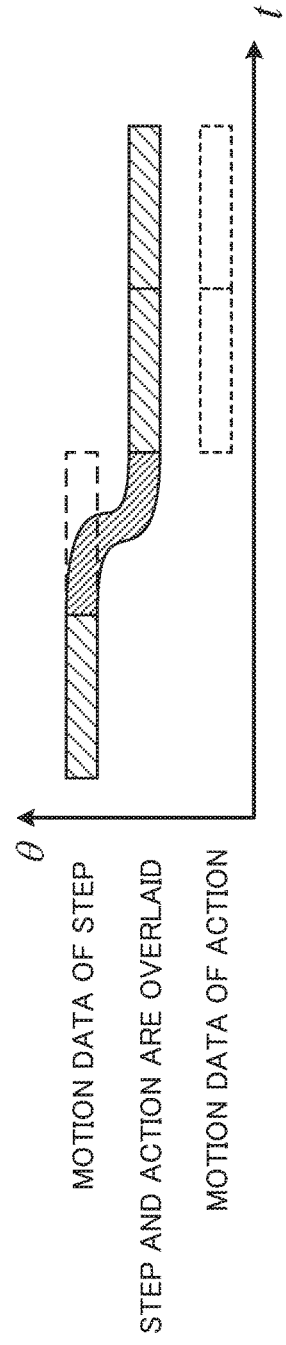

FIG. 30C is a diagram to show the joint angle of a predetermined bone belonging to the body axis of the upper body. Although the motion of the next action corresponds to the angle indicated by the dotted line of FIG. 30C, by weighting this with the motion of the next step, the motion of the second-half two beats is newly calculated. By doing this, a more natural transition can be achieved.

Meanwhile, when the motion data of the action contains information about the whole body, in the simultaneous setting period, the motion data of the action is employed. That is, in the simultaneous setting period, the motion of the step is portrayed as if it were replaced with the motion of the action. At this time, a discontinuous period is produced between the first-half two beats and the second-half two beats over the whole body, so that the above-described bone level blending is applied to all bones, and each bone in the upper body (arms, etc.) is smoothly transitioned one beat before the simultaneous setting period.

<Difference in Blending Process During Real-Time Editing and after Editing>

As shown in FIGS. 25 to 26, when a motion that is edited on a real-time basis is displayed, a new problem arises. For example, while the CG model is moving in a predetermined motion, if another motion is designated by the user's operation and the motion is suddenly switched, this leaves an unnatural impression.

Also, if the start of motion data is limited to the nearest down-beat (or up-beat) to the present playback position, if a motion is designated in the middle of a beat, the playback of this motion data may affect other unintended beats as well. On the other hand, if a motion is played again after editing, the motion will not start in the middle of a beat (when motion data that is already set is played).

Thus, assuming a system in which motions can be edited on a real-time basis, the present inventors have focused on the fact that the timing of motion transitions varies between playback during editing and playback after editing. As a result of this, the present inventors have come up with the idea of changing the method of generating transitioning motions between these two cases.

Below, the method of generating transitioning motions will be described. Since the process varies depending on whether the input from the user is earlier or later than desired timing, both cases will be explained.

(When User Input is Late)

FIG. 31 show examples of cases in which an input from the user is later than desired timing. FIG. 31A shows a case where a motion is played simultaneously with editing, and FIG. 31B shows a case where a motion that is already edited is played. Each case illustrates an example in which, in a predetermined joint, a motion of an angle $\theta_1$ transitions to a motion of an angle $\theta_2$. Here, assume that the motion of angle $\theta_2$ is one-beat long.

In FIG. 31A, after the down-beat 500 is over, an input is entered at a timing within a ¼ beat (input timing 700). Therefore, the motion of angle $\theta_2$ is input, intended to be set in the period from a down-beat 500 to a down-beat 501. However, the playback of the motion is already finished in the period from the down-beat 500 to the input. For this reason, the user terminal performs control so that a down-beat of the input motion is displayed at a transition completion timing 800, which is a predetermined duration (for example, 5 frames, a ¹⁄₁₆ beat, etc.) after the input timing 700. The transition from the input timing 700 to the transition completion timing 800 is made by interpolating the poses in these timings.

From the transition timing 800 onward, the motion is fast-forwarded toward the next down-beat or up-beat (in the case of FIG. 31A, the up-beat 601), to make up for the delay from the beat (down-beat 500) where the input was originally intended. Also, control is applied so that, from the next down-beat or up-beat onward, the playback is made at normal speed.

FIG. 31B shows a case where choreo data having been subjected to the editing of FIG. 31A is played. In this case, the motion of $\theta_1$ of the down-beat that is one beat before the down-beat 500 and the motion of $\theta_2$ of the down-beat 500 are interpolated. In FIG. 31B, the motion of $\theta_2$ is played from the down-beat 500 to the down-beat 501, and, unlike the case of FIG. 31A, not fast-forward. Note that the above-described bone-level blending may be used instead of interpolation.

(When User Input is Early)

Figure 32A:
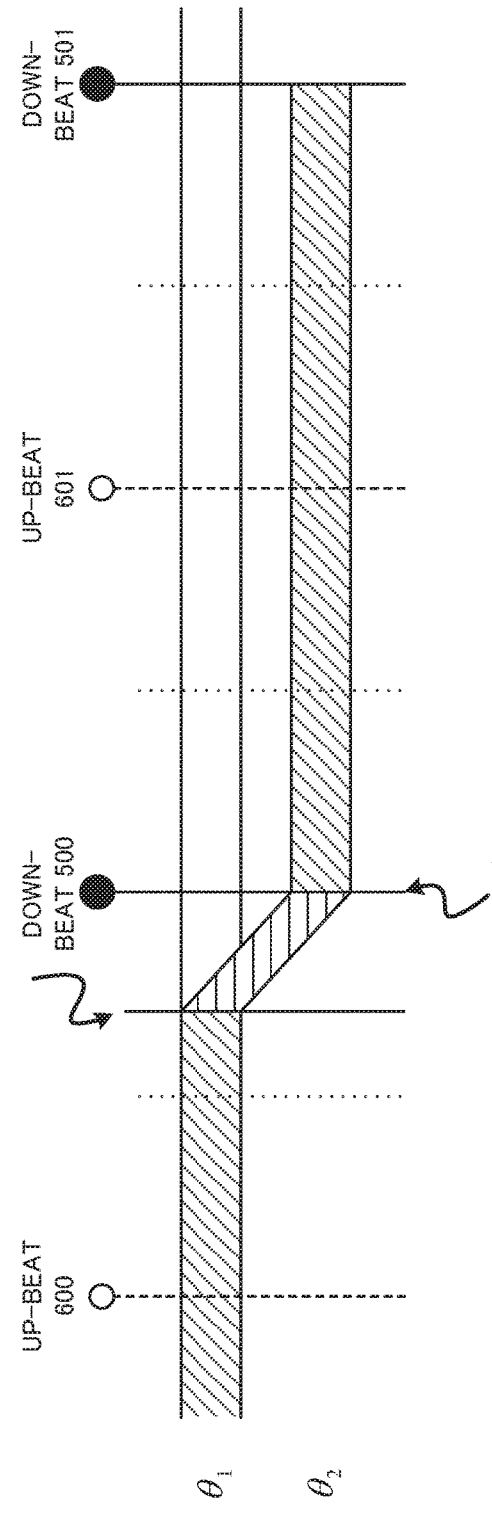
FIGS. 32A and 32B provide diagrams to show examples of cases in which the user's input is earlier than desired timing.
Figure 32B:
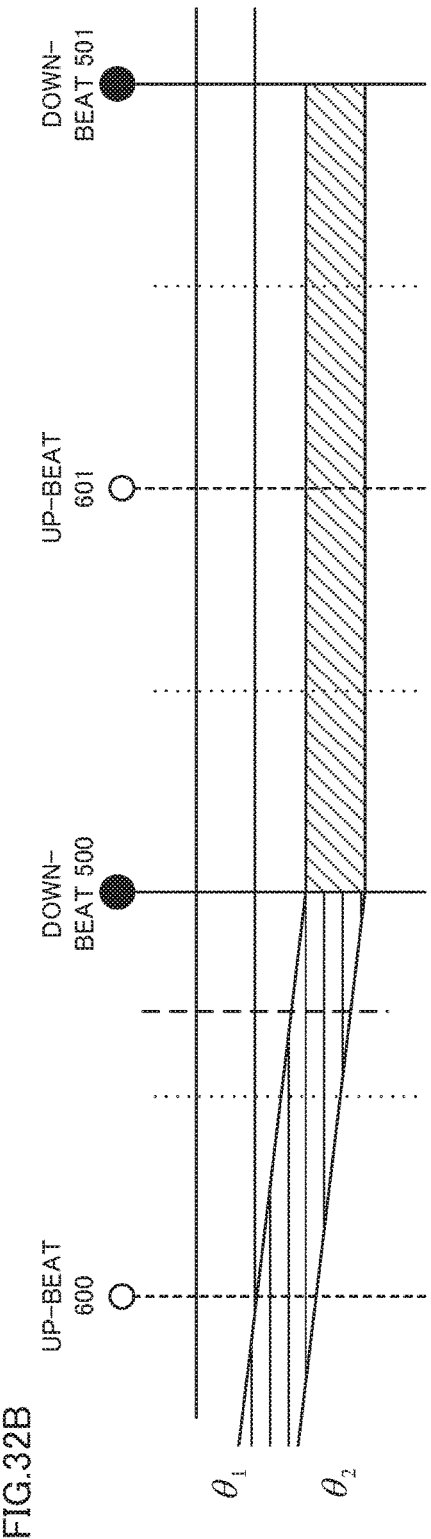

FIG. 32 provide diagrams to show examples of cases where the input from the user is earlier than desired timing. FIG. 32A shows a case where a motion is played simultaneously with editing, and FIG. 32B shows a case where a motion that is already edited is played. These drawings are the same as FIG. 31 except that the input timing 700 is different.

In FIG. 32A, an input is entered at a timing (input timing 700) within ¼ beat before the down-beat 500. Therefore, the motion of angle $\theta_2$ is input, intended for the period from the down-beat 500 to the down-beat 501. Therefore, the user terminal applies control so that a down-beat of the input motion input will be displayed from the down-beat 500 onward. Meanwhile, the transition from the input timing 700 to the down-beat 500 is made by interpolating the poses in these timings (blending is not used). That is, the transition completion timing 800 matches with the down-beat 500.

FIG. 32B shows a case where choreo data having been subjected to the editing of FIG. 31A is played. In this case, the playback process is the same as in FIG. 31B.

Note that although FIGS. 31 and 32 have shown example cases where an input is entered near a down-beat, this is by no means limiting. A similar approach can be taken when an input is entered near an up-beat.

<Variation of Motion Data>

Although, generally, motion data represents a motion that begins with a down-beat and ends with a down-beat, the embodiment of the present invention is by no means limited to this. For example, a motion may be defined to start from an up-beat and end with a down-beat. FIG. 33 shows an example of motion data assumed in the present invention.

FIG. 33A shows a two-beat motion of "forward roll, finishing pose," which is presumed to start from a down-beat and end at a down-beat. Although, strictly speaking, a preliminary movement of getting one's hands on the ground is required before making a "forward roll," the motion of FIG. 33A does not include this preliminary movement, and therefore there is a possibility that the motion may look like an unnatural movement.

FIG. 33B shows a two-beat motion of "forward roll, finishing pose," which is presumed to start from an up-beat and end at a down-beat. Here, it is preferable not to count the number of beats in the movement during the first period from an up-beat to a down-beat, corresponding to the preliminary movement. In the example of FIG. 33B, a more realistic forward roll is realized by making a warped pose once in the first up-beat.

Note that choreo data to represent a motion that starts from an up-beat may be configured to contain information that indicates that the motion starts from an up-beat. This allows the user terminal to recognize that a given motion (including preliminary movement) begins with an up-beat, and blend the motion appropriately.

When a motion starts from an up-beat, the blending method is different from that used when a motion starts from a down-beat. This will be explained below.

(When User Input is Late)

FIG. 34 provide diagrams to show other examples of cases in which an input from the user is later than desired timing. FIG. 34A shows a case where a motion is played simultaneously with editing, and FIG. 34B shows a case where a motion that is already edited is played. These drawings are the same as FIG. 31 except that the motion at angle $\theta_2$ includes a preliminary movement of half a beat. Assume that, with this example, the input from the user is used to specify the timing of the first down-beat in the motion. In other words, the preliminary movement is not started at the timing the user's input is entered.

In FIG. 34A, the preliminary movement is ignored, and as in FIG. 31A, the user terminal performs control so that a down-beat of the input motion is displayed a predetermined duration after the input timing 700, at the transition completion timing 800. In this case, as in the case of FIG. 31A, playback is fast-forwarded (fast playback) so as to make up for the delay.

FIG. 34B shows a case where choreo data that has been subjected to the editing of FIG. 34A is played again. In this case, the half-beat motion of $\theta_1$ from an up-beat 600 to a down-beat 500 and the preliminary movement of motion of $\theta_2$ are blended on a bone level (interpolation is not used). In FIG. 34B, the motion of $\theta_2$, not including the preliminary movement, is played from the down-beat 500 to the down-beat 501, and, unlike in FIG. 34A, not fast-forwarded.

(When User Input is Fast)

FIG. 35 provide diagrams to show other examples of cases in which an input from the user is earlier than desired timing. FIG. 35A shows a case where a motion is played simultaneously with editing, and FIG. 35B shows a case where a motion that is already edited is played. These drawings are the same as FIG. 32 except that the input timing 700 is different.

In FIG. 35A, the preliminary movement is ignored, and as in FIG. 32A, the user terminal performs control so that a down-beat of the input motion is displayed from a down-beat 500, as in the case of FIG. 32A.

FIG. 35B shows a case where choreo data having been subjected to the editing of FIG. 35A is played. In this case, the playback process is the same as in FIG. 34B.

Note that although FIGS. 34 and 35 have shown example cases where an input is entered near a down-beat, this is by no means limiting. A similar approach can be taken when an input is entered near an up-beat.

Also, although FIGS. 31A and 34A have been described to make fast forward playback when an input is late, this is by no means limiting. For example, assuming that motions have been switched at the originally-intended timing, the motion after the transition may be played from halfway through. To be more specific, referring to FIG. 31A, at the transition completion timing 800, the pose to be played after editing is displayed at that timing, and control may be applied so that the pose is displayed by skipping the data that is supposed to be played during the time from the down-beat 500 to the transition completion timing 800.

<Applied Example Using Choreo Data>

Applied examples using choreo data according to the present invention will be described below.

Choreo data of a certain CG model, created as motion data, may be converted into motion data of another CG model, or may be used for playback. This conversion may be carried out by way of converting the coordinates of each component of the CG model (by, for example, adjusting the position, the angle, etc.), by taking into account the skeletal structure of the CG model, the initial state of the hierarchical structure, the reference posture, the length of each bone, the movable range of each joint and so on. Furthermore, these parameters to be considered in this conversion may be included in the choreo data.

Also, the object to be moved by using choreo data is by no means limited to a CG model. For example, a robot that is formed in a skeleton structure such as a skeleton model may be operated using choreo data. In this case, considering the skeleton structures of the CG model used to make the choreo data and of the robot, the length of each component and so on, the above-described coordinate conversion may be applied to the choreo data which the robot uses.

Choreo data can be applied to a choreography copyright management system. For example, by saving various dances in the form of choreo data that is normalized at predetermined BPM, it becomes possible to judge infringement easily. The system may be constituted by, for example, the server shown in FIG. 1, and in the following description, how this server functions as a database of choreo data or as a choreography similarity judging device will be described.

First, the copyright management system registers a dance choreography of a predetermined duration (or a duration of a predetermined number of beats) in the database in choreo data format. Here, the choreography cannot be considered a piece of creative work if it is too short, and therefore has to have a certain length. The length may be determined by a predetermined organization, for example. Note that the length may vary depending on the choreography.

In addition, the copyright management system samples motion data as an object for comparison, with respect to the choreography of a dance movie, performance, program, etc. by a CG model or by a living human being, and judges the similarity with the choreo data in the database. Here, the motion data of the object for comparison is converted into choreo data format, so that a comparison can be easily made. For example, it is also possible to make a comparison focusing on the movement of only a part of the body.

Then, if the movement of the bone represented in each piece of data is within a pre-defined range of deviation, it is judged that the original work (choreography) is infringed. Note that, even if the method of judging the similarity of MIDI data as sound data is applied to choreo data format, it is still difficult to appropriately judge the similarity of motion data. This is because, According to an embodiment of the present invention, even when SMF format is employed as choreo data format, the information indicated by note numbers and velocity is different from that of normal SMF, as shown in FIG. 6.

Also, when a movie to be compared or the like is in commercial use, the copyright management system may issue a certificate stating that a copyrighted work (choreography) under the management of that organization is in commercial use, to a predetermined copyright management organization. By doing this, the organization can collect the fees for the use of the copyrighted work from the party using the copyrighted work, and pay a share to the copyright owner.

In the above embodiment, a case where choreo data is mainly used as dance motion data has been shown, but this is by no means limiting. For example, choreo data can be used to make motion data that represents a person's movements tuned to his/or lines (such as in drama, duo stand-up comedy, skit, solo stand-up comedy, etc.). By using the choreo data, it is possible to let a CG model perform acting in synchronization with lines with variously changing tempos. In particular, in duo-style stand-up comedy, the funny man and the straight man play individual roles and each man's movements are comprised of combinations of fixed patterns of behavior, so that anyone can make CG movies of duo stand-up comedy by using the application shown in FIG. 23.

As another applied example, an example method of creating a CG model to be moved by using choreo data will be described. In this example, bones are specified in a still image such as a photograph, an illustration and so on, so that an original character (original CG model) can be created. For example, this process of making can be realized by the user terminal 10 shown in FIG. 2.

First, photograph data or illustration data of an object having a form resembling a human skeleton is captured. Then, the outer shape of the object is determined from this data. Here, as for the method of identifying the outer shape, the outer shape of the object may be automatically determined by software based on the difference from the background color, may be determined by tracing the outer shape of the object manually by the user's operation (for example, through operation via a touch screen), or may be determined by photographing the object by applying a predetermined outer shape upon photographing.

Next, a certain number of bones are set in the object. The number of bones to set may be, for example, 10 to 18. Also, once an outline of the object is determined, approximate positions of bones are automatically set from the shape. Further, it is possible to adjust the joint positions, the length of bones, etc., based on operations by the user.

Next, the desired BPM for moving the object is determined. For example, it is possible to specify music and import the BPM that matches the music, or the BPM may be manually entered based on the user's operation.

Next, by using the choreo data, motion data for moving the object as choreographed is made. For example, making steps may be carried out as in the flow of FIG. 22. Here, since the object is two-dimensional, the user terminal recognizes the object as three-dimensional data of uniform thickness. This makes it possible place the object in motion as if the paper doll moves in three dimensions.

The created motion data of the object may be uploaded/downloaded in various formats as movie data/animation data. By this means, the motion data of the object can be utilized in various scenes, and, for example, the motion data of the object can be used as wallpaper, as posts on SNS (Social Networking Service), as chat stamps/symbols, and so on.

<Other Configurations>

Incidentally, the server according to the above-described embodiments may have various functions. For example, functions for management of applications that run on user terminals, management of motion data, management of music information distribution, management of receipt information (purchase information), management of CG movie information created by users, user management, coordinated API with other services/systems, external authentication (for example, OAuth 2.0) and so on may be provided.

Furthermore, an application that operates on the user terminal according to the above-described embodiment may have various functions. For example, functions of a tutorial for the user, various settings, version management, PUSH report, billing (store billing, item purchase, etc.), edit log function, streaming playback, news viewing, download of contents (movie, music, etc.), playback of contents protected by DRM, providing support for terminal change (for example, model change), and so on may be provided. Note that the application may be a native application to run on an OS such as Android (registered trademark) OS, iOS (registered trademark), etc., may be a web application that operates with a predetermined browser, or may be one that operates in Flash.

Further, the information processing system described in the above embodiment may include other devices. For example, a predetermined viewing system having a large display or the like may be adopted, and the information processing system according to the present invention may be used for events such as broadcasting and public viewing. For example, using the information processing system according to the present invention, CG movies can be shown in movie theaters, restaurants, event spaces, public spaces and so on.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining example s, and should by no means be construed to limit the present invention in any way.

INDUSTRIAL APPLICABILITY

With the data structure according to an example of the present invention, it is possible to synchronize the movement of a CG model with sound data easily. Therefore, this data structure is useful as a data structure to use in information processing devices related to three-dimensional computer graphics The disclosures of Japanese Patent Application No. 2015-016214, filed on Jan. 30, 2015, and Japanese Patent Application No. 2015-077162, filed on Apr. 3, 2015, including the specifications, drawings and abstracts, are incorporated herein by reference in their entirety.

The invention claimed is:

1. A non-transitory computer-readable storage medium stored thereon a computer program to process a computer graphics (CG) model using a data structure, the computer program, when executed causes a processor to perform the following:

acquiring data that contains first time-series information for designating coordinates of components of a computer graphics (CG) model, in chronological order, on a per beat basis, and that conforms to SMF (Standard MIDI File) format; and processing the CG model based on the first time-series information and displaying the processed CG model onto a display circuit, wherein the CG model is constituted by a skeleton, which is comprised of two joint points and bones connecting between these, wherein, with respect to the coordinates of the components of the CG model, the first time-series information includes information related to a speed system, and wherein the speed system-related information is an offset based on an average value of temporally neighboring data included in the first time-series information.

2. The non-transitory computer-readable storage medium according to claim 1, wherein a channel of the SMF format corresponds to one or a plurality of pieces of the first time-series information.

3. The non-transitory computer-readable storage medium according to claim 1, wherein a note number and a velocity of a note-on signal in the SMF format are used by the processor as information about the coordinates of the components of the CG model.

4. The non-transitory computer-readable storage medium according to claim 1, wherein a delta time in the SMF format is used by the processor as information about a duration of a beat where coordinates of a component of the CG model change.

5. The non-transitory computer-readable storage medium according to claim 1, wherein the first time-series information includes information about a relative angle of a bone of the CG model.

6. The non-transitory computer-readable storage medium according to claim 1, wherein the first time-series information includes information about a relative distance from at least one of an initial position of the CG model and information about a rotation angle of a reference point of the CG model.

7. The non-transitory computer-readable storage medium according to claim 1, wherein a velocity of a note-off signal in the SMF format is used by the processor as the speed system-related information.

8. The non-transitory computer-readable storage medium according to claim 1, wherein the computer program, when executed causes the processor to further perform the following:

converting the first time-series information into second time-series information for designating the coordinates of the components of the CG model, in chronological order, on a per frame basis; and processing the CG model based on the second time-series information.

9. The non-transitory computer-readable storage medium according to claim 1, further comprising information for setting a tempo.

10. A display device comprising:

an acquisition circuit that acquires data that contains first time-series information for designating coordinates of components of a computer graphics (CG) model, in chronological order, on a per beat basis, and that conforms to SMF (Standard MIDI File) format; and a display circuit that displays the CG model based on the first time-series information, wherein the CG model is constituted by a skeleton, which is comprised of two joint points and bones connecting between these, wherein, with respect to the coordinates of the components of the CG model, the first time-series information includes information related to a speed system, and wherein the speed system-related information is an offset based on an average value of temporally neighboring data included in the first time-series information.

11. The display device according to claim 10, wherein the display circuit displays the CG model based on a result of applying an exponential moving average to the first time-series information.

12. The display device according to claim 10, further comprising a playback circuit that plays given data,
wherein the display circuit displays the CG model in synchronization with the given data played by the playback circuit.

13. The display device according to claim 12, wherein the display circuit displays the CG model so that a maximum speed at which the coordinates of each component transition is equal to when the CG model is displayed at a tempo related to the data containing the first time-series information.

14. An information processing method for a computer graphics (CG) model, the method comprising:
acquiring data that contains first time-series information for designating coordinates of components of a computer graphics (CG) model, in chronological order, on a per beat basis, and that conforms to SMF (Standard MIDI File) format; and
processing the CG model based on the first time-series information and displaying the processed CG model onto a display circuit,
wherein the CG model is constituted by a skeleton, which is comprised of two joint points and bones connecting between these,
wherein, with respect to the coordinates of the components of the CG model, the first time-series information includes information related to a speed system, and
wherein the speed system-related information is an offset based on an average value of temporally neighboring data included in the first time-series information.

* * * * *